US007505831B2

(12) United States Patent
Jones et al.

(10) Patent No.: US 7,505,831 B2
(45) Date of Patent: Mar. 17, 2009

(54) SYSTEM AND METHOD FOR PROCESSING CURRENCY AND IDENTIFICATION CARDS IN A DOCUMENT PROCESSING DEVICE

(75) Inventors: William J. Jones, Barrington, IL (US); Douglas U. Mennie, Barrington, IL (US); Charles P. Jenrick, Chicago, IL (US); Robert J. Klein, Chicago, IL (US); Curtis W. Hallowell, Palatine, IL (US)

(73) Assignee: Cummins-Allison Corp., Mt. Prospect, IL (US)

( * ) Notice: Subject to any disclaimer, the term of this patent is extended or adjusted under 35 U.S.C. 154(b) by 0 days.

(21) Appl. No.: 11/633,171

(22) Filed: Dec. 4, 2006

(65) Prior Publication Data

US 2007/0078560 A1 Apr. 5, 2007

Related U.S. Application Data

(63) Continuation of application No. 10/941,688, filed on Sep. 15, 2004, now Pat. No. 7,146,245, which is a continuation-in-part of application No. 10/662,738, filed on Sep. 15, 2003, now Pat. No. 7,016,767.

(51) Int. Cl.
*G06F 7/00* (2006.01)

(52) U.S. Cl. ........................ 700/224; 700/225; 700/226

(58) Field of Classification Search ................. 700/224, 700/226, 223, 225; 194/206, 328
See application file for complete search history.

(56) References Cited

U.S. PATENT DOCUMENTS

| | | | | |
|---|---|---|---|---|
| 5,163,672 | A | 11/1992 | Mennie | 271/187 |
| 5,207,788 | A | 5/1993 | Geib | 271/122 |
| 5,295,196 | A | 3/1994 | Raterman et al. | 382/7 |
| 5,467,405 | A | 11/1995 | Raterman et al. | 382/135 |
| 5,467,406 | A | 11/1995 | Graves et al. | 382/135 |

(Continued)

FOREIGN PATENT DOCUMENTS

WO WO 91/11778 8/1991

(Continued)

OTHER PUBLICATIONS

International Search Report dated Jun. 6, 2005.

(Continued)

*Primary Examiner*—Gene O. Crawford
*Assistant Examiner*—Ramya G Prakasam
(74) *Attorney, Agent, or Firm*—Nixon Peabody LLP

(57) ABSTRACT

A document processing device having an evaluation region disposed along a transport path between an input and output receptacle capable of processing both currency bills and identification cards. An evaluation unit enables entry of source identification information before or after processing currency bills. Memory is adapted to store source identification information for multiple batches of currency. Multiple batches are placed in the processing device for multiple batch processing. The evaluation region includes detectors for detecting predetermined characteristics of currency bills and distinguishing identification cards from currency. During processing, the identification card, or other separator card, is sent to a predetermined output receptacle designated as a reject receptacle. Currency that is rejected is sent to the reject receptacle. Rejected currency is separated into batches by the identification cards sent to the reject receptacle during processing.

41 Claims, 44 Drawing Sheets

U.S. PATENT DOCUMENTS

| | | | | |
|---|---|---|---|---|
| 5,478,992 | A | 12/1995 | Hamada et al. | 235/379 |
| D369,984 | S | 5/1996 | Larsen | D10/97 |
| 5,633,949 | A | 5/1997 | Graves et al. | 382/135 |
| 5,640,463 | A | 6/1997 | Csulits | 382/135 |
| 5,652,802 | A | 7/1997 | Graves et al. | 382/135 |
| 5,687,963 | A | 11/1997 | Mennie | 271/119 |
| 5,692,067 | A | 11/1997 | Raterman et al. | 382/135 |
| 5,704,491 | A | 1/1998 | Graves | 209/534 |
| 5,724,438 | A | 3/1998 | Graves | 382/135 |
| 5,751,840 | A | 5/1998 | Raterman et al. | 382/135 |
| 5,790,693 | A | 8/1998 | Graves et al. | 382/135 |
| 5,790,697 | A | 8/1998 | Jones et al. | 382/135 |
| 5,806,650 | A | 9/1998 | Mennie et al. | 194/206 |
| 5,815,592 | A | 9/1998 | Mennie et al. | 382/135 |
| 5,822,448 | A | 10/1998 | Graves et al. | 382/135 |
| 5,832,104 | A | 11/1998 | Graves et al. | 382/135 |
| 5,867,589 | A | 2/1999 | Graves et al. | 382/135 |
| 5,870,487 | A | 2/1999 | Graves et al. | 382/135 |
| 5,875,259 | A | 2/1999 | Mennie et al. | 382/135 |
| 5,905,810 | A | 5/1999 | Jones et al. | 382/135 |
| 5,909,502 | A | 6/1999 | Mazur | 382/135 |
| 5,909,503 | A | 6/1999 | Graves et al. | 382/135 |
| 5,912,982 | A | 6/1999 | Munro et al. | 382/135 |
| 5,917,930 | A | 6/1999 | Kayani et al. | 382/135 |
| 5,938,044 | A | 8/1999 | Weggesser | 209/534 |
| 5,940,623 | A | 8/1999 | Watts et al. | 395/712 |
| 5,943,655 | A | 8/1999 | Jacobson | 705/30 |
| 5,960,103 | A | 9/1999 | Graves et al. | 382/135 |
| 5,966,456 | A | 10/1999 | Jones et al. | 382/135 |
| 5,982,918 | A | 11/1999 | Mennie et al. | 382/135 |
| 5,992,601 | A | 11/1999 | Mennie et al. | 194/207 |
| 6,012,565 | A | 1/2000 | Mazur | 194/207 |
| 6,021,883 | A | 2/2000 | Casanova et al. | 194/217 |
| 6,026,175 | A | 2/2000 | Raterman et al. | 382/135 |
| 6,028,951 | A | 2/2000 | Raterman et al. | 382/135 |
| 6,039,645 | A | 3/2000 | Mazur | 453/10 |
| 6,068,194 | A | 5/2000 | Mazur | 235/492 |
| 6,072,896 | A | 6/2000 | Graves et al. | 382/135 |
| 6,073,744 | A | 6/2000 | Raterman et al. | 194/207 |
| 6,074,334 | A | 6/2000 | Mennie et al. | 493/438 |
| 6,128,402 | A | 10/2000 | Jones et al. | 382/135 |
| 6,220,419 | B1 | 4/2001 | Mennie | 194/207 |
| 6,237,739 | B1 | 5/2001 | Mazur et al. | 194/207 |
| 6,241,069 | B1 | 6/2001 | Mazur et al. | 194/207 |
| 6,256,407 | B1 | 7/2001 | Mennie et al. | 382/135 |
| 6,278,795 | B1 | 8/2001 | Anderson et al. | 382/135 |
| 6,311,819 | B1 | 11/2001 | Stromme et al. | 194/207 |
| 6,318,537 | B1 | 11/2001 | Jones et al. | 194/346 |
| 6,351,551 | B1 | 2/2002 | Munro et al. | 382/135 |
| 6,363,164 | B1 | 3/2002 | Jones et al. | 382/135 |
| 6,371,303 | B1 | 4/2002 | Klein et al. | 209/534 |
| 6,378,683 | B2 | 4/2002 | Mennie | 194/207 |
| 6,381,354 | B1 | 4/2002 | Mennie et al. | 382/135 |
| 6,398,000 | B1 | 6/2002 | Jenrick et al. | 194/200 |
| 6,459,806 | B1 | 10/2002 | Raterman et al. | 382/135 |
| 6,460,705 | B1 | 10/2002 | Hallowell | 209/534 |
| 6,493,461 | B1 | 12/2002 | Mennie et al. | 382/135 |
| 6,539,104 | B1 | 3/2003 | Raterman et al. | 382/135 |
| 6,546,351 | B1 | 4/2003 | Haycock et al. | 702/127 |
| 6,560,355 | B2 | 5/2003 | Graves et al. | 382/135 |
| 6,588,569 | B1 | 7/2003 | Jenrick et al. | 194/206 |
| 6,601,687 | B1 | 8/2003 | Jenrick et al. | 194/206 |
| 6,603,872 | B2 | 8/2003 | Jones et al. | 382/135 |
| 6,621,919 | B2 | 9/2003 | Mennie et al. | 382/135 |
| 6,628,816 | B2 | 9/2003 | Mennie et al. | 382/135 |
| 6,636,624 | B2 | 10/2003 | Raterman et al. | 382/135 |
| 6,647,136 | B2 | 11/2003 | Jones et al. | 382/137 |
| 6,650,767 | B2 | 11/2003 | Jones et al. | 382/135 |
| 6,654,486 | B2 | 11/2003 | Jones et al. | 382/135 |
| 6,661,910 | B2 | 12/2003 | Jones et al. | 382/135 |
| 6,665,431 | B2 | 12/2003 | Jones et al. | 382/135 |
| 6,678,401 | B2 | 1/2004 | Jones et al. | 382/135 |
| 6,678,402 | B2 | 1/2004 | Jones et al. | 382/135 |
| 6,705,470 | B2 | 3/2004 | Klein et al. | 209/534 |
| 6,721,442 | B1 | 4/2004 | Mennie et al. | 382/135 |
| 6,724,926 | B2 | 4/2004 | Jones et al. | 382/135 |
| 6,724,927 | B2 | 4/2004 | Jones et al. | 382/135 |
| 6,731,785 | B1 | 5/2004 | Mennie et al. | 382/135 |
| 6,731,786 | B2 | 5/2004 | Jones et al. | 382/135 |
| 6,748,101 | B1 | 6/2004 | Jones et al. | 382/135 |
| 6,778,693 | B2 | 8/2004 | Jones et al. | 382/136 |
| 6,798,899 | B2 | 9/2004 | Mennie et al. | 271/10.09 |
| 6,810,137 | B2 | 10/2004 | Jones et al. | 382/137 |
| RE38,663 | E | 11/2004 | Kayani et al. | 382/135 |
| 6,843,418 | B2 | 1/2005 | Jones et al. | 235/462.01 |
| 6,860,375 | B2 | 3/2005 | Hallowell et al. | 194/328 |
| 6,866,134 | B2 | 3/2005 | Stromme et al. | 194/207 |
| 6,868,954 | B2 | 3/2005 | Stromme et al. | 194/207 |
| 6,880,692 | B1 | 4/2005 | Mazur et al. | 194/207 |
| 6,913,130 | B1 | 7/2005 | Mazur et al. | 194/207 |
| 6,913,260 | B2 | 7/2005 | Maier et al. | 271/265.04 |
| 6,915,893 | B2 | 7/2005 | Mennie | 194/207 |
| 6,929,109 | B1 | 8/2005 | Klein et al. | 194/206 |
| 6,955,253 | B1 | 10/2005 | Mazur et al. | 194/207 |
| 6,957,733 | B2 | 10/2005 | Mazur et al. | 194/215 |
| 6,959,800 | B1 | 11/2005 | Mazur et al. | 194/207 |
| 6,962,247 | B2 | 11/2005 | Maier et al. | 194/207 |
| 6,980,684 | B1 | 12/2005 | Munro et al. | 382/135 |
| 6,994,200 | B2 | 2/2006 | Jenrick et al. | 194/206 |
| 6,996,263 | B2 | 2/2006 | Jones et al. | 382/135 |
| 7,000,828 | B2 | 2/2006 | Jones | 235/379 |
| 7,016,767 | B2 * | 3/2006 | Jones et al. | 700/224 |
| 7,082,216 | B2 | 7/2006 | Jones et al. | 382/137 |
| 7,092,560 | B2 | 8/2006 | Jones et al. | 382/135 |
| 7,103,206 | B2 | 9/2006 | Graves et al. | 382/135 |
| 7,103,438 | B2 | 9/2006 | Hallowell et al. | 700/116 |
| 7,146,245 | B2 | 12/2006 | Jones et al. | 700/224 |
| 7,149,336 | B2 | 12/2006 | Jones et al. | 382/135 |
| 7,158,662 | B2 | 1/2007 | Chiles | 382/135 |
| 7,171,032 | B2 | 1/2007 | Jones et al. | 382/135 |
| 7,187,795 | B2 | 3/2007 | Jones et al. | 382/135 |
| 7,191,657 | B2 | 3/2007 | Maier et al. | 73/587 |
| 7,197,173 | B2 | 3/2007 | Jones et al. | 382/135 |
| 7,200,255 | B2 | 4/2007 | Jones et al. | 382/135 |
| 7,201,320 | B2 | 4/2007 | Csulits et al. | 235/462.01 |
| 7,232,024 | B2 | 6/2007 | Mazur et al. | 194/207 |
| 7,248,731 | B2 | 7/2007 | Raterman et al. | 382/135 |
| 7,256,874 | B2 | 8/2007 | Csulits et al. | 356/71 |
| 7,269,279 | B2 | 9/2007 | Chiles | 382/135 |
| 2001/0006557 | A1 | 7/2001 | Mennie et al. | 382/135 |
| 2001/0015311 | A1 | 8/2001 | Mennie | 194/302 |
| 2001/0019624 | A1 | 9/2001 | Raterman et al. | 382/135 |
| 2001/0035603 | A1 | 11/2001 | Graves et al. | 271/265.01 |
| 2002/0001393 | A1 | 1/2002 | Jones et al. | 382/100 |
| 2002/0020603 | A1 | 2/2002 | Jones et al. | 194/346 |
| 2002/0056605 | A1 | 5/2002 | Mazur et al. | 194/207 |
| 2002/0085245 | A1 | 7/2002 | Mennie et al. | 358/498 |
| 2002/0085745 | A1 | 7/2002 | Jones et al. | 382/135 |
| 2002/0103757 | A1 | 8/2002 | Jones et al. | 705/45 |
| 2002/0104785 | A1 | 8/2002 | Klein et al. | 209/534 |
| 2002/0107801 | A1 | 8/2002 | Jones et al. | 705/45 |
| 2002/0118871 | A1 | 8/2002 | Jones et al. | 382/137 |
| 2002/0122580 | A1 | 9/2002 | Jones et al. | 382/137 |
| 2002/0126885 | A1 | 9/2002 | Mennie et al. | 382/135 |
| 2002/0126886 | A1 | 9/2002 | Jones et al. | 382/135 |
| 2002/0131630 | A1 | 9/2002 | Jones et al. | 382/137 |
| 2002/0136442 | A1 | 9/2002 | Jones et al. | 382/135 |
| 2002/0145035 | A1 | 10/2002 | Jones | 235/379 |
| 2002/0154804 | A1 | 10/2002 | Jones et al. | 382/135 |
| 2002/0154805 | A1 | 10/2002 | Jones et al. | 382/135 |
| 2002/0154806 | A1 | 10/2002 | Jones et al. | 382/135 |
| 2002/0154807 | A1 | 10/2002 | Jones et al. | 382/135 |
| 2002/0154808 | A1 | 10/2002 | Jones et al. | 382/135 |
| 2002/0186876 | A1 | 12/2002 | Jones et al. | 382/135 |

| | | | | |
|---|---|---|---|---|
| 2003/0009420 | A1 | 1/2003 | Jones | 705/39 |
| 2003/0015395 | A1 | 1/2003 | Hallowell et al. | 194/206 |
| 2003/0015396 | A1 | 1/2003 | Mennie | 194/206 |
| 2003/0059098 | A1 | 3/2003 | Jones et al. | 382/135 |
| 2003/0062242 | A1 | 4/2003 | Hallowell et al. | 194/302 |
| 2003/0081824 | A1 | 5/2003 | Mennie et al. | 382/135 |
| 2003/0108233 | A1 | 6/2003 | Raterman et al. | 382/135 |
| 2003/0121752 | A1 | 7/2003 | Stromme et al. | 194/207 |
| 2003/0121753 | A1 | 7/2003 | Stromme et al. | 194/207 |
| 2003/0132281 | A1 | 7/2003 | Jones et al. | 235/379 |
| 2003/0139994 | A1 | 7/2003 | Jones | 705/36 |
| 2003/0168308 | A1 | 9/2003 | Maier et al. | 194/207 |
| 2003/0174874 | A1 | 9/2003 | Raterman et al. | 382/135 |
| 2003/0182217 | A1 | 9/2003 | Chiles | 705/35 |
| 2003/0198373 | A1 | 10/2003 | Raterman et al. | 382/135 |
| 2003/0202690 | A1 | 10/2003 | Jones et al. | 382/139 |
| 2003/0236589 | A1 * | 12/2003 | Myatt | 700/223 |
| 2004/0003980 | A1 | 1/2004 | Hallowell et al. | 194/206 |
| 2004/0016621 | A1 | 1/2004 | Jenrick et al. | 194/206 |
| 2004/0016797 | A1 | 1/2004 | Jones et al. | 235/379 |
| 2004/0028266 | A1 | 2/2004 | Jones et al. | 382/135 |
| 2004/0083149 | A1 | 4/2004 | Jones | 705/35 |
| 2004/0145726 | A1 | 7/2004 | Csulits et al. | 356/71 |
| 2004/0149538 | A1 | 8/2004 | Sakowski | 194/207 |
| 2004/0153408 | A1 | 8/2004 | Jones et al. | 705/43 |
| 2004/0154964 | A1 | 8/2004 | Jones | 209/534 |
| 2004/0173432 | A1 | 9/2004 | Jones | 194/216 |
| 2004/0251110 | A1 | 12/2004 | Jenrick et al. | 194/207 |
| 2005/0029168 | A1 | 2/2005 | Jones et al. | 209/534 |
| 2005/0035034 | A1 | 2/2005 | Long et al. | 209/534 |
| 2005/0040225 | A1 | 2/2005 | Csulits et al. | 235/379 |
| 2005/0047642 | A1 | 3/2005 | Jones et al. | 382/137 |
| 2005/0060055 | A1 | 3/2005 | Hallowell et al. | 700/95 |
| 2005/0060059 | A1 | 3/2005 | Klein et al. | 700/213 |
| 2005/0060061 | A1 | 3/2005 | Jones | 700/226 |
| 2005/0077142 | A1 | 4/2005 | Tam et al. | 194/217 |
| 2005/0086271 | A1 | 4/2005 | Jones et al. | 707/200 |
| 2005/0087422 | A1 | 4/2005 | Maier et al. | 194/207 |
| 2005/0108165 | A1 | 5/2005 | Jones et al. | 705/43 |
| 2005/0117791 | A2 | 6/2005 | Raterman et al. | 382/135 |
| 2005/0117792 | A2 | 6/2005 | Graves et al. | 382/135 |
| 2005/0150738 | A1 | 7/2005 | Hallowell et al. | 194/206 |
| 2005/0163361 | A1 | 7/2005 | Jones et al. | 382/135 |
| 2005/0163362 | A1 | 7/2005 | Jones et al. | 382/137 |
| 2005/0169511 | A1 | 8/2005 | Jones | 382/135 |
| 2005/0173221 | A1 | 8/2005 | Maier et al. | 194/207 |
| 2005/0183928 | A1 | 8/2005 | Jones et al. | 194/207 |
| 2005/0207634 | A1 | 9/2005 | Jones et al. | 382/135 |
| 2005/0213803 | A1 | 9/2005 | Mennie et al. | 382/135 |
| 2005/0241909 | A1 | 11/2005 | Mazur et al. | 194/207 |
| 2005/0249394 | A1 | 11/2005 | Jones et al. | 382/135 |
| 2005/0265591 | A1 | 12/2005 | Jones et al. | 382/135 |
| 2005/0276458 | A1 | 12/2005 | Jones et al. | 382/135 |
| 2005/0278239 | A1 | 12/2005 | Jones et al. | 705/35 |
| 2006/0010071 | A1 | 1/2006 | Jones et al. | 705/42 |
| 2006/0054455 | A1 | 3/2006 | Kuykendall et al. | 194/217 |
| 2006/0078186 | A1 | 4/2006 | Freeman et al. | 382/135 |
| 2006/0182330 | A1 | 8/2006 | Chiles | 382/135 |
| 2006/0195567 | A1 | 8/2006 | Mody et al. | 709/224 |
| 2006/0210137 | A1 | 9/2006 | Raterman et al. | 382/135 |
| 2006/0274929 | A1 | 12/2006 | Jones et al. | 382/135 |
| 2007/0076939 | A1 | 4/2007 | Jones et al. | 382/135 |
| 2007/0078560 | A1 | 4/2007 | Jones et al. | 700/224 |
| 2007/0095630 | A1 | 5/2007 | Mennie et al. | 194/206 |
| 2007/0112674 | A1 | 5/2007 | Jones et al. | 705/45 |
| 2007/0122023 | A1 | 5/2007 | Jenrick et al. | 382/135 |
| 2007/0172107 | A1 | 7/2007 | Jones et al. | 382/137 |

FOREIGN PATENT DOCUMENTS

| | | | |
|---|---|---|---|
| WO | WO 92/17394 | | 10/1992 |
| WO | WO 93/23824 | | 11/1993 |
| WO | WO 95/24691 | | 9/1995 |
| WO | WO 96/10800 | | 4/1996 |
| WO | WO 96/36933 | | 11/1996 |
| WO | WO 97/30422 | | 8/1997 |
| WO | WO 97/43734 | | 11/1997 |
| WO | WO 97/45810 | | 12/1997 |
| WO | WO 98/05006 | | 2/1998 |
| WO | WO 98/12662 | | 3/1998 |
| WO | WO 98/13785 | | 4/1998 |
| WO | WO 98/24052 | | 6/1998 |
| WO | WO 98/24067 | | 6/1998 |
| WO | WO 98/35323 | | 8/1998 |
| WO | WO 98/40839 | | 9/1998 |
| WO | WO 98/47100 | | 10/1998 |
| WO | WO 98/50892 | | 11/1998 |
| WO | WO 98/59323 | | 12/1998 |
| WO | WO 99/09511 | | 2/1999 |
| WO | WO 99/14668 | | 3/1999 |
| WO | WO 99/23601 | | 5/1999 |
| WO | WO 99/41695 | | 8/1999 |
| WO | WO 99/48040 | | 9/1999 |
| WO | WO 99/48042 | | 9/1999 |
| WO | WO 00/24572 | | 5/2000 |
| WO | WO 01/08108 | | 2/2001 |
| WO | WO 01/59685 | | 8/2001 |
| WO | WO 01/59723 | | 8/2001 |
| WO | WO 02/29735 | | 4/2002 |
| WO | WO 02/054360 | | 7/2002 |
| WO | WO 03/005312 | | 1/2003 |
| WO | WO 03/028361 | | 4/2003 |
| WO | WO 03/029913 | | 4/2003 |
| WO | WO 03/030113 | | 4/2003 |
| WO | WO 03/067532 | | 8/2003 |
| WO | WO 03/107282 | | 12/2003 |
| WO | WO 2004/010367 | | 1/2004 |
| WO | WO 2004/027717 | | 4/2004 |
| WO | WO 2004/036508 | | 4/2004 |
| WO | WO 2004/038631 | | 5/2004 |
| WO | WO 2004/068422 | | 8/2004 |
| WO | WO 2005/013209 | A2 | 2/2005 |
| WO | WO 2005/017842 | A1 | 2/2005 |
| WO | WO 2005/028348 | A2 | 3/2005 |
| WO | WO 2005/029240 | A2 | 3/2005 |
| WO | WO 2005/036445 | A1 | 4/2005 |
| WO | WO 2005/076229 | A1 | 8/2005 |
| WO | WO 2006/039439 | A2 | 4/2006 |
| WO | WO 2006/076289 | A2 | 7/2006 |
| WO | WO 2006/076634 | A2 | 7/2006 |

OTHER PUBLICATIONS

Communication pursuant to Article 97(2) [Examination Report] for EP 04 784 010.3 corresponding to PCT/US2004/030006 [WO 2005/029240] which claims priority to U.S. Appl. No. 10/662,738, filed Sep. 15, 2003.
Search Report for EP04784010.3 (Oct. 2, 2007).
International Preliminary Report on Patentability for PCT/US2004/030006 (Mar. 16, 2006).
International Search Report for PCT/US04/30006 (Jun. 6, 2005).
De La Rue Systems, 3000 User Guide, 108 pages. [e.g., G0018, G0022-25] (date: not dated).
De La Rue Systems, 3000 Series, Used Banknote Sorting Machines, 12 pages. [e.g., Q0009] (date: not dated).
Declaration of Stephen G. Emery regarding, inter alia, De La Rue 3000 Series, 20 pages (Sep. 6, 2007).
U.S. Appl. No. 12/058,370, filed Mar. 28, 2008, System And Method For Processing Batches Of Documents.
U.S. Appl. No. 12/147,308, filed Jun. 26, 2008, System And Method For Processing Batches Of Documents.

* cited by examiner

SYSTEM AND METHOD FOR PROCESSING CURRENCY AND IDENTIFICATION CARDS IN A DOCUMENT PROCESSING DEVICE

CROSS-REFERENCE TO RELATED APPLICATION

This application is a continuation of U.S. patent application Ser. No. 10/941,688, entitled "System And Method For Processing Currency And Identification Cards In A Document Processing Device," which was filed on Sep. 15, 2004 and now issued as U.S. Pat. No. 7,146,245, which is a continuation-in-part of U.S. patent application Ser. No. 10/662,738, entitled "System And Method For Processing Currency And Identification Cards In A Document Processing Device," which was filed on Sep. 15, 2003 and now issued as U.S. Pat. No. 7,016,767. Cross-reference is made to U.S. patent application Ser. No. 10/662,930 entitled "System and Method for Searching and Verifying Documents in a Document Processing Device," which was filed on Sep. 15, 2003 and now issued as U.S. Pat. No. 7,103,438. U.S. patent application Ser. No. 10/662,930 is incorporated herein by reference in its entirety.

FIELD OF THE INVENTION

The present invention relates generally to the field of document processing systems and, more particularly, to systems and methods for processing currency and identification cards in a document processing device.

BACKGROUND OF THE INVENTION

In a document processing environment it is highly desirable to achieve efficient means of processing documents. In general, higher efficiency in the processing of documents translates, in general, into lower business costs. Many businesses, such as banks, casinos, and retail stores, need to process groups of documents on a daily basis.

It is typical in a currency processing operation for one or several employees to prepare stacks of documents which are then passed along to operators of a document processing device, such as a sorting device. For example, in a casino currency processing environment, an employee removes stacks of currency from a number of gaming machines, each stack being from a different gaming machine, and then brings the stacks of currency to a sorting device operator. Using the document processing device, the operator processes each stack of currency, one at a time, stopping between each stack to manually feed the next stack of documents. Furthermore, for accounting purposes it is relevant to know the source of each stack of documents, i.e., the identity of the gaming machine from which each stack of currency was removed. Thus, the operator of the document processing device must manually enter the source of each particular stack of documents.

This manual entry is slow, costly, and prone to error. Processing each stack of documents manually can be very demanding on a human operator and can provide poor and inconsistent results. Because the method relies upon human intervention, the rate at which documents can be processed during a particular day can vary unpredictably. In addition, the chance of human error is extremely high. Furthermore, the employment of two or more persons for retrieving and processing the stacks of documents increases the cost associated with the processing of the stacks of documents.

Thus, there is a need for a document processing device that processes stacks of documents with minimal human intervention so as to expedite the accurate processing of documents, lower costs, and decrease the chance of human error. The present invention is directed to satisfying this and other needs.

SUMMARY OF THE INVENTION

A document processing device for multiple batch processing, comprising an input receptacle adapted to hold at least two batches of documents; an output receptacle adapted to receive the documents after the documents have been evaluated; and a transport mechanism adapted to transport the documents, one at a time, from the input receptacle to the output receptacle. An evaluation unit evaluates the documents, wherein the transport mechanism transports the documents past the evaluation unit. Memory is coupled to the evaluation unit and is adapted to store batch document information for each of the two batches based on evaluating the documents. The memory is also adapted to store source identification information for each of the two batches. The processing device also includes structure for entering into memory the source identification information for each of the two batches. In some embodiments, the source identification information is entered before any documents are evaluated by the evaluation unit. In some embodiments, one or more batches are evaluated before the source identification is entered into memory. For embodiments, the information is entered during multiple batch processing. The processing device also includes a controller comprising programming for matching, on a sequential basis, the source identification information for each of the two batches with batch document information for each of the two batches.

The above summary of the present invention is not intended to represent each embodiment, or every aspect, of the present invention. Additional features and benefits of the present invention will become apparent from the detailed description, figures, and claims set forth below.

BRIEF DESCRIPTION OF THE DRAWINGS

Other objects and advantages of the invention will become apparent upon reading the following detailed description in conjunction with the drawings in which:

FIG. 4*a*-1 is a perspective view of an evaluation region according to another embodiment of the document processing device of the present invention;

FIG. 4b-1 is a side view of an evaluation region according to another embodiment of the document processing device of the present invention;

FIG. 7b is a side cross-sectional view of the device shown in FIG. 7a;

FIG. 18b is a continuation of the flowchart shown in FIG. 18a;

FIG. 22b is a continuation of the flowchart shown in FIG. 22a;

FIG. 29b is a continuation of the flowchart shown in FIG. 29a;

DETAILED DESCRIPTION OF THE ILLUSTRATED EMBODIMENTS

Figure 1A:
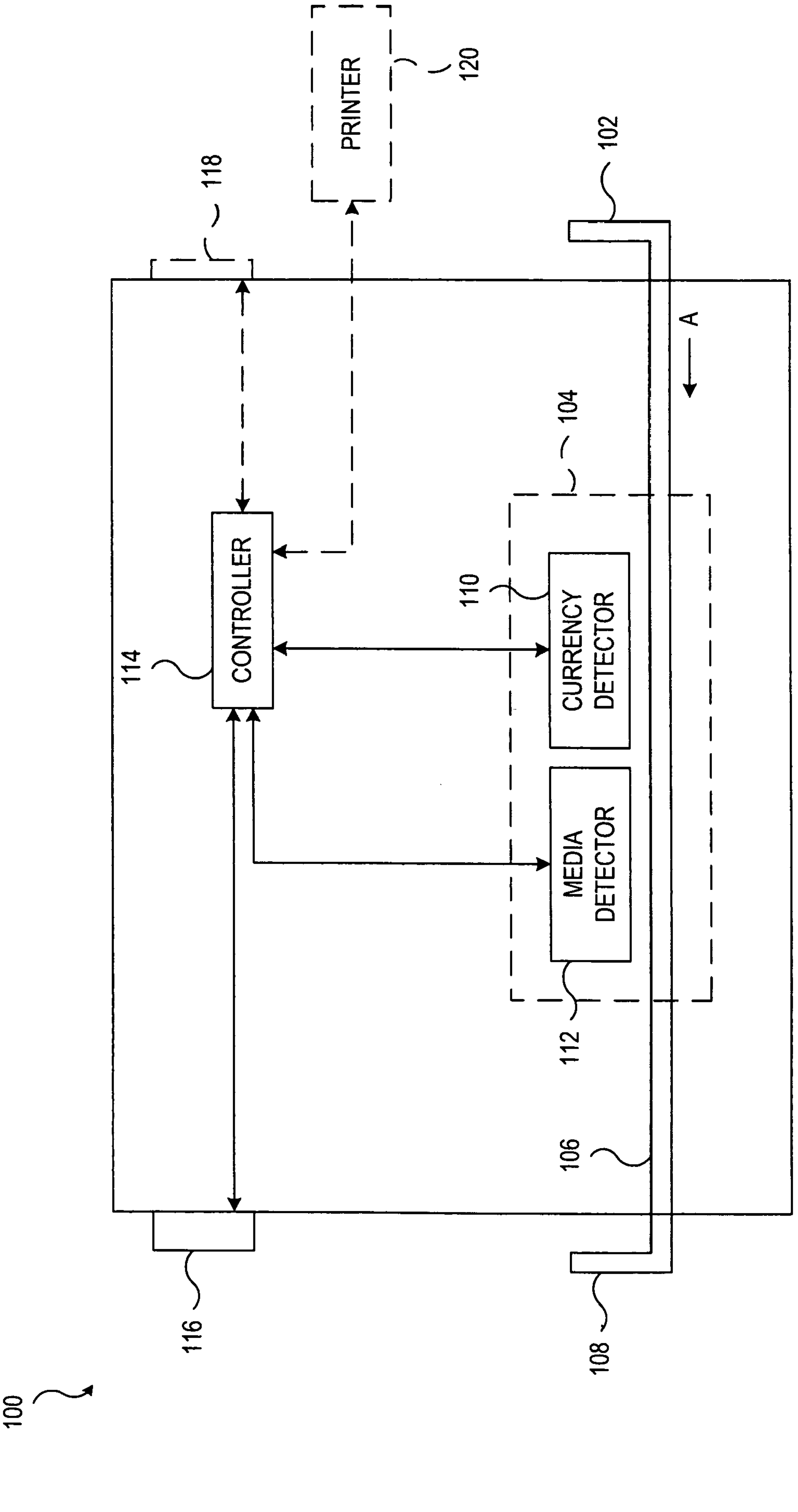
FIG. 1*a* is a functional block diagram of a document processing device according to one embodiment of the invention.

FIG. 1a is a functional block diagram of a document processing device 100 according to one embodiment of the present invention. The document processing device 100 generally includes an input receptacle 102, an evaluation region 104, a transport mechanism 106, and an output receptacle 108. As explained below, in alternate embodiments, the device 100 includes more than one output receptacle 108. The output receptacle 108 may also be variously referred to as a reject or offsort pocket or receptacle. Disposed along the transport path 106 is a currency detector 110 and a media detector 112 as functionally illustrated in FIG. 1a. The currency detector 110 and a control unit 116 are connected to a controller 114, which is adapted to control the operation of the device 100 and to communicate information to and from the control unit 116. For example, the controller 114 may send display information to and receive operator input from the control unit 116. Optionally, the control unit 116 may comprise a touch screen which is coupled to the device 100, or it may comprise a combination of a desktop computer or laptop, display, and/or keyboard which are coupled to the device 100. An optional printer 120 is shown coupled to the device 100. In an alternate embodiment, the device 100 is not coupled to a printer 120.

In the illustrated embodiment, the device 100 optionally includes a communications port 118 which is coupled to the controller 114. The controller 114 may comprise one or more processors which are adapted to control specific components in the device 100 and to process information associated with specific components in the device 100, the control unit 116, or the communications port 118. The communications port 118 may optionally be a serial port, a parallel port, a USB port, a wireless port adapted for wireless communication with a remote device, or any other suitable I/O port. In an alternate embodiment, the device 100 does not include the communications port 118. The controller 114 may further comprise memory, such as random access memory or any other suitable memory.

Although the currency detector 110 is shown to be disposed on one side of the transport path 106, it is understood that the currency detector 110 may instead be disposed on the opposite side of the transport path 106 only or on both sides of the transport path 106. In the same manner, the media detector 112 may be disposed on the opposite side of the transport path 106 only or on both sides of the transport path 106. These alternate embodiments are described in more detail in connection with FIG. 1*b* below.

In the illustrated embodiment of FIG. 1*a*, a stack of currency bills and substitute currency media is provided to the input receptacle 102 in any order or in a predetermined order. In one embodiment, the operator provides a mixed combination of currency bills and substitute currency media to the input receptacle 102, which are processed and delivered to one or more output receptacles. In another embodiment, the operator provides a stack of currency bills only to the input receptacle 102, which are processed and delivered to one or more output receptacles, and then a stack of substitute media only to the input receptacle 102, which are processed and delivered to one or more output receptacles, or vice versa. In this embodiment, the operator may further indicate via the control unit 116 which type of document is to be processed, and the controller 114 may "deactivate" one or more detectors in the evaluation region 104. For example, if the operator indicates that the type of documents to be processed is currency bills, the controller 114 may instruct the media detector 112 to ignore the document as it passes along the transport path 106. Alternatively, if the operator indicates that the type of documents to be processed is substitute currency media, the controller 114 may instruct the currency detector 110 to ignore the document as it passes along the transport path 106. Alternatively, the currency detector 110 and the substitute currency media 112 both detect characteristics of the document passing along the transport path, and the control unit 116 may alert the operator of an error condition, such as a substitute currency medium was detected in a stack of currency bills, or a currency bill was detected in a stack of substitute currency media. The operator may set aside the detected document for later processing.

As used herein, a U.S. currency bill refers to U.S. legal tender, such as a $1, $2, $5, $10, $20, $50, or $100 note, and a foreign currency bill refers to any bank note issued by a non-U.S. governmental agency as legal tender, such as a Euro, Japanese Yen, or British Pound note. A "currency bill" can be either a U.S. or foreign currency bill. The terms "currency note" and "bank note," are synonymous with the term "currency bill."

The term "substitute currency media" refers to redeemable documents. A redeemable document is a document that can be (a) redeemed for cash or (b) exchanged for goods or services or (c) both. Examples of substitute currency media include without limitation: casino cashout tickets (also variously called cashout vouchers or coupons) such as "EZ Pay" tickets issued by International Gaming Technology or "Quicket" tickets issued by Casino Data Systems or CashFree™ slot-machine tickets issued by Slot-Tickets.com; casino script, which is regularly issued by casinos in pre-set denominations such as $5 casino script, $20 casino script, for example; promotional media such as Disney Dollars or Toys'R Us "Geoffrey Dollars" or McDonald's Gift Certificates are also issued in pre-set denominations (e.g., a $1 Disney Dollar). While some types of "substitute currency media" are regularly issued in pre-set denominations such as the above-mentioned Disney Dollars, other types of "substitute currency media" include manufacturer or retailer coupons, gift certificates, gift cards, or food stamps.

Substitute currency media may include a single barcode or more than one barcode, and these types of substitute currency media are referred to herein as "barcoded tickets." Examples of barcoded tickets 135, 136 include casino cashout tickets such as "EZ Pay" Tickets and "Quicket" cashout tickets and CashFree™ slot-machine tickets, barcoded retailer coupons, barcoded gift certificates, or any other promotional media that includes a barcode. The singular form of "substitute currency media" is referred to as "substitute currency medium" or "medium" for short.

As used herein, a "document" includes a currency bill or a substitute currency medium. Likewise, the term "documents" includes currency bills and/or substitute currency media.

The term "substitute funds" includes casino script, paper tokens, and barcoded tickets. The term substitute currency media encompasses substitute funds, such that the term substitute finds defines a subset of documents encompassed by the term substitute currency media.

As is known, the dimensions of a U.S. currency bill are about 2.5 inches×6 inches (6.5 cm×15.5 cm). All U.S. currency bills have the same dimensions, but in many foreign countries, the dimensions from one denomination to another varies. In addition, certain types of substitute currency media such as "EZ Pay" tickets have approximately the same dimensions of U.S. currency, however, it is understood that the dimensions of substitute currency media may vary from type to type. The device 100 of the present invention according to any embodiment described herein is adapted to process documents having the same dimension or documents having varied dimensions.

Still referring to FIG. 1*a*, the transport mechanism 106 is adapted to transport the documents, one at a time, through the device 100 in the direction of arrow A, past the currency detector 110 and the media detector 112, and to the output receptacle 108. The currency detector 110 is adapted to detect one or more predetermined characteristics on a currency bill or on a particular kind of substitute currency medium, such as a Disney Dollar, and the media detector 112 is adapted to detect one or more predetermined characteristics on a particular kind of substitute currency medium, such as a barcode on a barcoded ticket, as explained in more detail in connection with FIG. 1*b*. The currency detector 110 comprises one or more sensors depending on a number of variables. The variables relate to whether the device 100 is authenticating, counting, or discriminating denominations of currency bills, and what distinguishing characteristics of the currency bills are being examined, for example, size, thickness, color, magnetism, reflectivity, absorbability, transmissivity, electrical conductivity, serial number, and so forth. The currency detector 110 may also employ a variety of detection means including, but not limited to, any combination of the following: a size detector, a density sensor, an upper optical scan head, a lower optical scan head, a single or plurality of magnetic sensors, a thread sensor, an infrared sensor, an ultraviolet/fluorescent light scan head, or an image scanner. These detection means and a host of others are disclosed in commonly assigned U.S. Pat. No. 6,278,795, entitled "Multi-Pocket Currency Discriminator," which is herein incorporated by reference in its entirety, and co-pending U.S. patent application Ser. No. 09/965,428, entitled "A Document Processing System Using Full Image Scanning," filed on Sep. 27, 2001, which is herein incorporated by reference in its entirety. Examples of discriminating denomination information from a currency bill are shown and disclosed in commonly assigned U.S. Pat. No. 5,815,592, which is herein incorporated by reference in its entirety.

In the specific case of substitute currency media, the variables may also relate to what distinguishing characteristics of the substitute currency media are being examined, such as any combination of the following without limitation: a barcode, a magnetic ink character recognition (MICR) pattern, characters readable by optical character recognition (OCR), including information printed according to the OCR-A and OCR-B fonts, a magnetic pattern, an optical variable device (OVD) pattern such as a hologram, a magnetic or electrically conductive thread, conductive ink, magnetic ink, an electrically conductive polymer, perforations, a coded watermark, or other encoded information. The detection of these distinguishing characteristics may be carried out by the media detector 112, which, in alternate embodiments, may employ a variety of detection means including, but not limited to, any combination of the following: a barcode reader, an optical scan head, a magnetic sensor, a thread sensor, an infrared sensor, an ultraviolet/fluorescent light scan head, an image scanner, or an imaging camera. These detection means and a host of others are disclosed in commonly assigned U.S. Pat. No. 6,278,795, entitled "Multi-Pocket Currency Discriminator," previously incorporated by reference, and co-pending U.S. patent application Ser. No. 09/965,428, entitled "A Document Processing System Using Full Image Scanning," filed on Sep. 27, 2001, also previously incorporated by reference, and may be modified in accordance with the present invention to detect distinguishing characteristics associated with substitute currency media or to capture an electronic image of one or both sides of a medium.

Some environments, such as a casino environment, may desire to retain copies of processed substitute currency media for record-keeping or other purposes, such as compliance with gaming regulations. In such environments, the media detector 112 includes an imaging camera which captures an electronic image of one or both sides of a passing substitute currency medium and/or a currency bill. The electronic image may be analyzed by software for a barcode pattern, and the barcode pattern may be decoded by software. The use of software to analyze and decode the barcode pattern eliminates the need to include a barcode reader in the media detector 112. After processing, the processed substitute currency medium can be discarded, and the electronic image is stored on one or more storage media, such as hard drives, CD-ROMs, or DVDs, for example. Accordingly, this embodiment eliminates the need for large physical storage space to house the processed substitute currency media. Moreover, the substitute currency media may also be electronically indexed or cross-referenced, simplifying future retrieval and archiving.

In other embodiments, instead of or in addition to an imaging camera, an image scanner is employed to scan one or both sides of a substitute currency medium or currency bill and save the captured images to a storage media under software control.

Figure 1B:
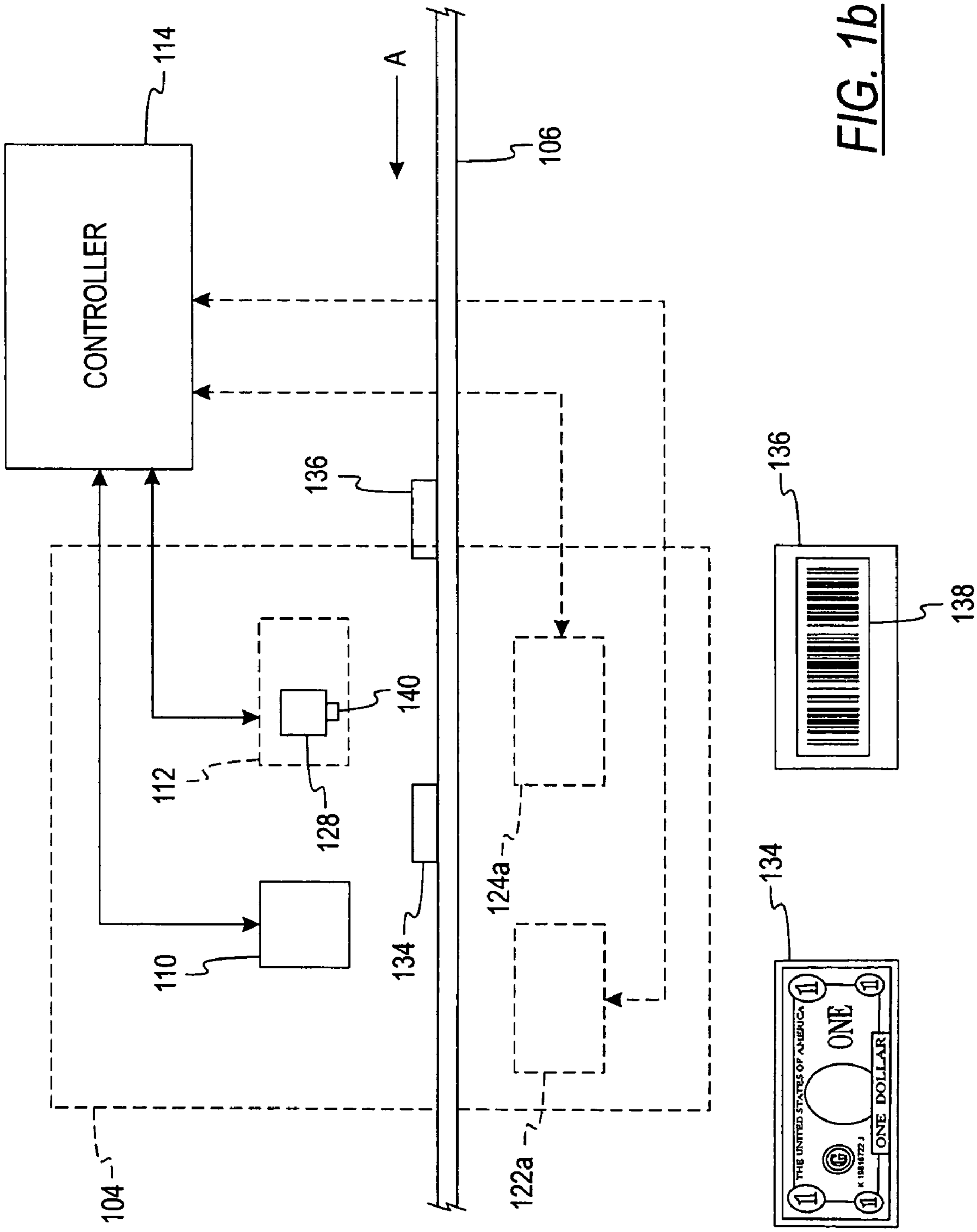
FIG. 1*b* is a functional block diagram of an evaluation region of a document processing device according to one embodiment of the present invention.

FIG. 1*b* shows a functional block diagram of a portion of an evaluation region 104 according to one embodiment of the present invention. The evaluation region 104 generally includes a currency detector 110, a media detector 112, and a controller 114. The evaluation region 104 may optionally include a second currency detector 122*a* and/or a second media detector 124*a* which may be disposed on the opposite side of a transport mechanism 106 as shown in FIG. 1*b*. The currency detector 110 may include any combination of the detection means identified above. In the illustrated embodiment, the media detector 112 comprises a barcode reader 128 and a mirror (not shown). Barcode readers are well known in the art, and will not be described in detail herein. Generally, barcode readers typically use a light beam generated by a laser diode or LED light source 140 to illuminate a barcode label. The laser beam or LED beam is deflected in a certain pattern across the barcode label. The reflected light representing the light and dark bars on a barcode label are processed and then converted into a digital signal representing the barcode pattern. The digital signal is analyzed by a controller where the signal is decoded into characters (e.g., alphanumerics and/or punctuation).

In one embodiment, the barcode reader 128 is an MS-911 barcode reader manufactured by Microscan. In alternate embodiments, other barcode readers may be employed, such as, for example, the LM 520, LazerData 8000, LazerData 9000E, or LD12000 barcode readers manufactured by PSC, Inc., the MS-880, MS-7100 or MS-7180 barcode readers manufactured by Microscan, the Maxiscan 2100 or Maxiscan 3300 barcode readers manufactured by Intermec, or an LED barcode reader manufactured by Welch Allyn. It is understood that the present invention is not limited to any particular barcode reader. The selection of a particular barcode reader depends on a number of factors, including size constraints in the evaluation region 104 of the document processing device, the particular barcode symbology to be scanned, and the desired scan rate. For example, the LazerData 9000E, manufactured by PSC, Inc., has scan rates ranging from 500 scans per second to 2000 scans per second, and is adapted to scan a linear barcode. The dimensions of the LazerData 9000E are approximately 3.84" (D)×2.52" (L)×2.52" (W), or 97.5 mm (D)×64 mm (L)×64 mm (W). The MS-911 barcode reader has dimensions of approximately 3" (H)×2.13" (W)×1.63" D), or 75 mm (H)×53.5 mm (W)×41 mm (D), and has a scan rate of up to 2000 scans per minute.

In alternate embodiments, the barcode reader 128 is adapted to scan less than 500 barcodes per minute, at least 500 barcodes per minute, 800 barcodes per minute, 1000 barcodes per minute, 1200 barcodes per minute, and 1500 barcodes per minute.

In the illustrated embodiment shown in FIG. 1*b*, the controller 114 controls the operation of the barcode reader 128, but in alternate embodiments, a separate barcode controller (not shown) controls the operation of the barcode reader 128 and is coupled to the controller 114. The controller 114 also controls other operations of the document processing device.

Still referring to FIG. 1*b*, the media detector 112 optionally includes the barcode reader 128 and the mirror (not shown). The mirror is positioned proximate the barcode reader 128 to "lengthen" the effective distance between the barcode reader 128 and the document to be scanned, in applications where the barcode reader 128 is placed too close to the document. As is known, some barcode readers require that they be placed within a range of distance from the scanning surface. If the distance is outside the distance range specifications, the barcode reader cannot obtain reliable and accurate readings. In such applications, the mirror may be positioned to deflect the light beam from the barcode reader 128 onto the document passing along the transport path 106. In alternate embodiments in which the barcode reader 128 is positioned within distance range specifications, the mirror is not included.

Still referring to FIG. 1*b*, a currency bill 134 and a barcoded ticket 136 are shown on the transport mechanism 106. In one embodiment, the barcode encodes characters, such as numbers, which are associated with certain information. For example, on a casino cashout ticket, the barcode number may be associated with any combination of the following: a payout amount; a ticket number; identification information associated with the slot machine that dispensed the casino cashout ticket, such as, for example, the slot machine number, the time of dispensation, and the amount of payout from the dispensing slot machine during a time period; identification information associated with the winner of the casino cashout ticket; and so forth. On a gift certificate, the barcode number may be associated with any combination of the following: a gift amount; a gift certificate number; information about a retailer dispensing the gift certificate; terms and conditions information; and so forth. In an alternate embodiment, the barcode encodes a number which is associated with a certain discount. For example, on a store coupon, the barcode number is typically associated with a promotional discount, such as fifty cents off, or buy one, get one free. The barcode numbers and their corresponding monetary and discount amounts are typically stored in a database. When the barcode number is scanned and identified, the corresponding amount or discount is queried from the database. The database may also include information indicative of whether a ticket has been redeemed. For example, to prevent fraudulent use of cashout tickets in the casino environment, the database may also keep track of whether a cashout ticket has been redeemed. In yet other embodiments, the barcode may encode any combination of numbers, letters, punctuation, or other characters. It is understood that a barcode in accordance with any embodiment shown or described herein may encode characters including any combination of numbers, letters, punctuation, or other characters.

Barcodes are well known in the art, and there are numerous barcode symbologies, such as, for example, Codabar, Code 3 of 9, Interleaved 2 of 5, UPC, EAN 8, EAN 13, Postnet, Planet Code, Aztec Code, Code 11, Code 16K, Code 49, Code 93, Code 128, Data Matrix, MaxiCode, 3D or bumpy barcode, to name just a few. These and other barcode symbologies encode characters such as numbers, letters, and/or punctuation. Barcodes can be linear, like the UPC code, 2-D like the MaxiCode, or 3-D like the bumpy barcode. Barcodes are typically black and white, but they may also be in color. In the illustrated embodiment of FIG. 1*b*, the barcode reader 128 is capable of scanning a linear barcode. A linear barcode typically comprises a series of parallel dark bars of varying widths with intervening light spaces, also of varying widths. It is expressly understood that the present invention is not limited to any particular barcode symbology or to any particular barcode reader. In alternate embodiments, multiple barcode readers may be disposed in the evaluation region 104 to identify different barcode symbologies. For example, a retailer may accept both store coupons and gift certificates, but the gift certificates may be encoded with a different barcode symbology than the store coupons. In such a case, the evaluation region 104 may include two barcode readers, one to identify barcodes disposed on the gift certificates, and one to identify barcodes disposed on the store coupons.

Still referring to FIG. 1*b*, the currency bill 134 and barcoded ticket 136 are transported along the transport mechanism 106 in the direction of arrow A. In the illustrated embodiment, the currency bill 134 and barcoded ticket 136 are first transported past the media detector 112 and then past the currency detector 110. However, in an alternate embodiment, a document may be first transported past the currency detector 110 and then past the media detector 112. Alternatively, the barcode reader 128 and the currency detector 110 may be incorporated into a single component, such as in a scanner that is adapted to scan one or more selected areas of a document or the entire area of a document. In this embodiment, the full image scanner scans for a characteristic associated with a currency bill and for a characteristic associated with a substitute currency medium.

As explained previously, the currency detector 110 may comprise one or more sensors disposed at various locations along the transport mechanism 106. In the alternative embodiment in which the barcode reader 128 is integrated into the currency detector 110, the barcode reader 128 may be positioned among the plurality of sensors at any location within the currency detector 110 and along the transport mechanism 106. Furthermore, as emphasized previously, the currency detector 110 may be disposed on either side or both sides of the transport mechanism 106.

If the barcode reader 128 does not identify a barcode on the currency bill 134, the barcode reader 128 provides a "no read" electrical signal to the controller 114 indicating that no barcode was read or identified in that scan. As used herein, a substitute currency medium having an unreadable or non-existent barcode may be considered an "invalid" substitute currency medium. In the illustrated embodiment of FIG. 1*b*, the transport mechanism 106 transports the currency bill 134 in the direction of arrow A towards the currency detector 110. The currency detector 110 evaluates one or more distinguishing characteristics, such as those specified above, of the currency bill 134. An optional second currency detector 122*a* disposed on the opposite side of the transport mechanism 106 may also evaluate one or more distinguishing characteristics of the currency bill 134.

In the direction of arrow A shown in FIG. 1*b*, the next document to be evaluated is the barcoded ticket 136. In FIG. 1*b*, the barcoded ticket 136 is scanned by the barcode reader 128. If the barcode reader 128 successfully reads the barcode 138 on the barcoded ticket 136, the barcode reader 128 provides a "good read" electrical signal to the controller 114 indicating that the barcode reader 128 read or identified the barcode 138. As used herein, the term "valid substitute currency medium" refers in general to a document having a barcode identified by the barcode reader 128. The barcode reader 128 also provides an electrical signal representative of the barcode pattern 138 to the controller 114. The controller 114 decodes this electrical signal into characters, and stores these characters in memory which may optionally be integrated in the controller 114 or coupled to the controller 114.

In one embodiment, once the barcode reader 128 scans a valid barcode on the barcoded ticket 136, the controller 114 instructs the currency detector 110 to ignore the barcoded ticket 136. In an alternate embodiment, the controller 114 instructs the currency detector 110 to evaluate the barcoded ticket 136. In this alternate embodiment, if the controller 110 receives a signal from the media detector 124 that it has read a valid barcode and a signal from the currency detector 110 that it has detected an authentic currency, then the controller 114 provides an error signal to the operator alerting the operator that an unacceptable document has been detected. As used herein, the terms "operator," "user," and "customer" are interchangeable.

As stated above, the controller 114 may include a memory (not shown). In one embodiment, the memory includes master authenticating information. The master authenticating information includes information about authenticating characteristics of a currency bill, such as size, thickness, color, magnetism, reflectivity, absorbability, transmissivity, electrical conductivity, serial number, and so forth. The memory may also include master denomination information. The master denomination information includes information about denomination characteristics of a currency bill. Examples of such characteristics are disclosed in commonly assigned U.S. Pat. No. 5,815,592, previously incorporated by reference. In another embodiment, the memory includes media information, which includes information about the substitute currency media. This information may include, in alternate embodiments, any combination of the following: an amount of money associated with a medium, a ticket number of a casino cashout ticket, the characters encoded on a barcode on a barcoded medium, self-checkout station identification information, casino gaming machine information, information about the identity of the person redeeming the redeemable document, or the time a medium was dispensed, for example. In this embodiment, the media information may be periodically updated in the memory via a computer network coupled to the document processing device 100, such as described in connection with FIG. 11, or the media information may be periodically updated in the memory via personnel, such as retailer or casino personnel. In the latter embodiment, an interface would be provided via the control unit 116 to the personnel to reprogram the memory. The memory may be random access memory, flash memory, EEPROM, or any other suitable rewriteable memory.

As explained above, the printer 120 may optionally be coupled to the device 100. When the device 100 is coupled to the printer 120, the printer 120 may print reports containing information about the documents processed by the device 100, such as the reports described in connection with FIGS. 12-13 below. The printer 120 may dispense a redeemable document to an operator of the device 100. For example, as explained below, an operator may deposit a stack of documents containing a mixed combination of currency bills and substitute currency media into the device 100. The device 100 processes the stack of documents, and, according to one embodiment, dispenses a barcoded ticket whose barcode is associated with the total value of documents processed. For example, an operator may deposit $134 of currency bills into the device 100 and $50 worth of redeemable documents. In this example, the device 100 would dispense a barcoded ticket to the operator with a barcode associated with an amount of $184. In another embodiment, the printer 120 prints both reports and dispenses redeemable documents.

Figure 1C:
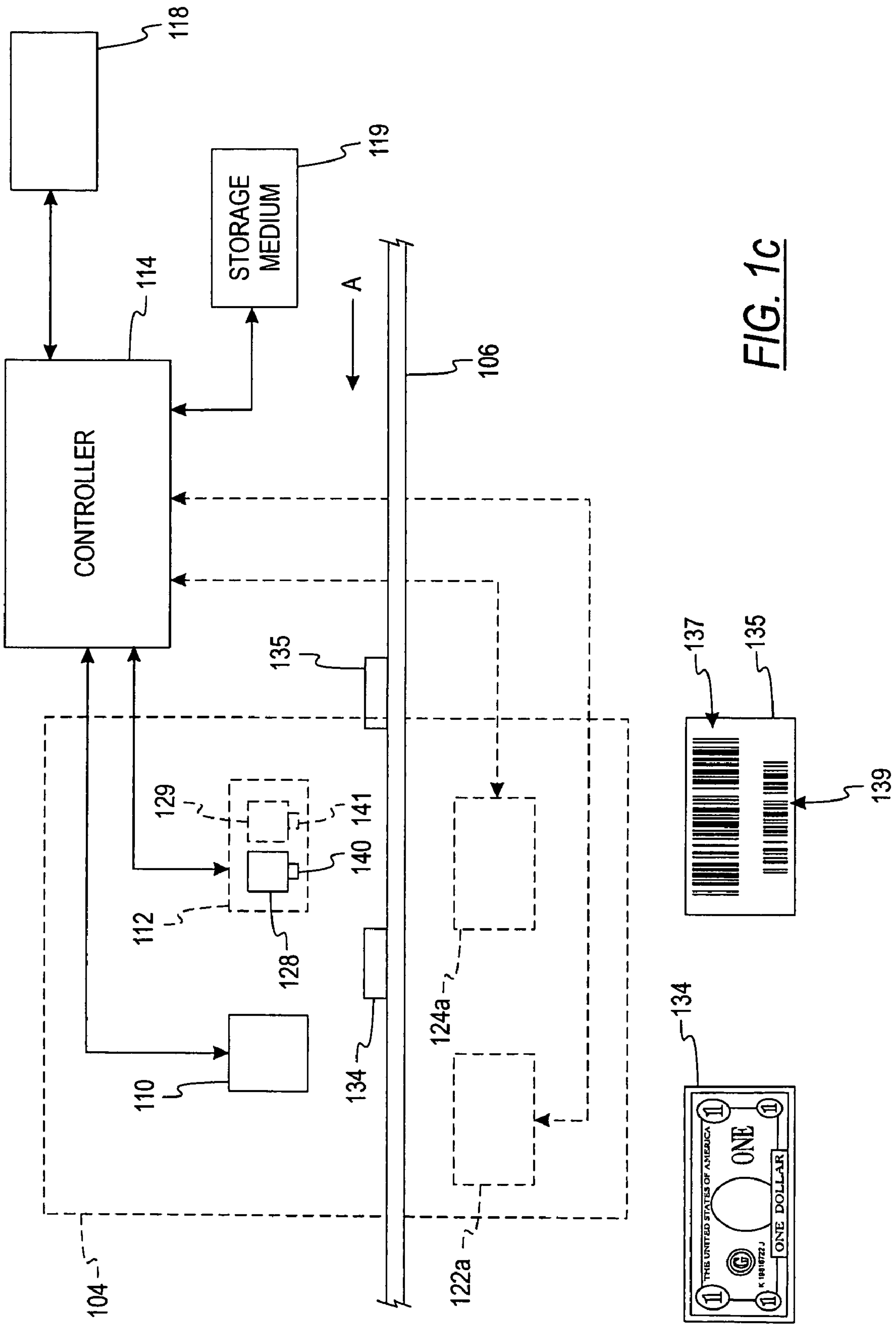
FIG. 1*c* is a functional block diagram of an evaluation region of a document processing device according to another embodiment of the present invention.

FIG. 1*c* shows an evaluation region 104 which is adapted to process currency bills and substitute currency media bearing more than one barcode. A barcoded ticket 135 includes a first barcode pattern 137 and a second barcode pattern 139 disposed on a surface of the barcoded ticket 135 in the same orientation. Note that the first barcode pattern 137 and the second barcode pattern 139 could be disposed on opposite surfaces of the barcoded ticket 135 or in different orientations. For example, one or both of the first and second barcode patterns 137, 139 could be disposed in a vertical orientation instead of a horizontal orientation as shown.

In a preferred embodiment, the first barcode pattern 137 and the second barcode pattern 139 are encoded according to the same barcode symbology, though they may also be encoded according to different barcode symbologies, including any combination of the barcode symbologies mentioned above. Many commercially available barcode readers are capable of discerning among several different barcode symbologies, so the use of different barcode symbologies on a barcoded ticket would not necessarily call for multiple barcode readers. However, if multiple barcode readers are required, additional readers may be disposed in the media detector 112. An optional second barcode reader 129 is shown in the media detector 112 to scan for barcode patterns on passing documents. Like the barcode reader 128, the optional second barcode reader 129 includes a light source 141 for illuminating the barcode pattern. Barcode readers adapted to detect barcodes such as a bumpy barcode include an additional or alternate detection structure as is known in the art.

As explained in connection with FIG. 1*b*, the optional second barcode reader 129 may be disposed in the second media detector 124*a* on the opposite side of the transport mechanism 106. Such an arrangement would permit detection of a barcode pattern regardless of the facing orientation of the document or would permit detection of a barcode pattern disposed on both sides of a document. In other embodiments, two or more barcode readers may be disposed on each side of the transport mechanism 106.

In embodiments having only one media detector disposed on one side of the transport mechanism 106, the substitute currency media would have to be faced such that the barcode (s) could be detected by the barcode reader 128. This facing may be accomplished manually by the operator before depositing the documents into the document processing device. Alternately, a document facing mechanism coupled to the transport mechanism 106 may be employed to rotate a document 180° so that the face position of the document is reversed. Further details of a document facing mechanism which may be utilized for this purpose are disclosed in commonly assigned U.S. Pat. No. 6,074,334, entitled "Document Facing Method and Apparatus," which issued on Jun. 13, 2000, incorporated herein by reference in its entirety. Those skilled in the art will appreciate that the document facing mechanism disclosed in U.S. Pat. No. 6,074,334 can be positioned downstream or upstream of the evaluation region 104. In the case where the document facing mechanism is positioned upstream of the evaluation region 104, a suitable detector, such as a barcode reader (not shown), may be disposed upstream of the document facing mechanism to detect the orientation of a substitute currency medium before it is evaluated by the evaluation region 104.

In the case where the document facing mechanism is positioned downstream of the evaluation region 104, the documents are transported past the evaluation region 104 and those documents which are not properly faced are then rotated by the document facing mechanism. Next, the properly faced document is fed back to the evaluation region 104 either along the same transport path or along a different transport path for processing. This embodiment avoids the scenario where an operator must reprocess wrong-way facing documents.

According to some embodiments, the controller 114 shown in FIG. 1*c* is coupled to the communications port 118 and to a storage medium 119. The storage medium 119 may be a hard drive, a network drive, a floppy disk, a RAM, a CompactFlash card, a database, or any other suitable storage medium. In one embodiment, the controller 114 stores characteristic information associated with the documents being processed in the storage medium 119. In the case of a currency bill, the characteristic information may include information about the size, thickness, color, magnetism, reflectivity, absorbability, transmissivity, electrical conductivity, or serial number of the currency bill. The characteristic information may also include denomination discrimination information or any other information mentioned herein. In the case of a substitute currency medium, the characteristic information may include a barcode pattern, a magnetic ink character recognition (MICR) pattern, characters readable by optical character recognition (OCR), including information printed according to the OCR-A and OCR-B fonts, a magnetic pattern, an optical variable device (OVD) pattern such as a hologram, a magnetic or electrically conductive thread, conductive ink, magnetic ink, an electrically conductive polymer, perforations, a coded watermark, or other encoded information mentioned herein.

Figure 1D:
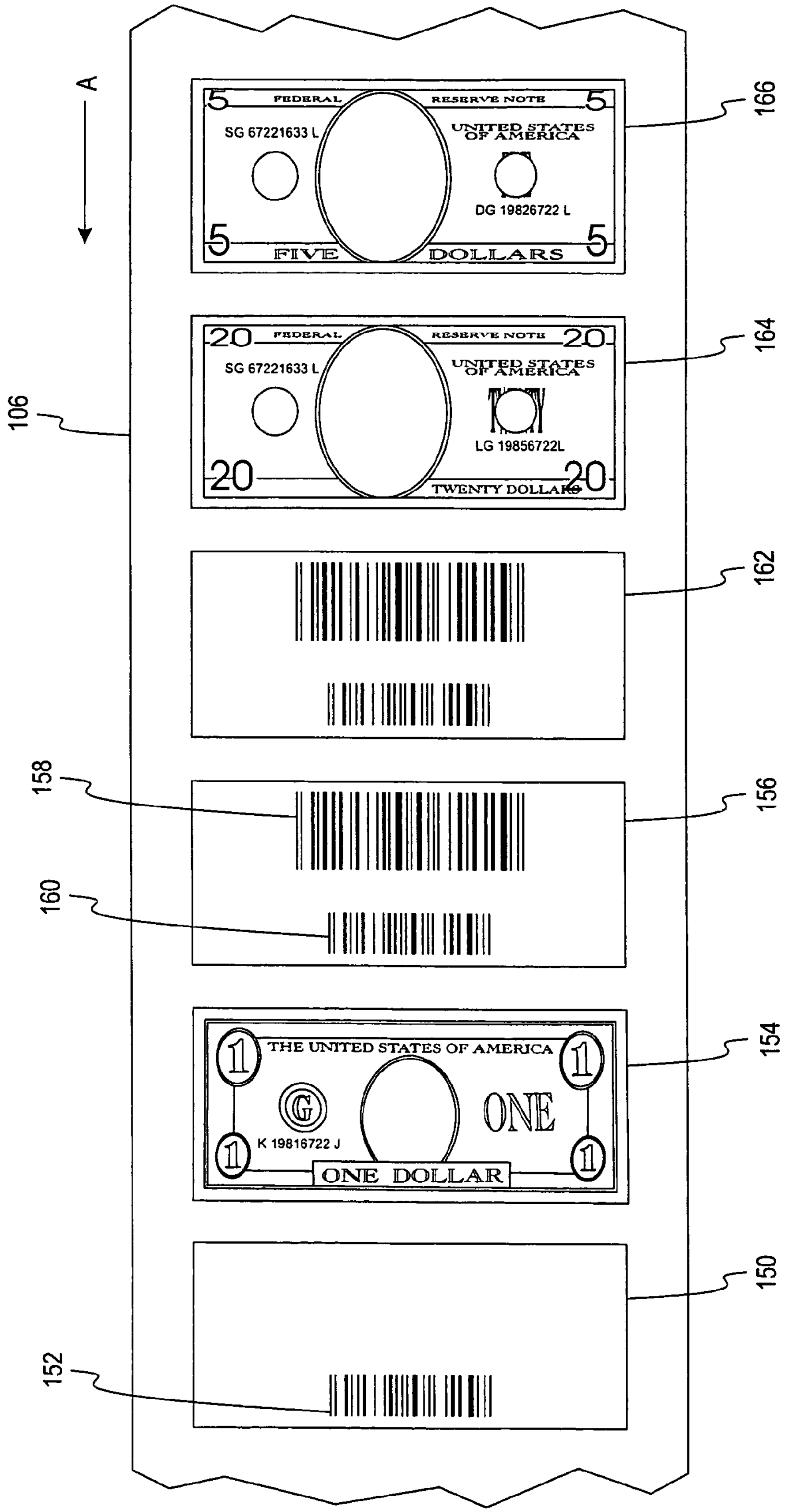
FIG. 1*d* is a top view of a transport path of a document processing device showing a sequence of exemplary documents to be processed.

FIG. 1*d* depicts an exemplary set of documents that might be presented on a portion of the transport mechanism 106.

The documents are transported in the direction of arrow A, and, in one embodiment, the first document to be transported is a batch identification card 150 or header card bearing a barcode pattern 152. Except where distinction is warranted, the term header card is used interchangeably for both header card, which precedes a batch, and trailer card, which follows a batch. The barcode pattern 152 disposed on the batch identification card 150 encodes a set of characters that is associated with the machine from which the documents that follow originated. For example, in a casino environment, there might be numerous slot machines, video-poker machines, and redemption machines which need to be emptied periodically and reconciled with the casino's accounting system. To identify from which machine a given batch of documents originated, a batch identification card is placed in the bill validator box of the machine. A number is encoded in the form of a barcode pattern 152 and imprinted or embedded on the batch identification card 150. The card 150 is then placed in the bill validator box such that when the contents of the box is emptied and placed into an input receptacle of a document processing device, the card 150 will be the first document processed by the document processing device. For the sake of example, the barcode pattern 152 encodes the number 00123, which represents slot machine number 123.

The next documents to be processed are the currency bills and substitute currency media contained in the bill validator boxes of the machine identified by the batch identification card 150. For illustrative purposes only, a few currency bills and substitute currency media are shown in FIG. 1*d*. In practice, the documents will not necessarily face the same direction or have the same orientation, nor will necessarily they be presented in the order shown. In the example illustrated, a one-dollar bill 154 is the next document to be transported along the transport mechanism 106. The one-dollar bill 154 is followed by a first barcoded ticket 156 that bears two barcode patterns 158, 160. The barcode pattern 158 represents a multidigit ticket number such as 12345 and the barcode pattern 160 represents a value such as $100. The barcode pattern 160 may include only numbers, such as 10000 to represent $100.00. Alternately, the barcode pattern 160 may be decoded into a symbol and a decimal number, such as $100.00 to represent one-hundred dollars or £50.50 to represent fifty pounds and fifty pence. The latter approach permits barcoded tickets to be dispensed in domestic and foreign currency amounts. The barcode pattern 158 may be decoded into a number having a fixed or variable number of digits or into alphanumeric characters and symbols.

The presence of the barcoded ticket 156 on the transport mechanism 106 means that a casino patron received the barcoded ticket 156, perhaps as part of a casino's promotion to entice the casino patron to play a game or perhaps because the patron won $100 at a gaming machine. Then, the casino patron exchanged the barcoded ticket 156 either for $100 cash or for game credits at a gaming machine. Thus, barcoded ticket 156 has been redeemed, and needs to be processed so that it can be reconciled with the casino's accounting system.

The next documents transported by the transport mechanism 106 are a second barcoded ticket 162, a twenty-dollar bill 164, and a five-dollar bill 166. Additional documents (not shown) will be transported by the transport mechanism 106 until there are no more documents in the input receptacle to be processed. If another batch identification card is detected, all subsequent documents (until another batch identification card is detected) will be associated with the batch identification card. In an alternate embodiment, batch identification cards are not used.

Although the documents shown in FIG. 1*d* have been discussed in connection with a casino environment, the same discussion applies equally to other environments where other types of documents are used, such as retailer stores where food coupons and gift certificates are used or amusement parks where promotional media are used.

The document processing device 100 shown and described in connection with FIGS. 1*a*, 1*b*, and 1*c* processes documents at a rate equal to or greater than 600 documents per minute. In other embodiments, documents are processed at a rate equal to or greater than 800 documents per minute. In still other embodiments, documents are processed at a rate equal to or greater than 1000 documents per minute. In yet other embodiments, documents are processed at a rate equal to or greater than 1200 documents per minute. In still other embodiments, documents are processed at a rate equal to or greater than 1500 documents per minute. In yet other embodiments, documents are processed at a rate less than 600 documents per minute.

The document processing device 100 shown and described in connection with FIGS. 1*a*, 1*b*, and 1*c* represents but one of numerous embodiments into which the evaluation region 104 may be incorporated. It is expressly understood that the document processing device 100 shown and described in connection with FIGS. 1*a*, 1*b*, and 1*c* may be modified in accordance with numerous other embodiments. For example, as explained next, the device 100 may be modified in accordance with any one or more of the following embodiments:

(1) a multi-pocket document processing device having a plurality of output receptacles and incorporating any embodiment of the evaluation region 104 shown or described in connection with FIGS. 1*a*, 1*b*, and 1*c*;

(2) a document processing device having a single output receptacle and incorporating any embodiment of the evaluation region 104 shown or described in connection with FIGS. 1*a*, 1*b*, and 1*c*;

(3) a document processing device having dual output receptacles and incorporating any embodiment of the evaluation region 104 shown or described in connection with FIGS. 1*a*, 1*b*, and 1*c*;

(4) any of the foregoing embodiments (1)-(3) may be coupled to a coin sorting device;

(5) a funds processing device capable of processing both documents and coins and incorporating any embodiment of the evaluation region 104 shown or described in connection with FIGS. 1*a*, 1*b*, and 1*c*;

(6) any of the foregoing embodiments (1)-(5) may be communicatively coupled to a computer network, such as a casino gaming network or a retailer network;

(7) any of the foregoing embodiments (1)-(6) may include a control unit for receiving operator instructions and displaying information to an operator;

(8) a system employing a plurality of document processing devices according to any of the foregoing embodiments (1)-(7); or (9) a system employing a document processing device according to any of the foregoing embodiments (1)-(7) capable of processing currency bills and barcoded tickets imprinted or embedded with at least two barcode patterns.

Document Processing Device Having Multiple Output Receptacles

Figure 2:
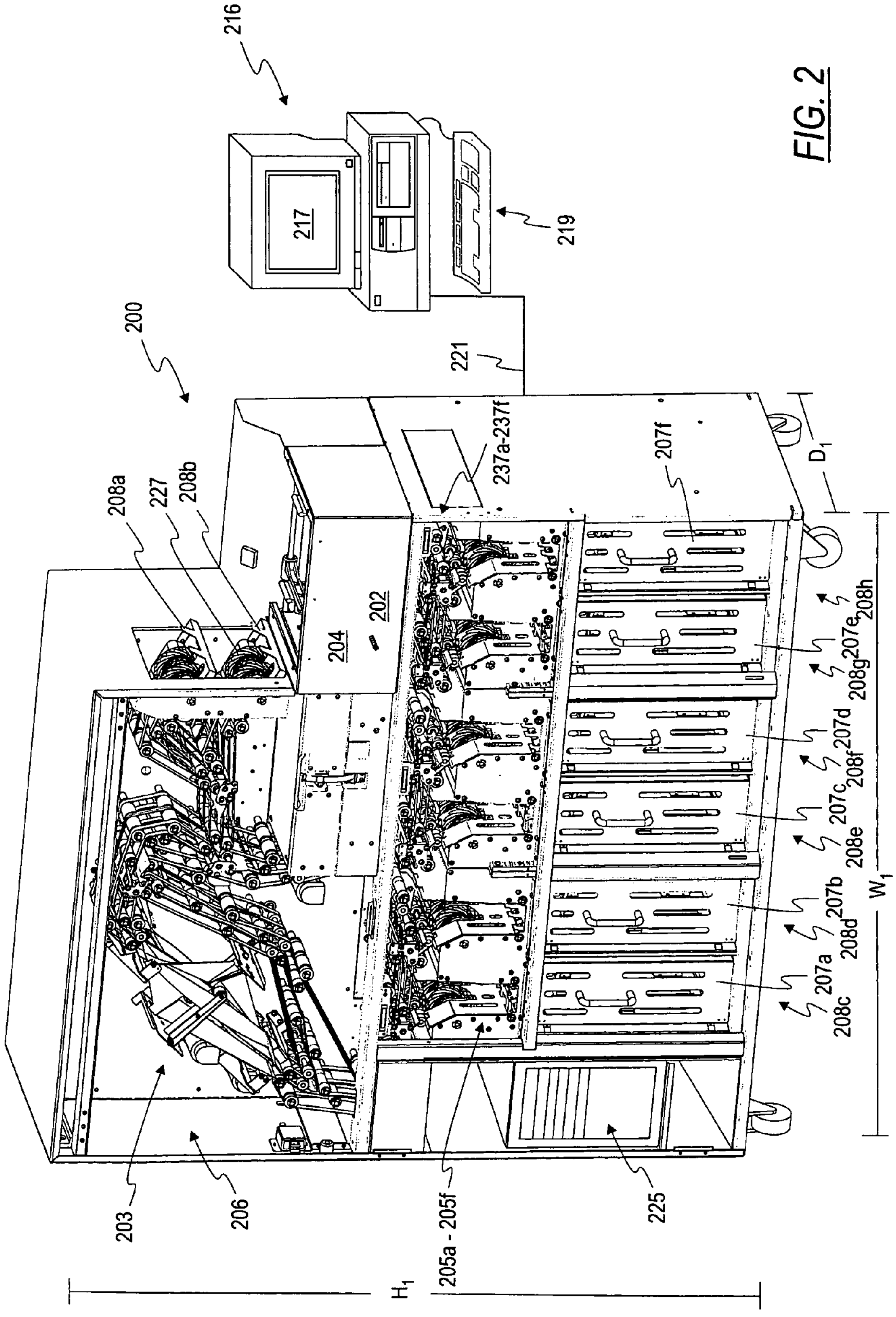
FIG. 2 is a perspective view of a document processing device according to one embodiment of the present invention.
Figure 3:
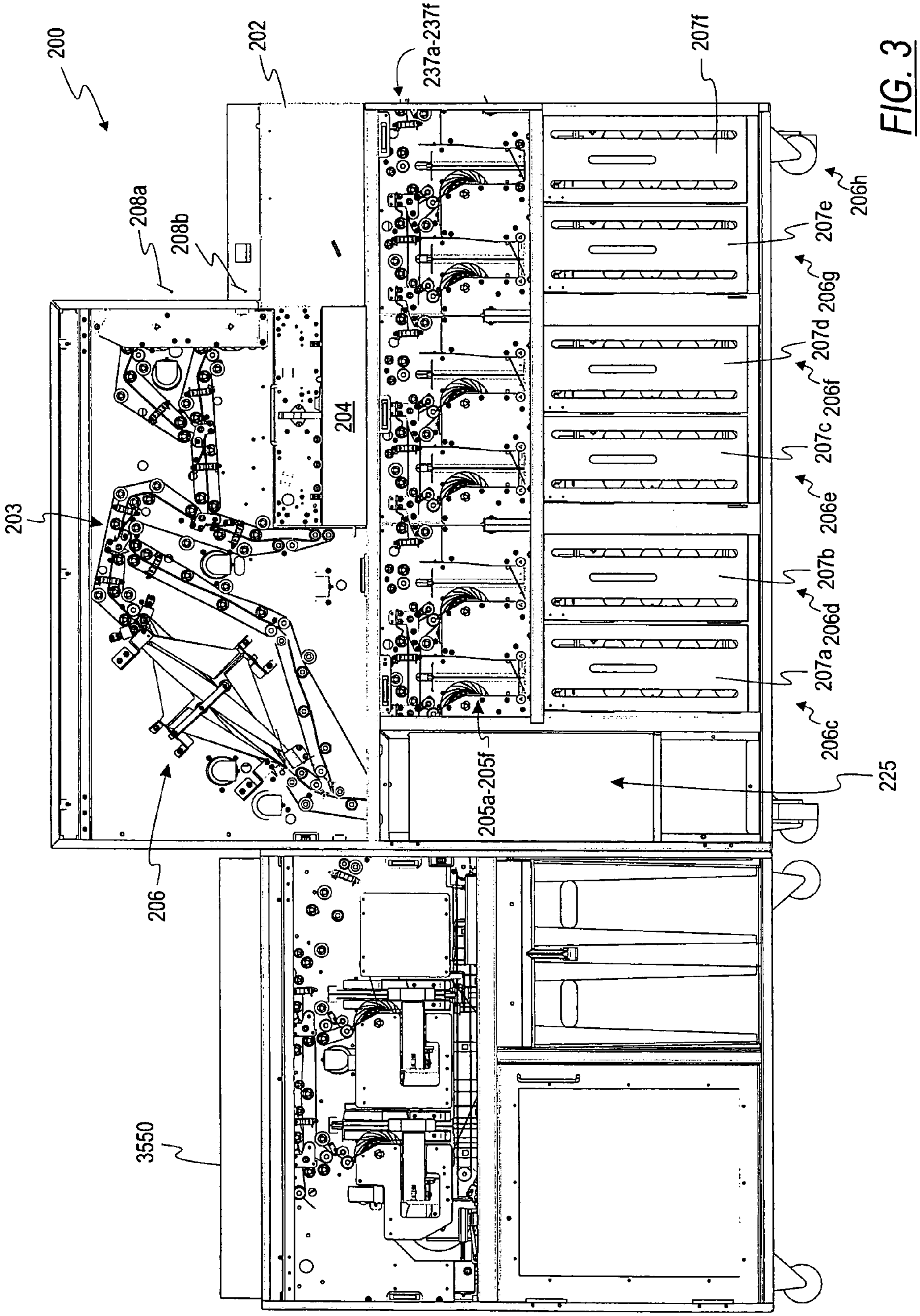
FIG. 3 is a front view of a document processing device according to one embodiment of the present invention.

As discussed above, according to some embodiments, the evaluation region 104 shown and described in connection with FIG. 1*b* is incorporated into a document processing device having multiple output receptacles. In accordance with such embodiments, FIGS. 2 and 3 illustrate several views of a multi-pocket document processing device 200. A stack of currency bills and substitute currency media are provided to an input receptacle 202 in any order or in a predetermined order. The currency bills and substitute media may be facing one orientation or facing mixed orientations. The currency bills and substitute currency media are fed, one by one, into a transport mechanism 206. The transport mechanism 206 transports currency bills and substitute currency media to one of a plurality of output receptacles 208*a*-208*h*, which may include upper output receptacles 208*a*, 208*b*, as well as lower output receptacles 208*c*-208*h*. Before a document reaches an output receptacle 208, the transport mechanism 206 guides it through an evaluation region 204 where a document can be, for example, analyzed, authenticated, denominated, counted, validated, and/or otherwise processed. In alternative embodiments of the device 200, the evaluation region 204 can determine document orientation, document size, or whether documents are stacked upon one another. The results of the above process or processes may be used to determine to which output receptacle 208 a document is directed. The illustrated embodiment of the document processing device 200 has an overall width, $W_1$, of approximately 4.87 feet (1.46 meters), a height, $H_1$, of approximately 4.85 feet (1.45 meters), and a depth, $D_1$, of approximately 1.67 feet (0.50 meters).

In the illustrated embodiment, interposed in the transport mechanism 206, intermediate the evaluation region 204 and the lower output receptacles 208*c*-208*h*, is a document facing mechanism designated generally by reference numeral 203. The document facing mechanism 203 is capable of rotating a document (i.e., a currency bill or substitute currency medium) 180° so that the face position of the document is reversed. That is, if a U.S. currency bill, for example, is initially presented with the surface bearing a portrait of a president facing down, it may be directed to the document facing mechanism 203, whereupon it will be rotated 180° so that the surface with the portrait faces up. The leading edge of the document remains constant while the document is being rotated 180° by the document facing mechanism 203. The decision may be taken to send a document to the document facing mechanism 203 when the selected mode of operation or other operator instructions call for maintaining a given face position of documents as they are processed by the device 200. For example, it may be desirable in certain circumstances for all of the currency bills ultimately delivered to the lower output receptacles 208*c*-208*h* to have the currency bill surface bearing the portrait of the president facing up. In such embodiments of the device 200, the evaluation region 204 is capable of determining the face position of a bill, such that a bill not having the desired face position can first be directed to the document facing mechanism 203 before being delivered to the appropriate output receptacle 208. Further details of a document facing mechanism which may be utilized for this purpose are disclosed in commonly assigned U.S. Pat. No. 6,074,334, entitled "Document Facing Method and Apparatus," which issued on Jun. 13, 2000, incorporated herein by reference in its entirety, and may be employed in conjunction with the present invention such as the device illustrated in FIGS. 2 and 3. Another document facing mechanism which may be employed in another embodiment is disclosed in commonly assigned, U.S. Pat. No. 6,371,303, entitled "Two Belt Bill Facing Mechanism," issued on Apr. 16, 2002, which is herein incorporated by reference in its entirety. Alternative embodiments of the device 200 do not include the document facing mechanism 203.

The document processing device 200 in FIG. 2 may be controlled from a separate control unit 216 which has a display/user-interface 217. In one embodiment of the present invention, the display/user-interface 217 incorporates a touch panel display which displays information including "functional" keys when appropriate. The display/user-interface 217 may be a full graphics display. Alternatively, additional physical keys or buttons, such as a keyboard 219, may be employed. The control unit 216 may be a self-contained desktop or laptop computer which communicates with the device 200 via a cable 221. In one embodiment, the device 200 includes a suitable communications port (not shown) for this purpose. In another embodiment, the control unit 216 communicates with the device 200 wirelessly via a wireless modem (not shown). In embodiments in which the control unit 216 is a desktop computer wherein the display/user-interface 217 and the desktop computer are physically separable, the desktop computer may be stored within a compartment 225 of the device 200. In other alternative embodiments, the control unit 216 is integrated into the device 200 so that the control unit 216 is contained within the device 200. In this embodiment, the display/user-interface 217 may comprise a touch screen or touch panel display that is coupled to the device 200.

The operator can control the operation of the device 200 through the control unit 216. By selecting various user-defined modes through the control unit 216, such as via an input device such as a keyboard 219, or a switch, button, or touch screen (not shown), the operator can direct currency bills and substitute media into specific output receptacles, such as output receptacles 208*a*-208*h*. Note that fewer or more output receptacles may be employed in alternate embodiments. In still other embodiments, the user can select pre-programmed modes or create new user-defined modes based on the particular requirements of the application. For example, the operator may select a user-defined mode which instructs the device 200 to sort currency bills by denomination; accordingly, the evaluation region 204 would denominate the bills and direct one dollar bills into the first lower output receptacle 208*c*, five dollar bills into the second lower output receptacle 108*d*, ten dollar bills into the third lower output receptacle 208*e*, twenty dollar bills into the forth lower output receptacle 208*f*, fifty dollar bills into the fifth lower output receptacle 208*g*, and one-hundred dollar bills into the sixth lower output receptacle 208*h*. The operator may also instruct the device 200 to deliver those bills whose denomination was not determined, i.e., no call bills, to the first upper output receptacle 208*a*. In such an embodiment, the upper output receptacle 208*a* would function as a reject pocket. In an alternative embodiment, the operator may instruct the device 200 to also evaluate the authenticity of each currency bill. In such an embodiment, authentic bills would be directed to the appropriate lower output receptacles 208*c*-208*h*. Those bills that were determined not to be authentic, i.e., suspect bills, would be delivered to the second upper output receptacle 208*b*. A multitude of user defined modes are disclosed in commonly assigned U.S. Pat. No. 6,278,795, previously incorporated by reference, which may be employed in conjunction with the present invention such as the device illustrated in FIGS. 2 and 3. According to another embodiment, the device 200 is adapted to process documents according to a strapping mode of operation as shown and described in U.S. Pat. No. 6,460,705, entitled "Method of Creating Identifiable Smaller Stacks of Currency Bills Within a Larger Stack of Currency Bills," which is incorporated herein by reference in its entirety. According to another embodiment, the device 200 is adapted to process and strap documents using a strapping unit 3550 as shown and described in co-pending U.S. patent application Ser. No. 10/460,071, entitled "Currency Processing and Strapping Systems and Methods," which was filed on Jun. 12, 2003, and is incorporated herein by reference in its entirety. According to still another embodiment, the device 200 is adapted to process documents according to a disable-pockets mode of operation as shown and described in co-pending U.S. patent application Ser. No. 09/688,538, entitled "Currency Handling System Having Multiple Output Receptacles," which was filed on Oct. 16, 2000 and is incorporated herein by reference in its entirety.

It should be noted that the control unit 216 provides the operator with a broad range of flexibility in selecting which output receptacles receive which documents. For example, the operator may instruct the device 200 to sort the currency bills by denomination and to deliver authentic currency bills according to their denomination into selected ones of the output receptacles 208*c*-208*h*. The operator may further instruct the device 200 to deliver no call bills and suspect bills into output receptacle 208*a*, and to deliver substitute currency media into output receptacle 208*b*. In addition, the device 200 may be unable to evaluate a particular document because, for example, it is damaged or excessively worn. The operator may instruct the device 200 to deliver any substitute currency media that cannot be evaluated to the output receptacle 108*a*. Alternatively, additional output receptacles (not shown) may be employed to receive any combination of no call bills, suspect bills, valid substitute currency media, or invalid substitute currency media. The delivery of such documents may occur without suspension of operation of the device 200, or with suspension of the operation of the device 200, as explained next.

According to some embodiments, the device 200 is configured so that when the evaluation region 204 is unable to identify certain criteria regarding a currency bill or substitute currency medium, the unidentified document is flagged and "presented" in one of the output receptacles 208*a*-208*h*, that is, the transport mechanism 206 is suspended or halted so that the unidentified document is located at a predetermined position within one of the output receptacles 208*a*-208*h*, such as being the last document transported to one of the output receptacles. In the case of currency bills, such criteria can include denominating information, authenticating information, information indicative of the currency bill's series, or other information the evaluation region 204 is attempting to obtain pursuant to a mode of operation. In the case of substitute currency media, such criteria may include, in addition to or exclusive of the criteria mentioned above, whether information, such as a valid barcode, is detected on the substitute currency media.

The user may determine in which output receptacle 208*a*-208*h* the flagged document is presented according to a selected mode of operation. For example, where the unidentified document is the last document transported to an output receptacle 208*a*-208*h*, it may be positioned within a stacker wheel or positioned at the top of the documents already within the output receptacle 208*a*-208*h*. While unidentified documents may be transported to any output receptacles 208*a*-208*h*, it may be more convenient for the operator to have unidentified documents transported to one of the upper output receptacles 208*a,b*, which are positioned such that the operator is able to easily see and/or inspect the document which has not been identified by the evaluation region 204. The operator may then either visually inspect the flagged document while it is resting on the top of the stack, or the operator may decide to remove the document from the output receptacle 208 in order to examine the flagged document more closely. In an alternative embodiment of the device 200, the control unit 216 may communicate to the user via the display/user-interface 217 information identifying which one of the output receptacles 108*a*-108*h* a flagged document is presented.

The device 200 may be adapted to continue operation automatically when a flagged document is removed from the upper output receptacle 208*a,b* or, according to one embodiment of the present invention, the device 200 may be adapted to suspend or halt operation and require input from the operator via the control unit 216. Upon examination of a flagged document by the operator, it may be found that the flagged document is genuine or valid even though it was not identified as such by the evaluation region 204 or the evaluation region 204 may have been unable to denominate the flagged document. However, because the document was not identified, the total value and/or denomination counters will not reflect its value. According to one embodiment, such an unidentified document is removed from the output receptacles 208 and reprocessed or set aside. According to another embodiment, the flagged documents may accumulate in the upper output receptacles 208*a,b* until the batch of documents currently being processed is completed or the output receptacle 208*a,b* is full and then reprocessed or set aside. In yet another embodiment, the control unit 216 of the device 200 includes denomination keys, such as disclosed in commonly assigned U.S. Pat. No. 5,790,697, which is herein incorporated by reference in its entirety. Upon inspection of a flagged currency bill, such as a no call bill, the operator may manually key in the denomination of the bill via a denomination key, and resume operation. In the case of a substitute currency media, the operator may manually enter into the device 200 via the control unit 216 information about the substitute currency media. Such information may include the barcode number when the substitute currency media is a barcoded ticket, the "denomination" of the substitute currency media, such as a $5 Disney Dollar, the value associated with the barcoded ticket, such as $100, and other identifying information.

According to other embodiments, when a document is flagged, the transport mechanism may be stopped before the flagged document is transported to one of the output receptacles. Such an embodiment is particularly suited for situations in which the operator need not examine the document being flagged; for example, the device 200 is instructed to first process United States currency and then British currency pursuant to a selected mode of operation where the device 200 processes United States $1, $5, $10, $20, $50, and $100 currency bills into the lower output receptacles 208*c*-208*h*, respectively. Upon detection of the first British pound note, the device 200 may halt operation allowing the operator to empty the lower output receptacles 208*c*-208*h* and to make any spatial adjustments necessary to accommodate the British currency. A multitude of modes of operation which may be employed in conjunction with the present invention are described in conjunction with bill flagging, presenting, and/or transport halting in commonly assigned U.S. Pat. No. 6,311,819 entitled "Method and Apparatus for Document Processing," which is herein incorporated by reference in its entirety.

In the illustrated embodiment, with regard to the upper output receptacles 208*a* and 208*b*, the second upper output receptacle 208*b* is provided with a stacker wheel 227 for accumulating a number of documents, while the first upper output receptacle 208*a* is not provided with such a stacker wheel. Thus, when, pursuant to a preprogrammed mode of operation or a user-selected mode or other operator instructions, a document is to be fed to the first upper output receptacle 208*a*, there may be a further instruction to momentarily suspend operation of the device 200 for the operator to inspect and remove the document. On the other hand, it may be possible to allow a number of documents to accumulate in the first upper output receptacle 208*a* before operation is suspended or halted. Similarly, the second upper output receptacle 208*b* may be utilized initially as an additional one of the lower output receptacles 208*c*-208*h*. However, in the illustrated embodiment shown in FIG. 2, there is no storage cassette associated with the second upper output receptacle 208*b*. Therefore, when the second upper output receptacle 208*b* is full, operation may be suspended to remove the documents at such time as yet further documents are directed to the second upper output receptacle 208*b* in accordance with the selected mode of operation or other operator instructions. According to an alternative embodiment of the device 200, both the first and the second upper output receptacles 208*a*, 208*b* are equipped with a stacker wheel. According to such an embodiment both the upper output receptacles 208*a*, 208*b* may also function as the lower output receptacle 208*c*-208*h*, thereby allowing a number of documents to be stacked therein. In yet another embodiment, the first upper output receptacle 208*a* and the second upper output receptacle 208*b* are not provided with a stacker wheel 227.

Figure 4A:
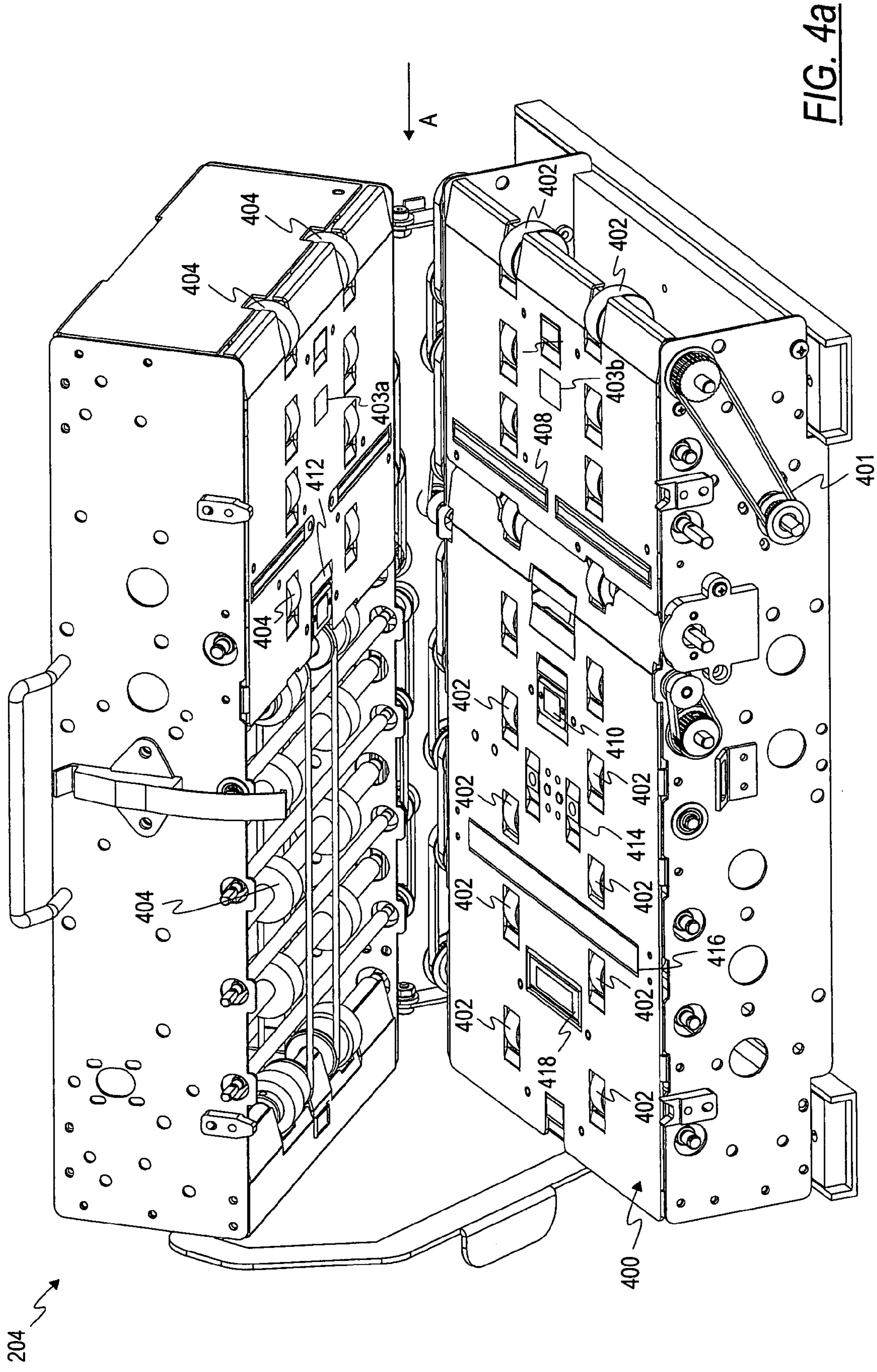
FIG. 4*a* is a perspective view of an evaluation region according to one embodiment of the document processing device of the present invention.
Figures 1, 4A:
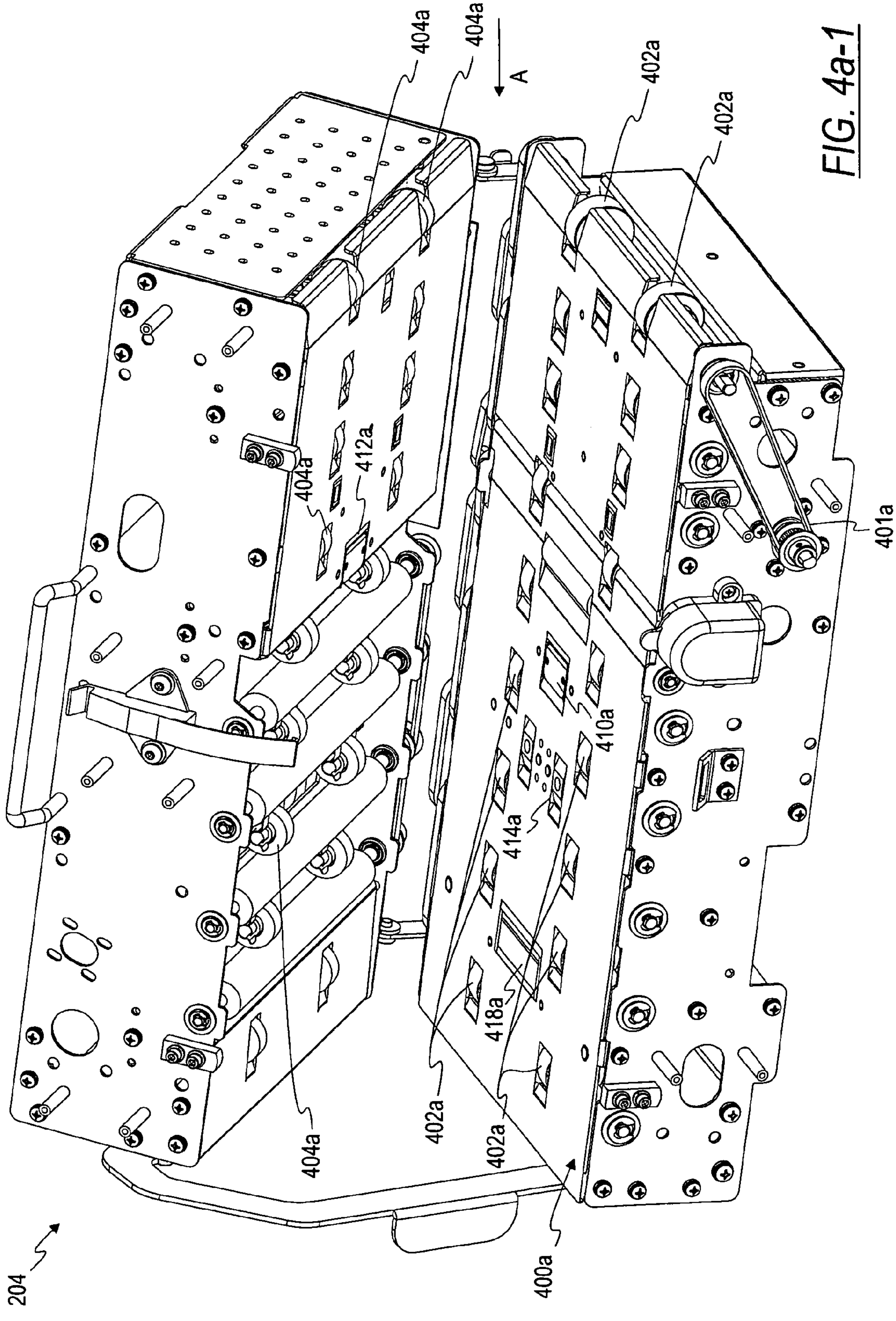
Figure 4B:
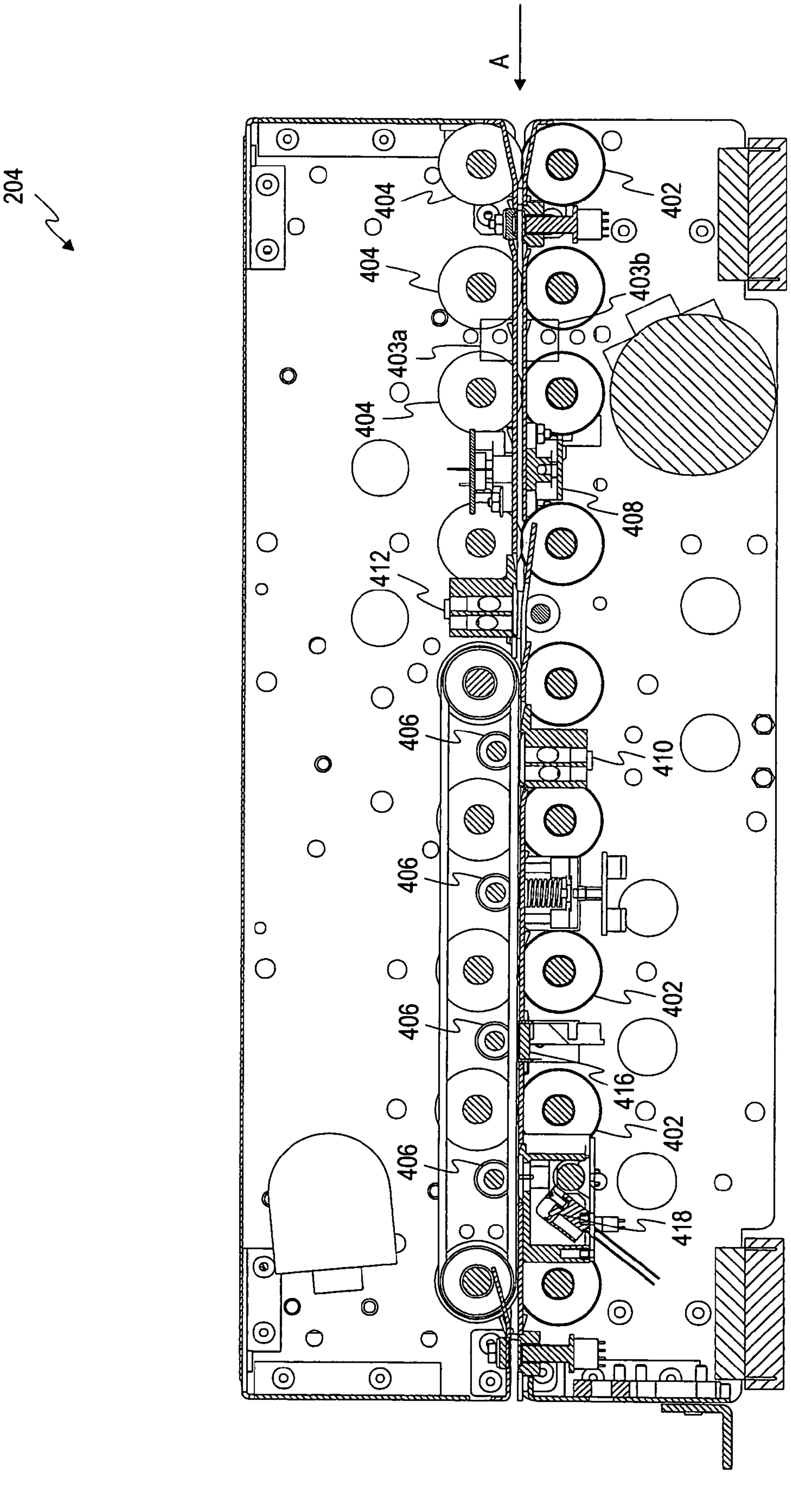
FIG. 4*b* is a side view of an evaluation region according to one embodiment of the document processing device of the present invention.
Figures 1, 4B:
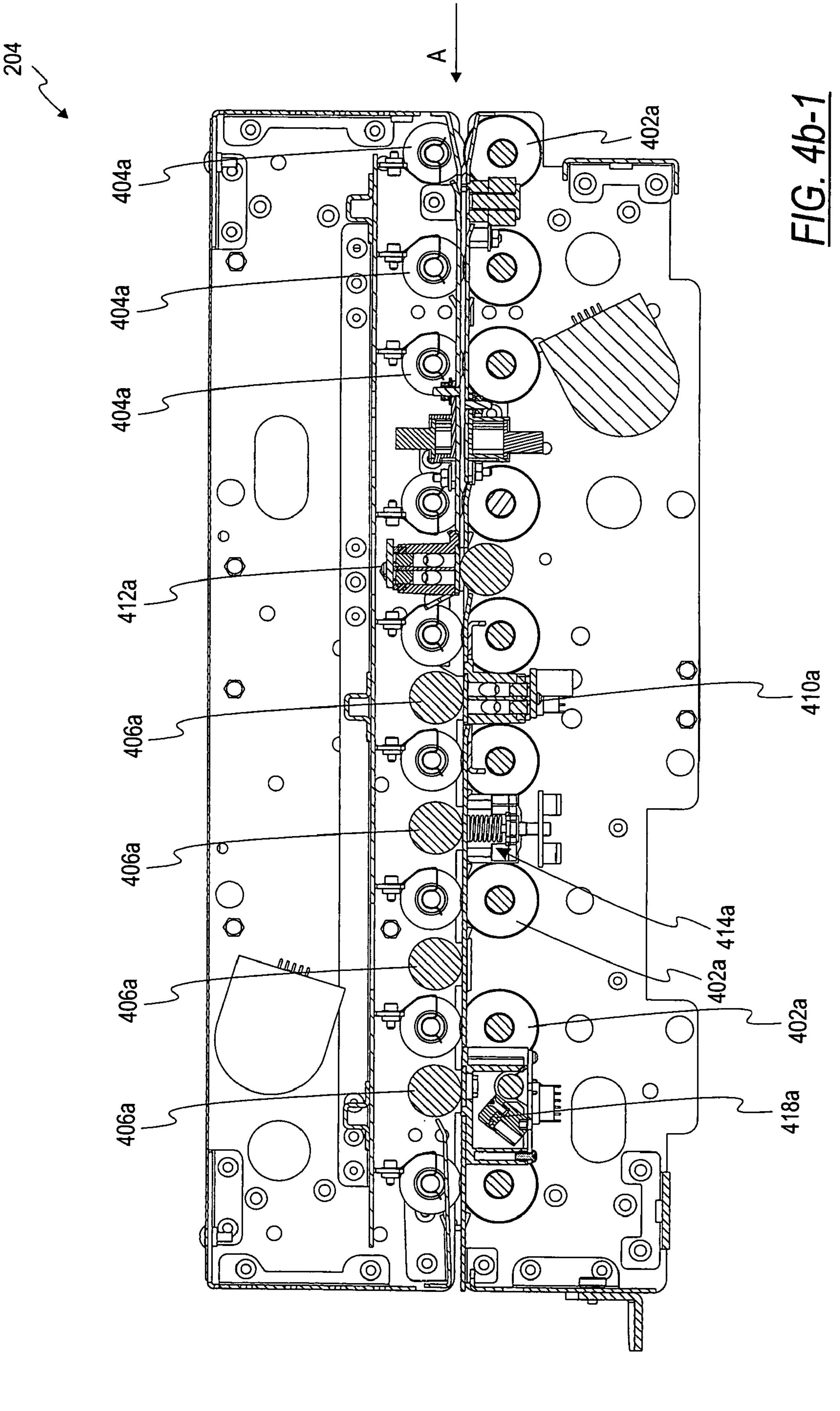

FIGS. 4*a* and 4*b* illustrate the evaluation region 204 according to one embodiment of the device 200. The evaluation region 204 can be opened for service, access to sensors, to clear document jams, etc., as shown in FIG. 4*a*. Additional details of the evaluation region 204 are provided with reference to the evaluation region 104 shown and described in FIG. 1*b*. As previously explained, the evaluation region 204 shown in FIG. 4*a* may employ any combination of the following detection means without limitation in one or more alternate embodiments: a size detection and density sensor 408, a lower optical scan head 410, an upper optical scan head 412, a single or multitude of magnetic sensors 414, a thread sensor 416, an infrared sensor (not shown), an ultraviolet/fluorescent light scan head 418, an upper media detector 403*a*, or a lower media detector 403*b*. As noted in connection with FIG. 1*b*, these detection means may be disposed in any order and on either or both sides of the transport plate 400 without departing from the present invention. These detection means and a host of others are disclosed in commonly assigned U.S. Pat. No. 6,278,795, entitled "Multi-Pocket Currency Discriminator," previously incorporated by reference, and U.S. patent application Ser. No. 09/965,428, entitled "A Document Processing System Using Full Image Scanning," filed on Sep. 27, 2001, also previously incorporated by reference. As noted above, in the specific case of substitute currency media, the variables may also relate to what distinguishing characteristics of the substitute currency media are being examined, such as any combination of the following without limitation: a barcode, a MICR pattern, OCR-readable information, including information printed according to the OCR-A and OCR-B fonts, a magnetic pattern, an OVD pattern such as a hologram, a magnetic thread or an electrically conductive thread, conductive ink, or an electrically conductive polymer.

The direction of document travel through the evaluation region 204 is indicated by arrow A in FIG. 4*a*. The documents (i.e., currency bills and/or substitute currency media) are positively driven along a transport plate 400 through the evaluation region 204 by means of a transport roll arrangement comprising both driven rollers 402 and passive rollers 404. The rollers 402 are driven by a motor (not shown) via a belt 401. Passive rollers 404 are mounted in such a manner as to be freewheeling about their respective axis and biased into counter-rotating contact with the corresponding driven rollers 402. The driven and passive rollers 402, 404 are mounted so that they are substantially coplanar with the transport plate 400. The transport roll arrangement also includes compressible rollers 406 to aid in maintaining the documents flat against the transport plate 400. Maintaining the document flat against the transport plate 400 so that the document lies flat when transported past the sensors enhances the overall reliability of the evaluation processes. A similar transport arrangement is disclosed in commonly-owned U.S. Pat. No. 5,687,963, entitled "Method and Apparatus for Discriminating and Counting Documents," which is incorporated herein by reference in its entirety.

Additional details concerning the input receptacle 202, transport mechanism 206, and diverters 237 are disclosed in commonly assigned U.S. Pat. No. 6,398,000, entitled "Currency Handling System Having Multiple Output Receptacles," issued on Jun. 4, 2002, which is herein incorporated by reference in its entirety.

FIGS. 4*a*-1 and 4*b*-1 illustrate the evaluation region 204 according to another embodiment of the device 200. Similar to the previous embodiment, the evaluation region 204 can be opened for service, access to sensors, to clear document jams, etc., as shown in FIG. 4*a*-1. Additional details of the evaluation region 204 are provided with reference to the evaluation region 104 shown and described in FIG. 1*b*. The evaluation region 204 shown in FIG. 4*a*-1 may employ any combination of the following detection means without limitation in one or more alternate embodiments: a density sensor 408*a*, a lower optical scan head 410*a*, an upper optical scan head 412*a*, a single or multitude of magnetic sensors 414*a*, an infrared sensor (not shown), an ultraviolet/fluorescent light scan head 418*a*. The density sensor 408*a* can detect both density and one dimension of a document. As noted in connection with FIG. 1*b*, these detection means may be disposed in any order and on either or both sides of the transport plate 400*a* without departing from the present invention.

The direction of document travel through the evaluation region 204 is indicated by arrow A in FIG. 4*a*. The documents (i.e., currency bills and/or substitute currency media) are positively driven along a transport plate 400*a* through the evaluation region 204 by means of a transport roll arrangement comprising both driven rollers 402*a* and passive rollers 404*a*. The rollers 402*a* are driven by a motor (not shown) via a belt 401*a*. Passive rollers 404*a* are mounted in such a manner as to be freewheeling about their respective axis and biased into counter-rotating contact with the corresponding driven rollers 402*a*. The driven and passive rollers 402*a*, 404*a* are mounted so that they are substantially coplanar with the transport plate 400*a*. The transport roll arrangement also includes compressible rollers 406*a* to aid in maintaining the documents flat against the transport plate 400*a*. Maintaining the document flat against the transport plate 400*a* so that the document lies flat when transported past the sensors enhances the overall reliability of the evaluation processes.

Referring back to FIG. 2, the illustrated embodiment of the device 200 includes a total of six lower output receptacles 208*c*-208*h*. More specifically, each of the lower output receptacles 208*c*-208*h* includes a first portion designated as an escrow compartment 205*a*-205*f* and a second portion designated as a storage cassette 207*a*-207*f*. Typically, documents are initially directed to the escrow compartments 205, and thereafter at specified times or upon the occurrence of specified events, which may be selected or programmed by an operator, documents are then fed to the storage cassettes 207. The storage cassettes 207 are removable and replaceable, such that stacks of documents totaling a predetermined number of documents or a predetermined monetary value may be accumulated in a given storage cassette 207, whereupon the cassette may be removed and replaced with an empty storage cassette. In the illustrated embodiment, there are six lower output receptacles 208*c*-208*h* which include escrow compartments 205 and storage cassettes 207*a*-207*f*. In alternative embodiments, the device 200 may contain more or less than six lower output receptacles which include escrow compartments 205 and storage cassettes 207. In other alternative embodiments, modular lower output receptacles 208 may be implemented to add many more lower output receptacles to the device 200. Each modular unit may comprise two lower output receptacles. In other alternative embodiments, several modular units may be added at one time to the device 200.

A series of diverters 237*a*-237*f*, which are a part of the transport mechanism 206, direct the documents to one of the lower output receptacles 208*c*-208*h*. When the diverters 237 are in an upper position, the documents are directed to the adjacent lower output receptacle 208. When the diverters 237 are in a lower position, the documents proceed in the direction of the next diverter 237. Alternatively, the operator may instruct the device 200 to direct substitute currency media to one or more of the upper output receptacles 208*a*-208*b* such that only currency bills are presented to the diverters 237*a*-237*f*.

Additional details concerning the lower output receptacles 208*c*-208*h*, the escrow compartments 205, and the storage cassettes 207 are disclosed in commonly assigned U.S. Pat. No. 6,398,000, entitled "Currency Handling System Having Multiple Output Receptacles," incorporated by reference above. It should be emphasized that the operator may also instruct the device 200 to direct substitute currency media to one or more of the lower output receptacles 208. In the illustrated embodiment, only currency bills are directed to the lower output receptacles 208, however, in alternative embodiments, substitute currency media could also be directed to one or more of the lower output receptacles 208.

In some embodiments, the device 200 is dimensioned to process a stack of different sized currencies at the same time. In other embodiments, the device 200 can also be dimensioned to process a stack of different sized currencies and substitute currency media at the same time. For example, one application may require the processing of United States dollars (2.5 inches×6 inches, 6.5 cm×15.5 cm) and French currency (as large as 7.17 inches×3.82 inches, 18.2 cm×9.7 cm). The application may simply require the segregation of the U.S. currency from the French currency wherein the device 200 delivers U.S. currency to the first lower output receptacle 208*c* and the French currency to the second output receptacle 208*d*. In still other embodiments, the device 200 processes a mixed stack of U.S. ten and twenty dollar bills and French one hundred and two hundred Franc notes wherein the currency documents are denominated, counted, and authenticated. In such embodiments, the U.S. ten and twenty dollar bills are delivered to the first 208*c* and second 208*d* lower output receptacles, respectively, and the French one hundred and two hundred Franc notes are delivered to the third 208*e* and fourth 208*f* lower output receptacle, respectively. In yet other embodiments, the device 200 denominates, counts, and authenticates six different types of currency wherein, for example, Canadian currency is delivered to the first lower output receptacle 208*c*, United States currency is delivered to the second output receptacle 208*d*, Japanese currency is delivered to the third lower output receptacle 208*e*, British currency is delivered to the fourth lower output receptacle 208*f*, French currency is delivered to the fifth lower output receptacle 208*g*, and German currency is delivered to the sixth lower output receptacle 208*h*. In still other embodiments, no call bills or other denominations of foreign currency, such as Mexican currency for example, may be directed to the second upper output receptacle 208*b*. In other embodiments, suspect bills are delivered to the first upper output receptacle 208*a*. In still other embodiments, U.S. currency and cashout tickets are delivered to different output receptacles. These embodiments represent just a few examples of the numerous combinations of U.S. currency bills, foreign currency bills, and substitute media that can be delivered to the output receptacles 208.

Additional details concerning the processing of foreign currency are disclosed in commonly assigned U.S. Pat. No. 5,875,259, entitled "Method and Apparatus for Discriminating and Counting Documents"; commonly assigned U.S. Pat. No. 5,960,103, entitled "Method and Apparatus for Authenticating and Discriminating Currency"; commonly assigned U.S. patent application Ser. No. 09/626,324, entitled "Currency Handling System Employing an Infrared Authenticating System," filed Jul. 26, 2000; and commonly assigned U.S. Pat. No. 6,493,461, entitled "Customizable International Note Counter," each of which is incorporated herein by reference in its entirety.

In other alternative embodiments of the device 200, the user can vary the type of documents delivered to the output receptacles 208. For example, in one alternative embodiment an operator can direct, via the control unit 216 (shown in FIG. 2), that a stack of one, five, ten, twenty, fifty, and one-hundred United States dollar bills be denominated, counted, authenticated, and directed into lower output receptacles 208*c*-208*h*, respectively. In still another alternative embodiment, the device 200 is also instructed to deliver other currency bills, such as a United States two dollar bill or foreign currency bills that have been mixed into the stack of documents, to the second upper output receptacle 208*b*. In still another alternative embodiment, the device 200 is also instructed to count the number and aggregate value of all the currency bills processed and the number and aggravate value of each individual denomination of currency bills processed. These values may be communicated to the user via the display/user-interface 217 of the device 200. In addition, or alternatively, these values are communicated to a remote device via a communications port (not shown).

In still other alternative embodiments, no call bills and bills that are stacked upon one another are directed to the second upper output receptacle 208*b*. In yet other alternative embodiments, the operator can direct that all documents failing an authentication test be delivered to the first upper output receptacle 208*a*. In still further embodiments, the operator instructs the device 200 to deliver no call bills, suspect bills, stacked bills, etc. to one of the lower output receptacles 208*c*-208*h*. In yet other alternative embodiments, the currency bills are directed to one or more of the lower output receptacles 208*c*-208*h*, no call bills and suspect bills are directed to the upper output receptacle 208*a*, and substitute currency media are directed to the upper output receptacle 208*b*. In still other embodiments, U.S. currency bills are directed to selected ones of the lower output receptacles 208, foreign currency bills are directed to other lower output receptacles 208, no call bills, suspect bills, and invalid substitute currency media (i.e., media which cannot be identified) are directed to the first upper output receptacle 208*a*, and valid substitute currency media are directed to the second upper output receptacle 208*b*. Alternatively, a third upper output receptacle (not shown) may receive invalid substitute currency media so as to keep all substitute currency media separate from currency bills.

In still other alternate embodiments, genuine U.S. currency bills and foreign currency bills and identified substitute currency are directed to selected ones of the lower output receptacles 208, unidentified substitute currency media are directed to the first upper output receptacle 208*a*, and no call currency bills and suspect currency bills are directed to the second upper output receptacle 208*b*. In short, the device 200 as illustrated having eight output receptacles 208*a*-208*h* provides a great deal of flexibility to the operator. And in other alternative embodiments of the currency handling device 200 with a fewer or greater number of output receptacles 208, numerous different combinations for processing documents are available. What output receptacle receives which type of document, whether a U.S. currency bill, a foreign currency bill, or a substitute currency medium, is entirely customizable by the operator.

In the illustrated embodiment shown in FIG. 2, the various operations of the device 200 are controlled by processors disposed on a number of printed circuit boards (PCBs) located throughout the device 200. Further details concerning the PCBs are disclosed in commonly assigned U.S. Pat. No. 6,398,000, entitled "Currency Handling System Having Multiple Output Receptacles," previously incorporated by reference.

Document Processing Device Having a Single Output Receptacle

Figure 5:
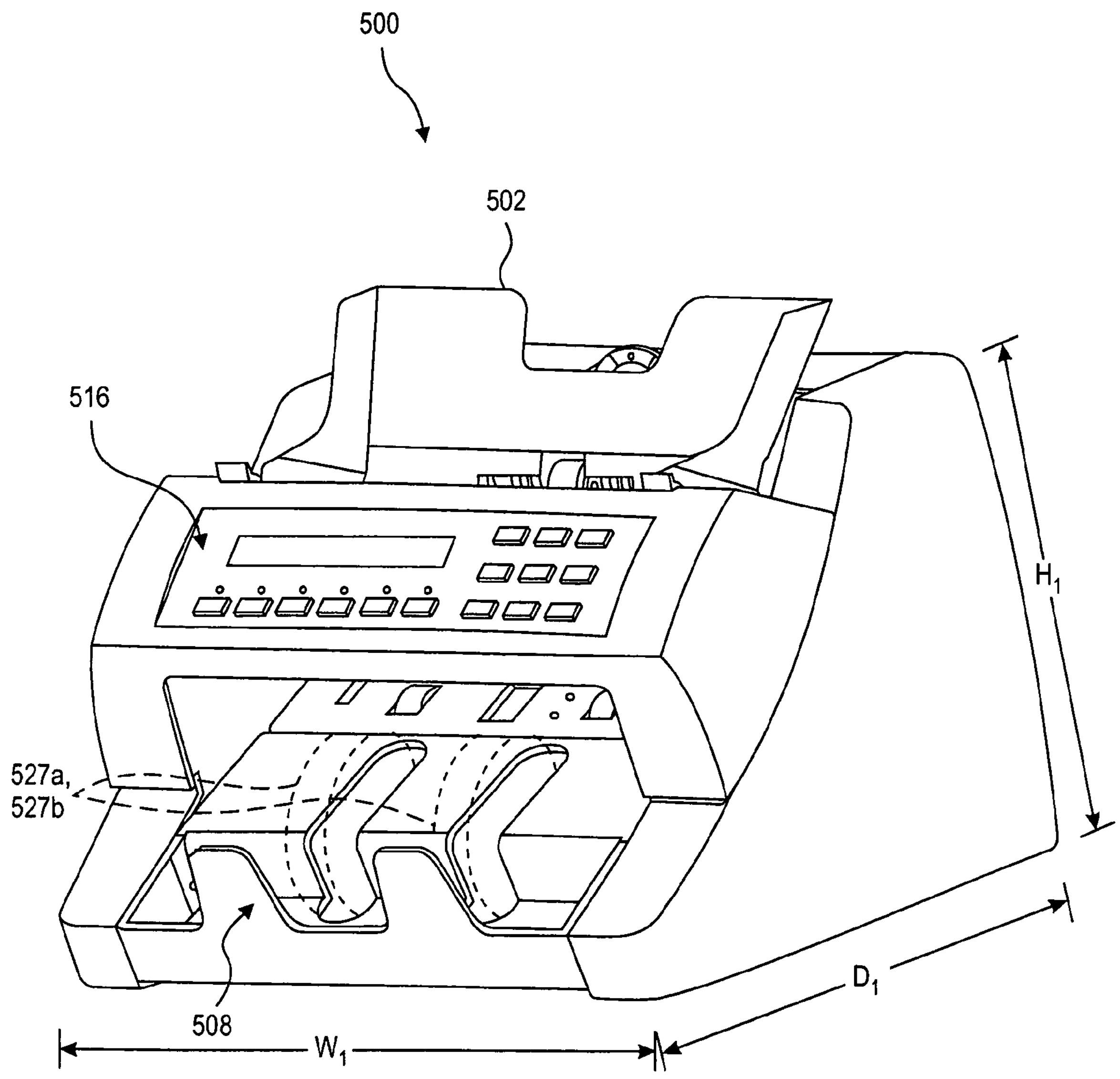
FIG. 5 is a perspective view of a compact document processing device having a single output receptacle according to one embodiment of the present invention.
Figure 6:
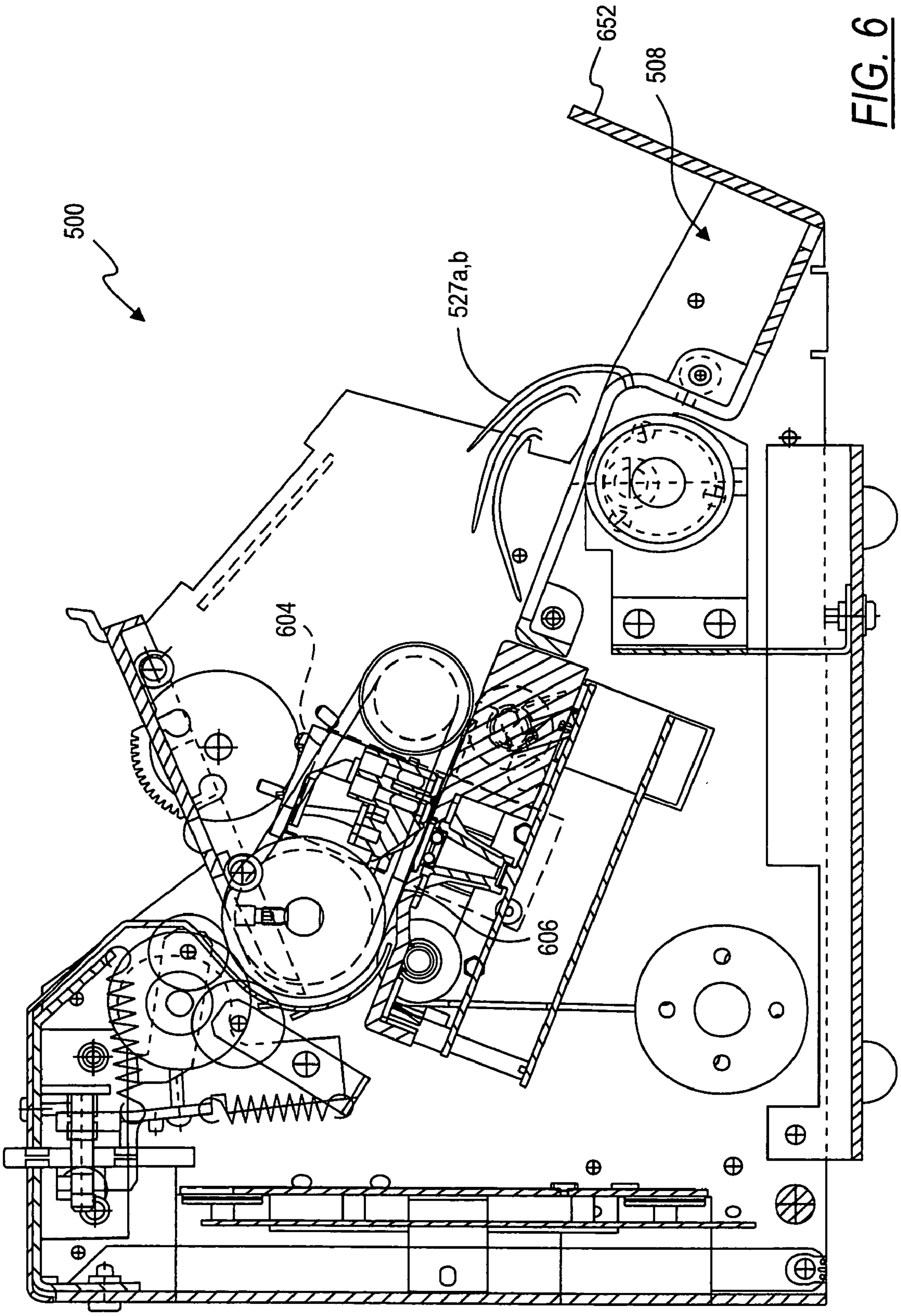
FIG. 6 is a side cross-sectional view of the device shown in FIG. 5.

The evaluation region 104 shown and described in connection with FIGS. 1*a* and 1*b* can also be incorporated into a document processing device having a single output receptacle. FIGS. 5 and 6 illustrate a compact document processing device 500 according to one embodiment of the present invention. This device 500 is shown and described in more detail in commonly assigned U.S. Pat. No. 5,687,963 which is incorporated by reference in its entirety. In one embodiment, the device 500 is modified to include an evaluation region 104 as shown and described in connection with FIG. 1*b*. Documents are fed, one by one, from a stack of documents placed in an input receptacle 502 onto a transport mechanism. The transport mechanism includes a transport plate or guide plate 606 for guiding a document to an output receptacle 608. Before reaching the output receptacle 508, the document can be, for example, evaluated, analyzed, counted and/or otherwise processed by an evaluation region 604. In one embodiment of the device 500, documents are processed at a rate in excess of 600 documents per minute. In another embodiment, documents are processed at a rate in excess of 800 documents per minute. In yet another embodiment, documents are processed at a rate in excess of 1000 documents per minute. In another embodiment, documents are processed at a rate in excess of 1200 documents per minute. In still another embodiment, documents are processed at a rate in excess of 1500 documents per minute.

The device 500 in FIG. 5 has a touch panel display 516 in one embodiment of the present invention which displays "functional" keys when appropriate. The touch panel display 516 simplifies the operation of the device 500. Alternatively or additionally physical keys, switches, or buttons may be employed, such as, for example, a keypad. In one embodiment, the touch panel display 516 includes denomination keys, such as disclosed in commonly assigned U.S. Pat. No. 5,790,697, previously incorporated by reference. The operator may also manually enter, via the touch panel display 516, information about the substitute currency media, such as the information described above in connection with FIGS. 2-3.

A pair of driven stacking wheels 527*a* and 527*b* are located in the output receptacle 508 and come into contact with the documents as the documents are transported into the output receptacle 508. The stacking wheels 527*a* and 527*b* are supported for rotational movement about respective shafts journalled on a rigid frame and driven by a motor (not shown). Flexible blades of the stacker wheels 527*a* and 527*b* deliver the documents onto a forward end of a stacker plate 652 shown in FIG. 6. In an alternate embodiments, the device 500 includes a stacking wheel 527*a* only, a stacking wheel 527*b* only, or neither a stacking wheel 527*a* nor a stacking wheel 527*b*.

According to one embodiment, the document scanning device 500 is compact, having a height ($H_1$) of about 9½ to 10½ inches, width ($W_1$) of about 10¾ to 11¾ inches, and a depth ($D_1$) of about 12 to 16 inches.

Like the device 200 shown and described in connection with FIGS. 2-4*b*, the device 500 shown and described in connection with FIGS. 5, 6 is adapted to halt or suspend operation when a no call or a suspect bill or an invalid substitute currency medium is detected. An operator of the device 500 may specify via the touch panel display 516 the location of the unidentified document, such as the last document to be presented to the output receptacle 508 before operation is halted or suspended. The operator may further manually enter information about the invalid substitute currency medium, such as the information described above in connection with FIGS. 2-3. In an embodiment in which the device 500 includes denomination keys, the operator may select one of the denomination keys after inspection of a no call bill or a suspect bill, and resume operation as if the no call bill or suspect bill had not been flagged.

Document Processing Device Having Dual Output Receptacles

Figure 7A:
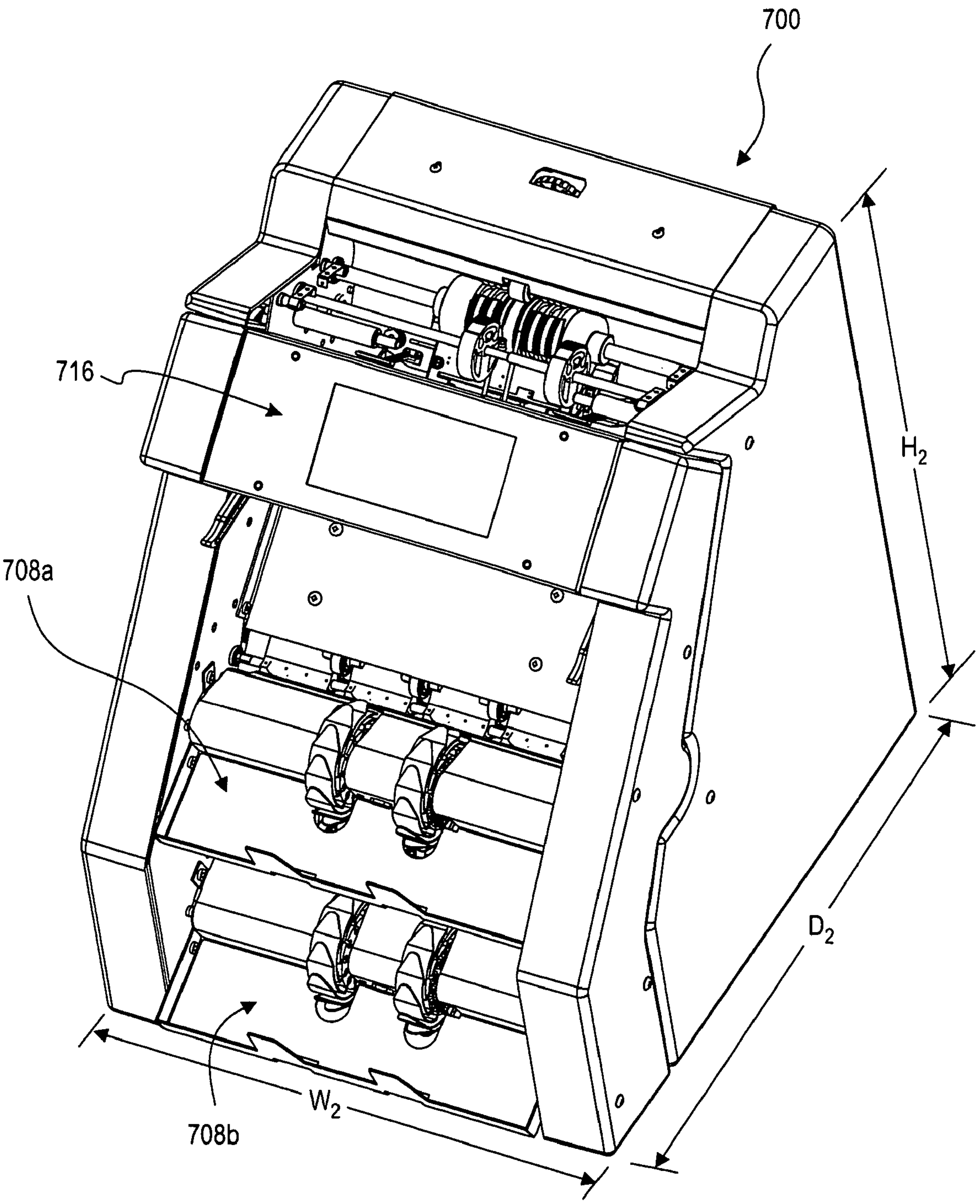
FIG. 7a is a perspective view of a compact document processing device having dual output receptacles according to one embodiment of the present invention.
Figure 7B:
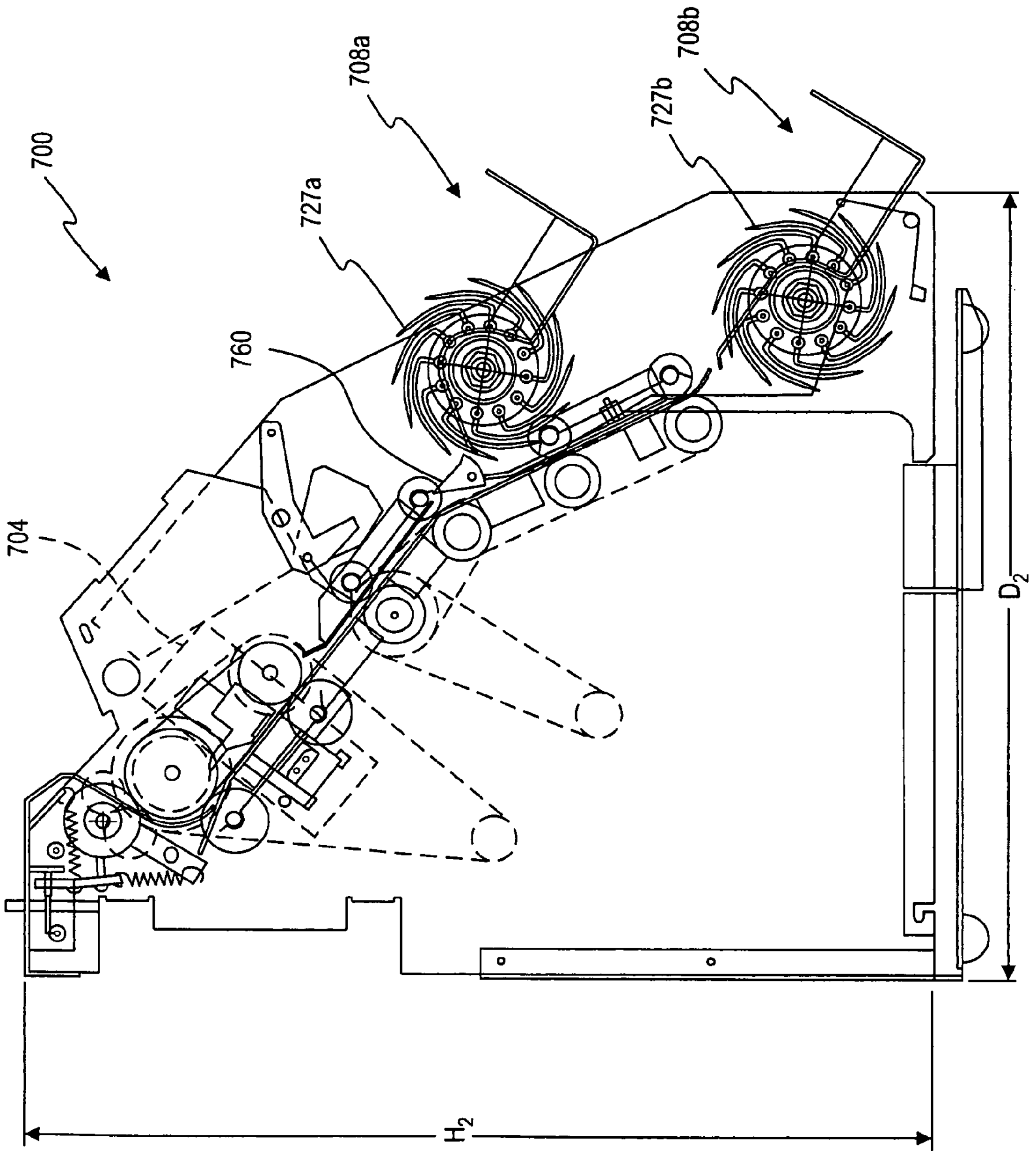

FIGS. 7*a* and 7*b* illustrate an exterior perspective view and a side cross-sectional view, respectively, of a compact, document processing device 700 having dual output receptacles. The process for carrying documents through the device 700 is the same as discussed above, except that the device 700 has first and second output receptacles, 708*a*, 708*b*, respectively. A diverter 760, shown in FIG. 7*b*, directs the documents to either the first or second output receptacle 708*a*, 708*b*. When the diverter 760 is in a lower position, documents are directed to the first output receptacle 708*a*. When the diverter 760 is in an upper position, documents proceed in the direction of the second output receptacle 708*b*. Details of devices with multiple output receptacles are described in WO 97/45810 which is incorporated by reference in its entirety.

FIG. 7*b* shows a pair of stacker wheels 727*a*, 727*b* for delivering documents to the first and second output receptacles 708*a*, 708*b*. However, in alternate embodiments, the device 700 includes the stacker wheel 727*a* only, the stacker wheel 727*b* only, or neither the stacker wheel 727*a* nor the stacker wheel 727*b*.

The device 700 includes an evaluation region 704, such as the evaluation region 104 shown and described in connection with FIGS. 1*a* and 1*b*.

According to one embodiment the device 700 is compact having a height ($H_2$) of about 17½ inches, width ($W_2$) of about 13½ inches, and a depth ($D_2$) of about 15 inches. According to another embodiment, the device 700 has dimensions of: a height ($H_2$) of about 18 inches; a width ($W_2$) of about 13¾ inches; and a depth ($D_2$) of about 16 inches. The device 700 may be rested upon a tabletop, countertop, desk, or the like.

Like the embodiments described above in connection with a device having multiple output receptacles, the device 700 may be instructed by an operator via a control unit 716, which may include a touch panel display or other suitable interface, to direct certain documents to one or the other of the first and second output receptacles 708*a*, 708*b*. These modes may be pre-programmed or operator-defined. For example, according to one embodiment, genuine currency bills and valid substitute currency media are directed to the first output receptacle 708*a*, whereas non-genuine currency bills and invalid substitute currency media are directed to the second output receptacle 708*b*. According to another embodiment, genuine currency bills are directed to the first output receptacle 708*a*, valid substitute currency media are directed to the second output receptacle 708*b*, and the device 700 is programmed to halt or suspend operation when a non-genuine currency bill or invalid substitute currency medium is detected by the evaluation region of the device 700. In one embodiment, the control unit 716 may include denomination keys, such as explained above. The control unit 716 may also be adapted to permit the operator to manually enter information about a flagged substitute currency medium, such as the information described above in connection with FIGS. 2-3.

Document Processing Device Coupled to a Coin Sorting Device

In other embodiments, the evaluation region 104 shown and described in connection with FIGS. 1*a* and 1*b* may be employed in a document processing device according to any of the embodiments just described which is coupled to a coin sorting device. In different embodiments, the coin sorting device is adapted to sort coins only or a combination of coins and tokens.

Figure 8:
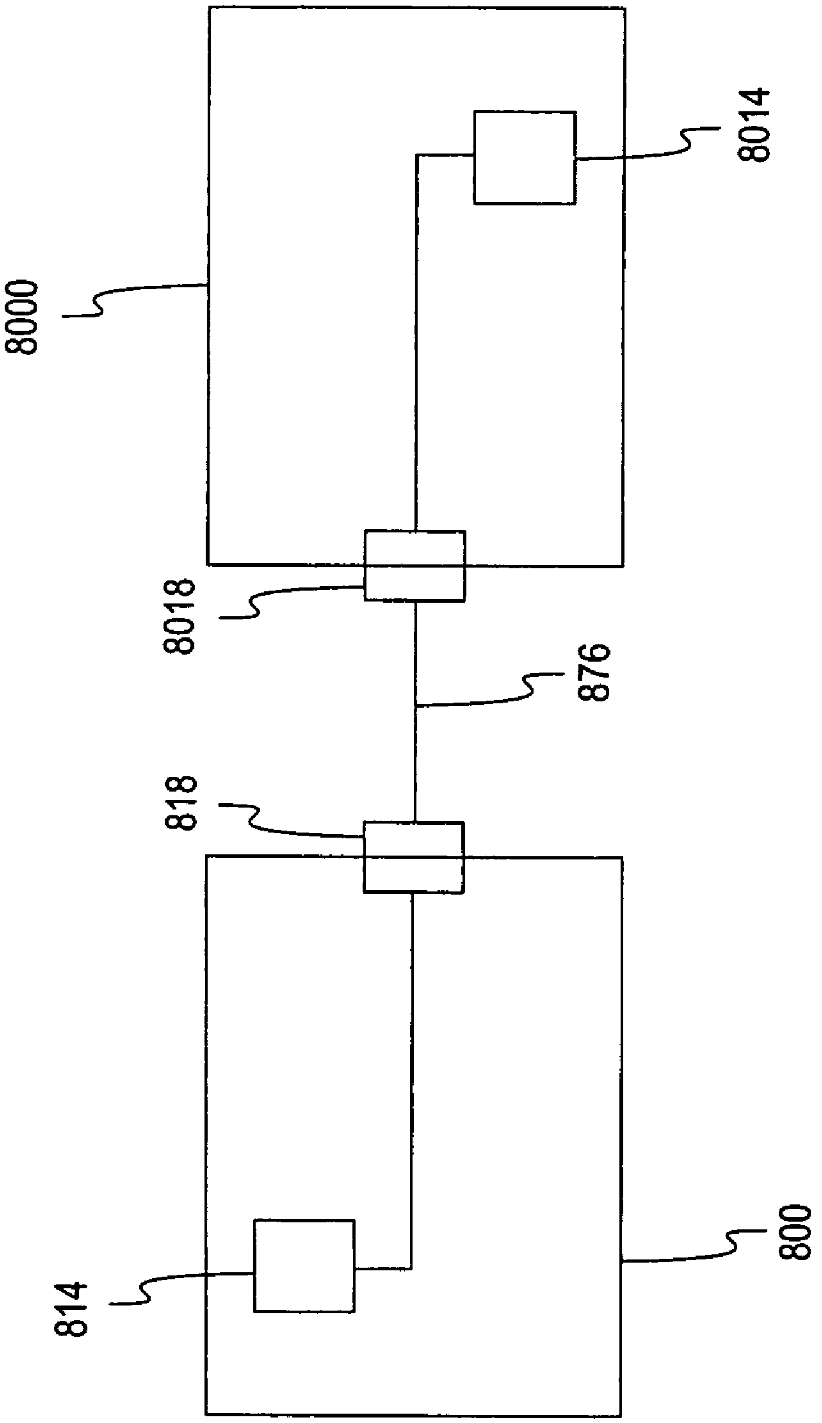
FIG. 8 is a functional block diagram of a document processing device coupled to a coin sorting device according to one embodiment of the present invention.

FIG. 8 illustrates a functional block diagram of a document processing device 800 coupled to a coin sorting device 8000 in accordance with one embodiment of the present invention. The document processing device 800 includes a communications port 818 and a controller 814, and is communicatively coupled to the coin sorting device 8000 via a cable 876. The coin sorting device 8000 includes a communications port 8018 and a controller 8014. The communications ports 818, 8018 may be any suitable communications port such as a serial or parallel port, USB port, and the like. In an alternate embodiment, the document processing device 800 and the coin sorting device 8000 communicate wirelessly, and the cable 876 is not included. In this alternate embodiment, the communications ports 818, 8018 are adapted to receive and transmit information wirelessly.

An operator places a stack of documents into the document processing device 800 for processing, and places a plurality of coins and/or tokens into the coin sorting device 8000 for sorting and counting. The document processing device 800 processes the stack of documents, and the controller 814 in the document processing device 800 stores information representative of the documents being processed, such as the denomination of the currency bills, the value of the substitute currency media, the number of non-genuine currency bills, the number of invalid substitute currency media, and so forth. The coin sorting device 8000 sorts and counts the coins or tokens, and the controller 8014 in the coin sorting device 8000 stores information representative of the coins or tokens being sorted and counted, such as the value and denomination of the coins (penny, dime, nickel, etc.), the number and kind of tokens, and so forth.

In some embodiments, the stored information in the coin sorting device 8000 is transmitted to the controller 814 of the document processing device 800. The document processing device 800 organizes and presents the combined information to the operator via a display, such as a monitor or touch screen. In other embodiments, the stored information in the document processing device 800 is transmitted to the controller 8014 of the coin sorting device 8000, which organizes and presents the information combined from both devices to the operator via a display, such as a monitor or touch screen.

Figure 9:
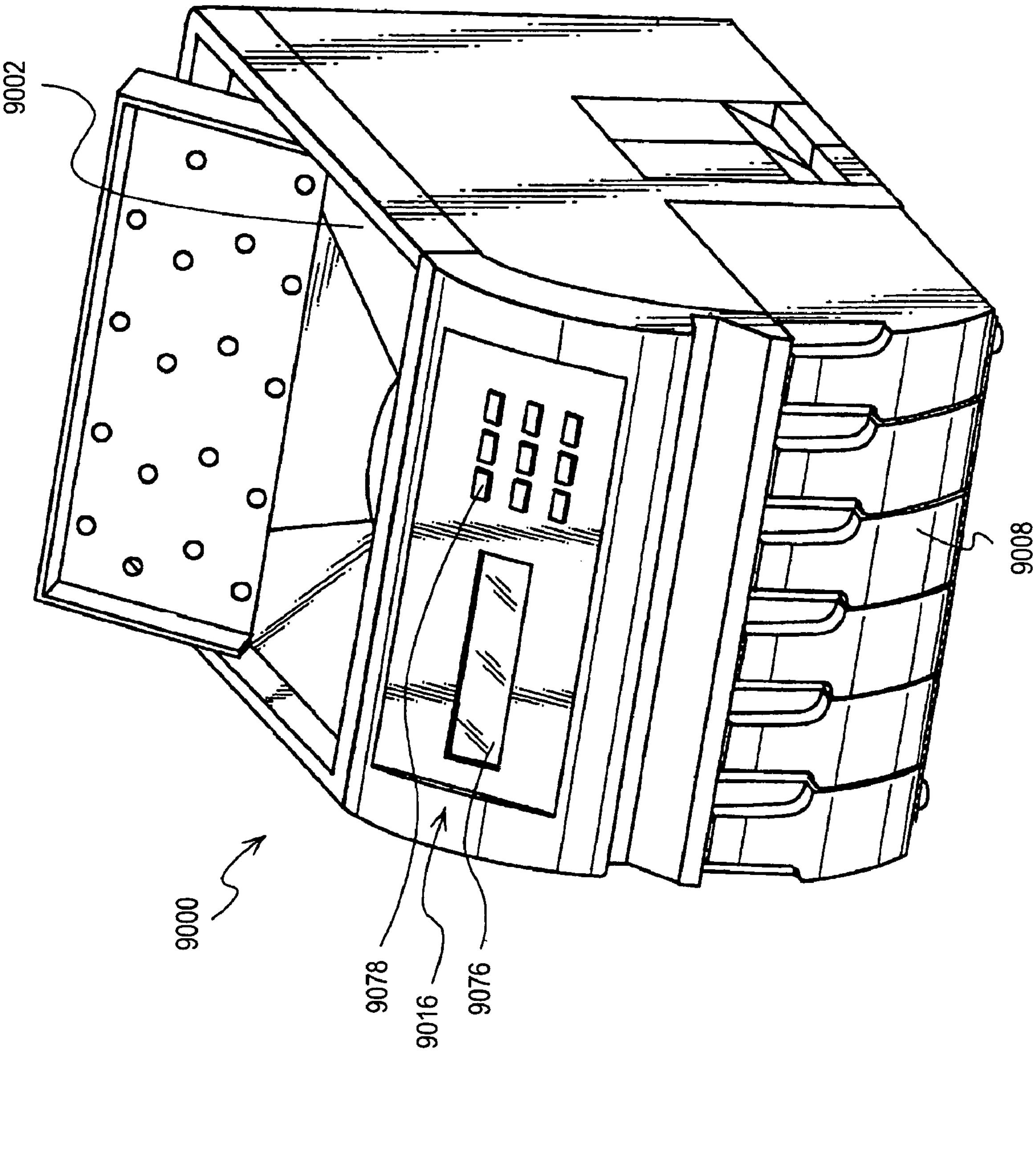
FIG. 9 is a perspective view of a compact coin sorting device according to one embodiment of the present invention.

Referring now to FIG. 9, there is shown a coin sorter system 9000. The coin sorter system 9000 includes a coin tray 9002 which receives coins of mixed denominations. The coins are sorted, counted, and are captured in a plurality of coin bins 9008 positioned on the exterior of the coin sorter system 9000. In alternate embodiments, the coins are captured in a plurality of coin bags.

The coin sorter system 9000 includes a control panel 9016. In the illustrated embodiment, the control panel 9016 includes a display 9076 for displaying information about the coin sorter system 9000 and a plurality of keys 9078 for allowing the operator to enter information to the coin sorter system 9000. In some alternate embodiments, the control panel 9016 includes a touch screen.

Additional details concerning the coin sorter system 9000 are disclosed in commonly assigned U.S. Pat. No. 6,139,418, entitled "High Speed Coin Sorter Having a Reduced Size," and U.S. Pat. No. 5,997,395, entitled "High Speed Coin Sorter Having a Reduced Size," each of which is herein incorporated by reference in its entirety. In one embodiment, the coin sorter system 9000 shown in FIG. 9 is modified to include a communications port such as the communications port 8018 one described in connection with FIG. 8. The coin sorter system 9000 may be further modified to perform the coin sorting and authenticating functions disclosed in U.S. Pat. Nos. 5,299,977, 5,453,047, 5,507,379, 5,542,880, 5,865,673 and 5,997,395, each of which is herein incorporated by reference in its entirety.

Funds Processing Machine

In some embodiments, the evaluation region 104 of FIG. 1*b* may be incorporated into a funds processing machine capable of processing both documents and coins.

Figure 10A:
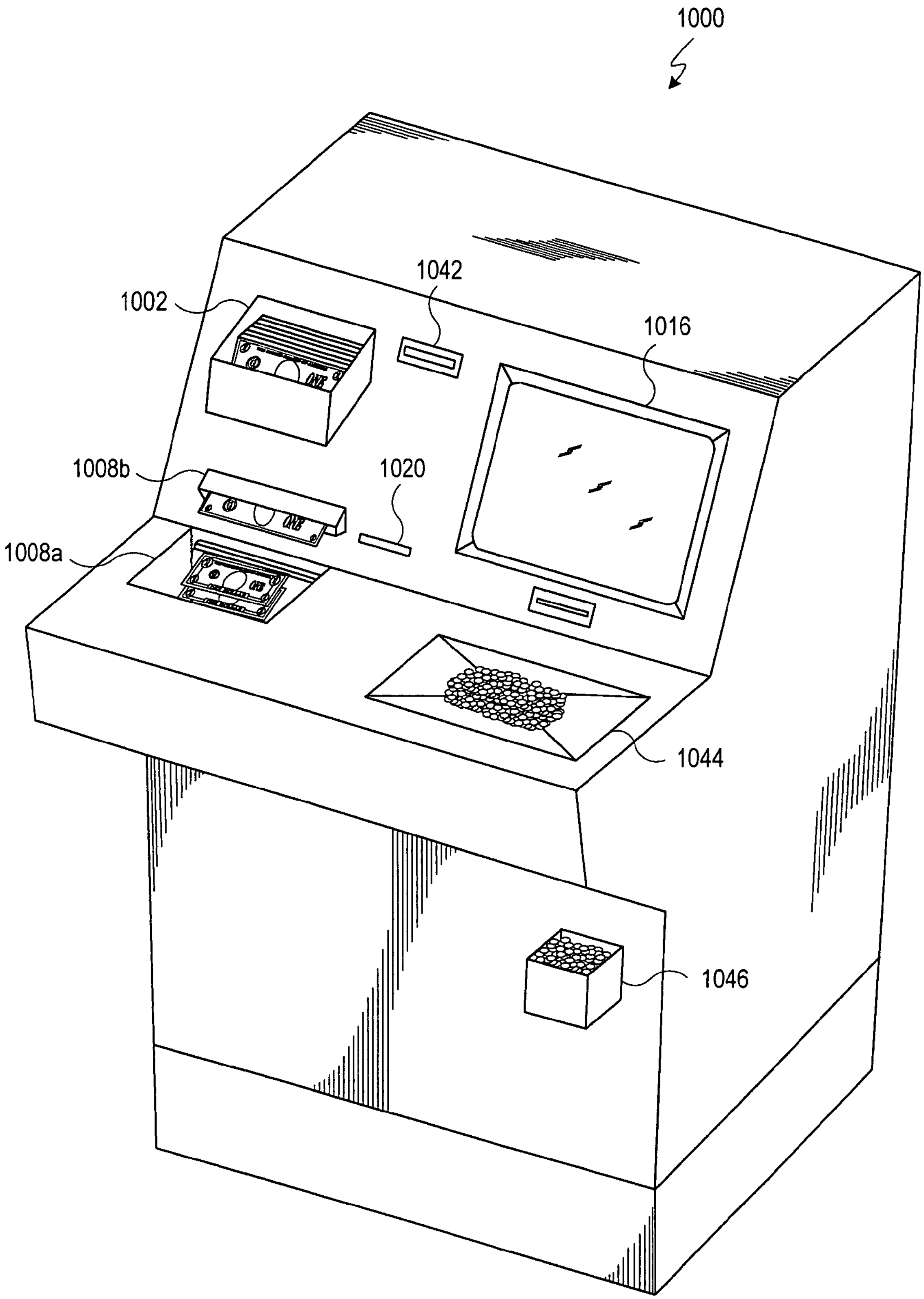
FIG. 10a is a perspective view of a funds processing machine according to one embodiment of the present invention.

Referring now to FIG. 10*a*, a funds processing machine 1000 includes a touch screen 1016 to provide inputs from a user and to display outputs to be viewed by the user. While the touch screen 1016 is the preferred mode to enter data from the user, the funds processing machine 1000 may also include a mechanical keyboard, in addition to or in lieu of the touch screen 1016, to receive such inputs.

The funds processing machine 1000 includes a coin receptacle 1044 which receives coins of a single denomination or of mixed denominations from a user. Additionally, an input receptacle 1002 is included within the funds processing machine 1000. The input receptacle 1002 is illustrated in its open position in FIG. 10*a* and may be retracted by the funds processing machine 1000 once the bulk currency has been placed therein by the user. These input devices 1044 and 1002 allow the user of the funds processing machine 1000 to input his or her funds which will ultimately be converted to some other sort of fund source that is available to the user. In addition to banknotes, the input receptacle 1002 of the funds processing machine 1000 can also accommodate casino script, paper tokens, or bar coded tickets.

The funds processing machine 1000 includes a dispenser 1008*a* and a dispensed coin receptacle 1046 for dispensing to the user the desired amount of funds in both bank notes and coins. A return slot 1008*b* may also be included within the funds processing machine 1000 to return currency bills or substitute currency media to the user which cannot be authenticated or otherwise processed. Coins which cannot be authenticated may be returned to the user via the dispensed coin receptacle 1046. The funds processing machine 1000 further includes a document dispenser 1020 for providing a user with a receipt of the transaction that he or she has performed.

In its simplest form, the funds processing machine 1000 receives funds (currency, coins, substitute currency media) via the coin input receptacle 1044 and the input receptacle 1002, and after these deposited funds have been authenticated and counted, the funds processing machine 1000 returns to the user an amount equal to the deposited funds but in a different variation of bank notes and coins. For example, the user of the funds processing machine 1000 may input $102.99 in various small bank notes and pennies and in turn receive a $100 bank note, two $1 bank notes, three quarters, two dimes, and four pennies. Alternatively, the funds processing machine 1000 may simply return a receipt of the transaction or a barcoded ticket through the document dispenser 1020 which the user can redeem for funds by an attendant of the funds processing machine 1000. Alternatively, the funds processing machine 1000 can credit a user's account.

The funds processing machine 1000 may also include a media reader slot 1042 into which the user inserts his or her identification card so that the funds processing machine 1000 can identify the user. The touch screen 1016 typically provides the user with a menu of options which prompts the user to carry out a series of actions for identifying the user by displaying certain commands and requesting that the user depress touch keys on the touch screen 1016 (e.g., a user PIN). The funds processing machine 1000 includes a card media reader device which is capable of reading from or writing to one or more types of card media. This media may include various types of memory storage technology such as magnetic storage, solid state memory devices, and optical devices.

Figure 10B:
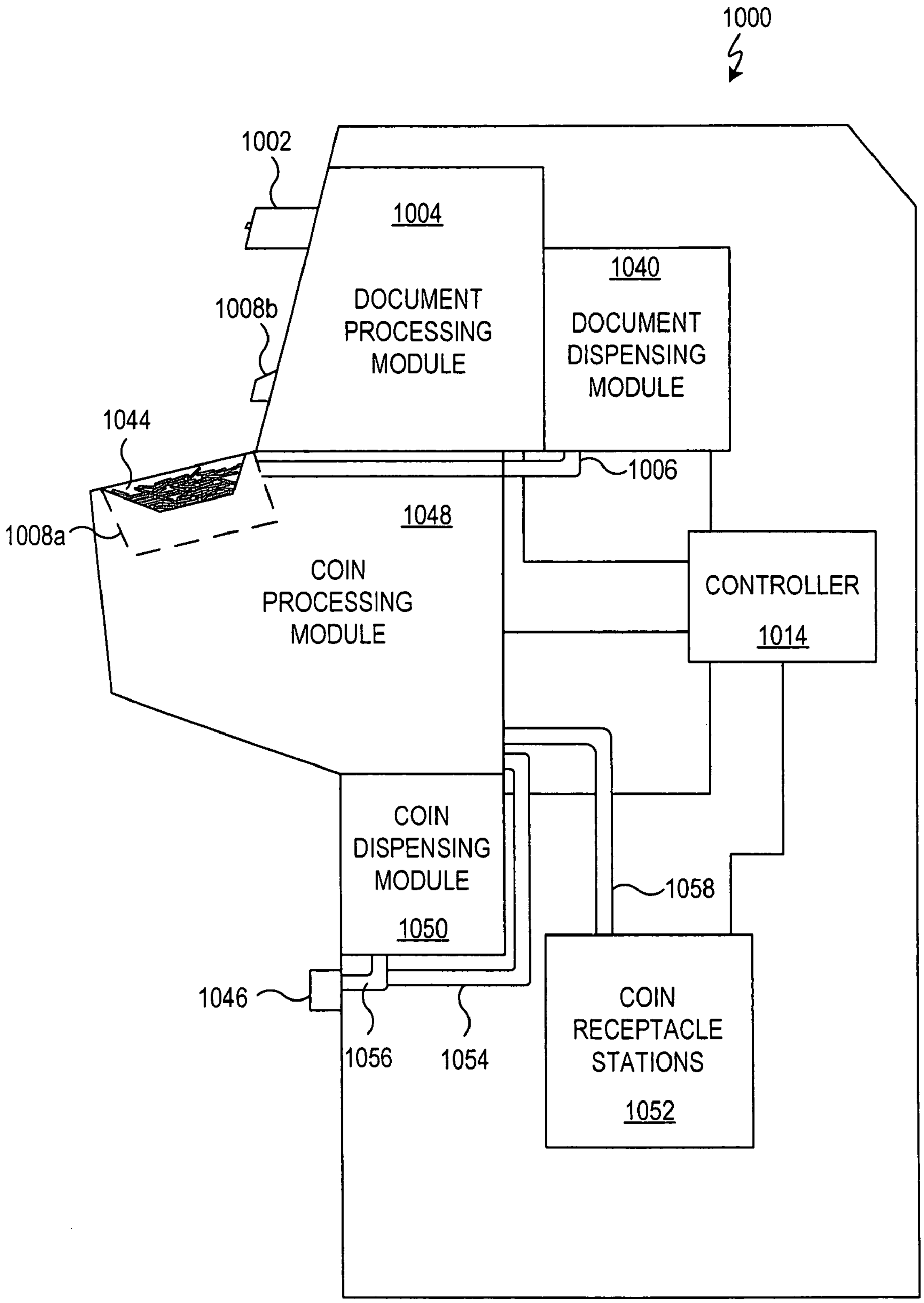
FIG. 10b is a side view of the funds processing machine of FIG. 10a which schematically illustrates the various modules present in the funds processing machine.

FIG. 10*b* illustrates the funds processing machine 1000 in a side view illustrating the various modules. The document processing module 1004 receives documents from the input receptacle 1002 for processing. The inward movement of the input receptacle 1002 positions a stack of documents at the feed station of the document scanning and counting device which automatically feeds, counts, scans, authenticates, and sorts the documents, one at a time at a high rate of speed (e.g., at least 350 documents per minute). In place of or in addition to the input receptacle 1002, the funds processing machine 1000 may include a single document receptacle which receives and processes one document at a time. The documents that are recognized by the document processing module 1004 are delivered to a storage area such as a currency canister (not shown). When a document cannot be recognized by the document processing module 1004, it is returned to the customer through the return slot 1008*b*. Exemplary machines which scan, sort, count, and authenticate currency bills as required by the bank note processing module are described in U.S. Pat. Nos. 5,295,196, 5,870,487 and 5,875,259, each of which is incorporated by reference herein in its entirety.

In place of or in addition to the input receptacle 1002, the funds processing machine 1000 may include an input receptacle slot which receives and processes one document at a time. Such an input receptacle slot would be placed at the front of the funds processing machine 1000.

Additional details of the funds processing machine 1000 are disclosed in commonly assigned, co-pending U.S. Pat. No. 6,318,537, entitled "Currency Processing Machine with Multiple Internal Coin Receptacles," which is herein incorporated by reference in its entirety.

In accordance with the present invention, the document processing module 1004 of the funds processing machine 1000 shown in FIG. 10*b* and described in U.S. patent application Ser. No. 09/562,231 is modified to incorporate the evaluation region 104 shown and described in connection with FIGS. 1*a* and 1*b*. The user deposits currency bills and substitute currency media into the input receptacle 1002. As described in more detail below, the funds processing machine 1000 may be communicatively coupled to a casino gaming network. In such an embodiment, a casino customer may deposit a stack of casino cashout tickets and currency bills into the input receptacle 1002, and the machine 1000 queries the casino gaming network for the payout amounts associated with the casino cashout tickets. This payout amount may be added to the customer's total such that the customer is dispensed (via the dispenser 1008*a* for example) the total amount of currency deposited plus the value of any payout associated with valid cashout tickets.

The funds processing machine 1000 also includes a coin processing module 1048. The coin processing module 1048 sorts, counts and authenticates the mixed coins which are deposited in the coin input receptacle 1044 which leads directly into the coin processing module 1048. The coins are sorted in the coin processing module 1048 in a variety of ways but the preferred method is a sorting based on the diameter of the coins. When a non-authenticated coin is determined by the coin processing module 1048, it is directed through a coin reject tube 1054 towards the dispensed coin receptacle 1046. Thus, the user who has entered such a non-authenticated coin can retrieve the coin by accessing the dispensed coin receptacle 1046. Coin sorting and authenticating devices which can perform the function of the coin processing module 1048 are disclosed in U.S. Pat. Nos. 5,299,977, 5,453,047, 5,507,379, 5,542,880, 5,865,673 and 5,997,395, previously incorporated by reference. Alternatively, other coins sorters such as a rail sorter can be used to perform the function of the coin processing module 1048.

The funds processing machine 1000 further includes a document dispensing module 1040 which is connected via transport mechanism 1006 to the dispenser 1008*a* that is accessible by the user. The document dispensing module 1040 typically dispenses loose bills in response to a request of the user for such bank notes. Also, the document dispensing module 1040 may be configured to dispense strapped notes into the dispenser 1008*a* if that is desired. In one embodiment of the present invention, the user may select the denomination of the loose or strapped bills dispensed to the user. As noted above, the document dispensing module 1040 is modified in one embodiment to dispense both currency bills and substitute currency media. For example, in one embodiment, the document dispensing module 1040 may return to the user invalid substitute currency media. In addition, as mentioned above, the document dispensing module 1040 may dispense a barcoded ticket which the customer may redeem for funds.

The funds processing machine 1000 also includes a coin dispensing module 1050 which dispenses loose coins to the user via the dispensed coin receptacle 1046. The coin dispensing module 1050 is connected to the dispensed coin receptacle 1046 via a coin tube 1056. Thus, the user of the funds processing machine 1000 has the ability to select the desired coin denominations that he or she will receive in response to a transaction.

The coins which have been sorted into their denomination by the coin processing module 1048 are sent to coin tubes 1058 which correspond to each specific denomination. The coin tubes 1058 lead to a coin receptacle station 1052 for each of the denominations that are to be sorted and authenticated by the coin processing module 1048.

The funds processing machine 1000 includes a controller 1014 which is coupled to each module 1004, 1040, 1048, 1050 and 1052 within the funds processing machine 1000 and controls the interaction between each module. For example, the controller 1014 may review the input totals from the funds processing modules 1004 and 1048 and direct an appropriate funds output via the funds dispensing modules 1040 and 1050. The controller 1014 also directs the operation of the coin receptacle stations 1052 as described below. While not shown, the controller 1014 may also be coupled to a media reader associated with the media reader slot 1042 and also to a printer at the document dispenser 1020, if these devices are present in the funds processing machine 1000. The printer, for example, may print a barcoded ticket representative of the amount of funds deposited by the customer, or the printer may print a receipt of the transaction.

Document Processing Device Coupled to a Computer Network

According to some embodiments of the present invention, any of the foregoing systems may be communicatively coupled to a computer network, such as a casino gaming machine network or a retailer network. Examples of such embodiments will be discussed next.

Figure 11:
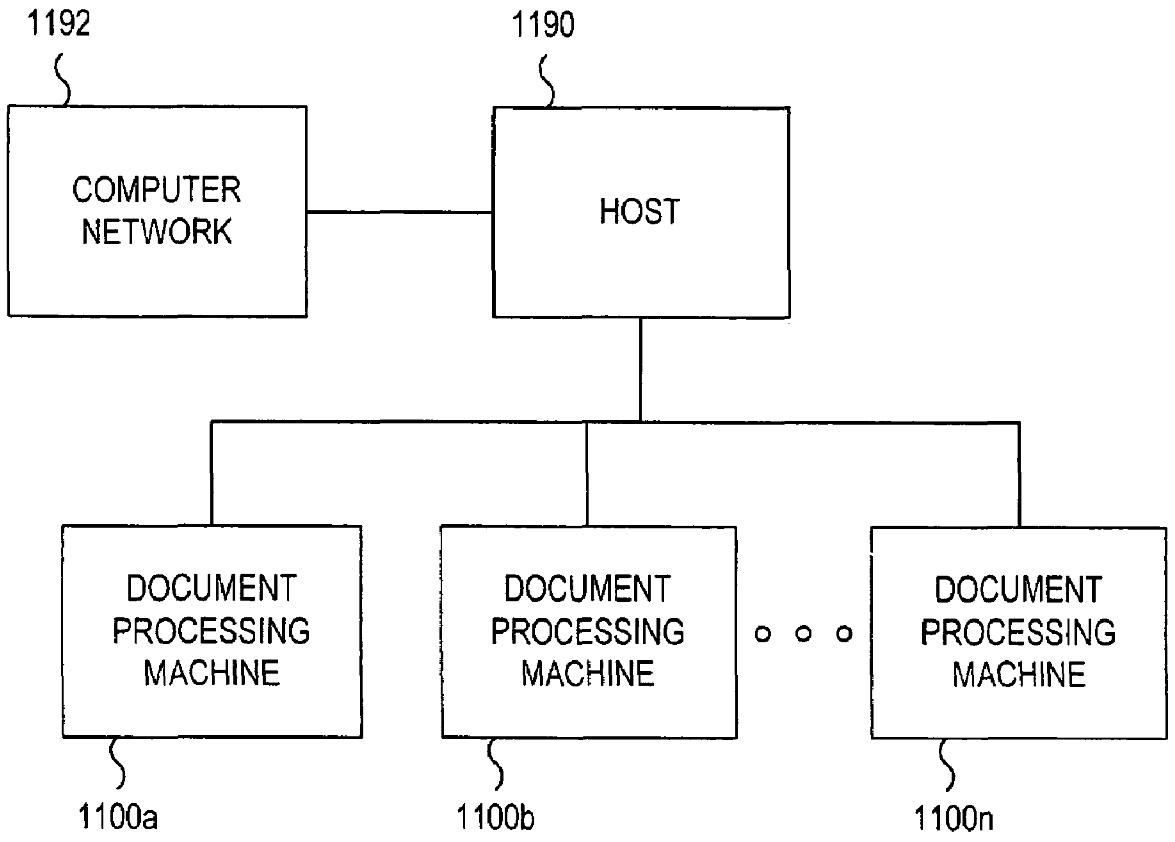
FIG. 11 is a functional block diagram of a network of document processing devices in communication with a computer network.

FIG. 11 illustrates a host system 1190 coupled to a plurality of document processing devices 1100*a*, 1100*b*, . . . 1100*n*. The document processing devices 1100*a*, 1100*b*, . . . 1100*n* may be any device shown or described in connection with FIGS. 2-10*b*. The host system 1190 is further coupled to a computer network 1192. The computer network 1192 provides the host system 1190 with real time information, such as information relating to the demands for particular types of coin receptacles and information about the substitute currency media detected by the document processing devices 1100*a-n*. In alternate embodiments, the computer network 1192 may be a casino gaming machine network or a retailer network. Each of these embodiments is discussed next.

In one embodiment, the computer network 1192 is a casino gaming machine network and includes a database for storing information about barcoded tickets that have been dispensed by the casino's gaming machines. When a barcoded ticket is dispensed, the ticket number is stored in a database along with the payout amount. A barcode, such as barcode 138 shown in FIG. 1*b*, encodes the ticket number and the payout amount. When the barcoded ticket is deposited into the document processing device 1110, the evaluation unit 104 of the document processing device 1100 reads the barcode on the barcoded ticket. If a valid barcode is read, the document processing device 1100 transmits the barcode number to the host 1190. The host 1190 queries the computer network 1192 for the payout amount associated with the barcoded number, and transmits the payout amount back to the document processing device 1100. The document processing device 1100 adds the payout amount to the running total of currency deposited by the operator into the machine 1100.

Alternatively, the barcode numbers associated with barcoded tickets identified by the document processing device 1100 are stored in the document processing device 1100. These numbers are periodically provided to the casino gaming machine network 1192. The casino machine gaming network 1192 may include a casino accounting system. The numbers are matched up with the payout amounts stored in a database associated with the casino machine gaming network 1192, and the payout amounts may then be reconciled in the casino accounting system.

In another embodiment, the casino gaming machine network 1192 is a retailer network that includes a retailer database for storing information about promotional media. For example, a retailer customer may deposit both currency bills and substitute currency media such as store coupons or gift certificates into a self-checkout station at the point of sale. The documents deposited at the self-checkout stations are deposited into a document processing device 1100. Documents from cash register tills may also be deposited into a document processing device 1100. The document processing device 1100 rapidly processes the documents, and identifies the barcode numbers from the barcoded media. These barcode numbers are then transmitted to the retailer network which determines the values associated with the barcode numbers (such as fifty cents off, or a $50 gift certificate) by querying the retailer database. These values are then reconciled in the retailer's accounting system. Optionally, these values may be transmitted back to the document processing device 1100 for display to the customer.

Operation of Document Processing Device

Figure 12:
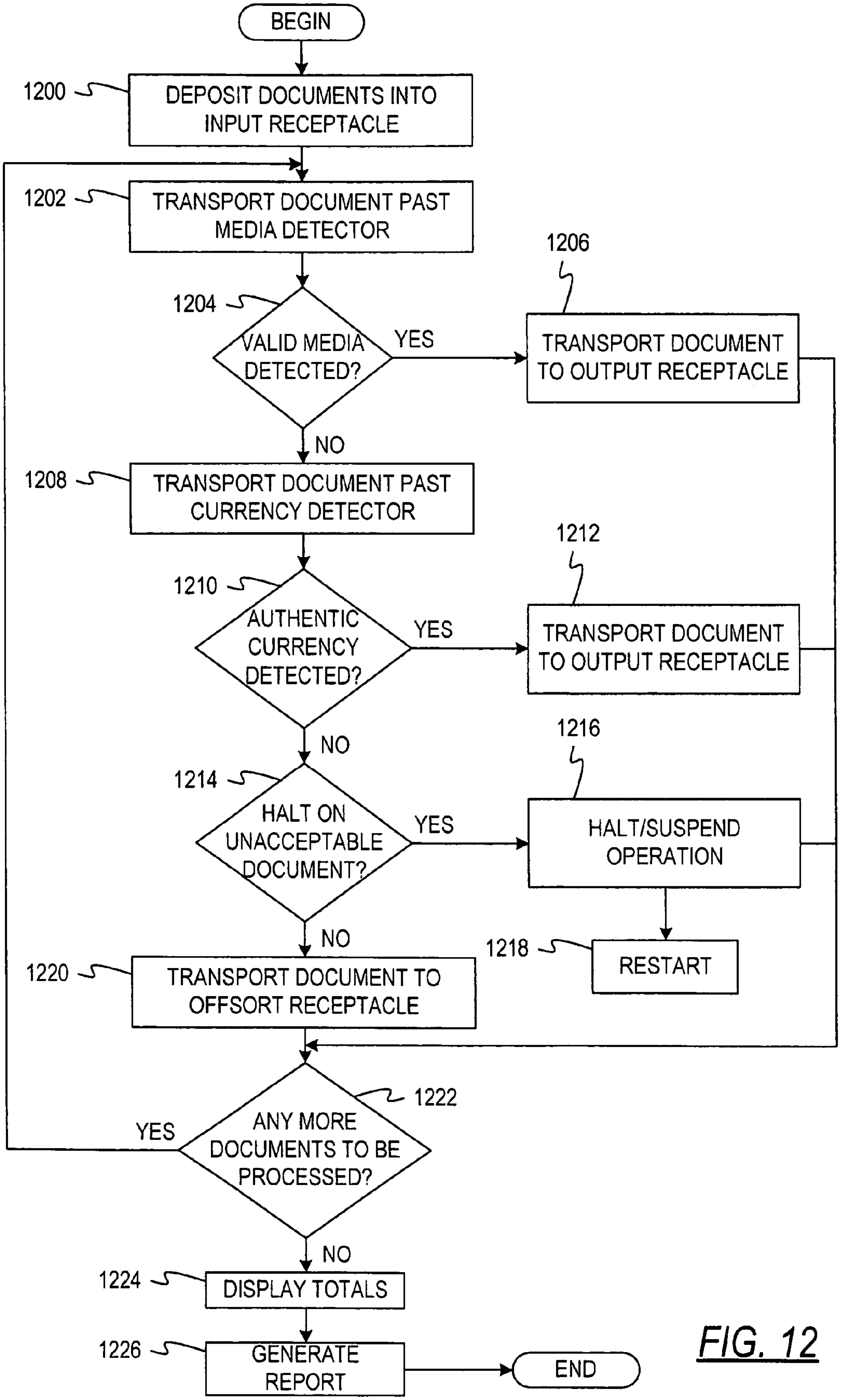
FIG. 12 is a flowchart describing the operation of a document processing device according to one embodiment of the present invention.

Turning now to FIG. 12, there is shown a flowchart describing the operation of a document processing device according to one embodiment of the present invention. Operation begins when an operator deposits documents into an input receptacle of a document processing device (step 1200). Operation may commence automatically, such as when a sensor detects the presence of documents in the input receptacle, or manually, such as when the operator actuates a switch, key, or button on the document processing device. The documents may include a combination of mixed currency bills and substitute currency media, or the documents may include currency bills only or substitute currency media only.

In some embodiments, the input receptacle is adapted to receive a stack of documents. In other embodiments, the input receptacle is adapted to receive one document at a time. The deposited documents are transported, one at a time, along a transport mechanism in the document processing device. In step 1202, a first document is transported past a media detector. In some embodiments, the media detector comprises a barcode reader adapted to scan for barcodes on a document. In step 1204, the media detector provides a signal representative of whether a valid substitute currency medium was detected. For example, if the barcode reader provides a "good read" signal in response to scanning the first document, the first document is a valid medium. However, if the barcode provides a "no read" signal, the first document is not a valid medium. If the first document is a valid medium, the first document is transported to an output receptacle (step 1206). Which output receptacle receives the first document depends on which output receptacle has been specified according to a preprogrammed or operator-defined mode. If there is only one output receptacle on the document processing device, then the first document is transported to that output receptacle.

Note that between steps 1204 and 1206, in some embodiments, the first document may be first transported to a bill facing mechanism before being transported to an output receptacle. According to some of such embodiments, the document processing device is adapted to determine which orientation the first document is facing, and if the first document is facing the wrong orientation, it can be transported to a bill facing mechanism. Alternatively, the desired face orientation can be predetermined either by the manufacturer or the operator. In other embodiments, the first document is not transported to a bill facing mechanism.

If a valid medium is not detected at step 1204, the document is transported past a currency detector at step 1208. If the currency detector detects an authentic currency bill (step 1210), the first document is transported to a pre-selected or operator-defined output receptacle at step 1212. The document processing device can also determine the denomination of the currency bill, and transport the first document to the appropriate output receptacle according to operator-specified instructions or preprogrammed instructions. In some embodiments, a genuine currency bill may optionally be transported to a document facing mechanism, such as the document facing mechanism 203 shown in FIGS. 2 and 3, for proper orientation before being transported to an output receptacle if the currency detector determines that the currency bill is not properly oriented.

In other embodiments, steps 1208 and 1202 are reversed, such that a document is first transported past a currency detector and then past a media detector. In still other embodiments, steps 1202 and 1208 (or steps 1208 and 1202) are performed before steps 1204 and 1210 (or steps 1210 and 1204). In other words, in these other embodiments, the documents are transported past the media and currency detectors (in any order), and then the document processing device determines whether the document is a valid medium or authentic currency bill. Note that in the embodiments in which the document processing device has only a single output receptacle, steps 1206 and 1212 are identical because both valid media and authentic currency are transported to the same output receptacle.

At step 1214, the document processing device determines whether it is instructed to halt on detecting an unacceptable document, i.e., a document that is neither valid media nor authentic currency, such as a blank piece of paper. These instructions may be operator-specified or preprogrammed. In some embodiments, the document processing device is adapted to determine whether an unacceptable document is an invalid medium or a non-genuine currency bill, and can receive separate instructions on handling each. If the device is instructed to halt on detecting an unacceptable document, the operation of the device is halted or suspended at step 1216 to permit inspection and/or removal of the unacceptable document. At step 1218, operation of the device is restarted once the unacceptable document has been inspected and/or removed from the document processing device, and operation continues at either steps 1200 or 1222 depending on preprogrammed or operator-specified instructions. In some embodiments, the operator may, upon inspection, determine a bill's denomination. In such embodiments, the operator may manually enter the denomination of a currency bill, such a via a denomination key, deposit the bill into an output receptacle, and resume operation. In another embodiment, the operator may, upon inspection, determine information about the unacceptable substitute currency medium, such as the information described above.

Returning to step 1214, if the document processing device is instructed to offsort unacceptable documents, the unacceptable document is transported to the offsort receptacle at step 1220. The particular offsort receptacle which is to receive unacceptable documents may be operator-specified or preprogrammed. In embodiments in which the device is adapted to discriminate between invalid media and non-genuine currency bills, the unacceptable document may be routed to one of two offsort receptacles depending on what kind of unacceptable document was detected. This routing decision may be made under the control of operator-specified or preprogrammed instructions.

If there are no further documents to be processed at step 1222, the device may optionally display information associated with the processed documents at step 1224. This information may include any combination of the following according to one or more different embodiments: the total amount of authentic currency bills processed (e.g., $15,567); a breakdown of the denominations of currency bills processed (e.g., 140 $1 bills, 147 $5 bills, 268 $10 bills, and so on); the total number of valid media detected (e.g., 156 pieces of valid media processed); barcode information detected from barcoded media (e.g., barcode number 12345678); the total number of flagged currency bills processed (e.g., 5 flagged bills, where 3 bills are no call bills, 1 bill is a suspect bill, and 1 bill is both suspect and no call); the total number of invalid media detected (e.g., 16 pieces of invalid media processed); the total amount of media detected (e.g., $10,000 in media processed); the total number of unidentified documents—i.e., documents which were neither determined to be a currency bill nor a valid substitute currency medium, such as a blank piece of paper for example—detected (e.g., 27 pieces of unidentified documents processed); why a particular currency bill was not authenticated (e.g., 4 bills failed magnetic strip test, 2 bills failed ultraviolet test); the total number of documents processed (e.g., 11,253 documents processed); the number of batch identification cards processed (e.g., 4 batch identification cards processed); identification information of the gaming machine from which a batch of currency bills and substitute currency media originated based on information encoded on a batch identification card (e.g., batch identification card number 12345 which identifies gaming machine number 42); and other suitable information.

At step 1226, the device may optionally generate a report based on some or all of the information displayed at step 1224. This report may be formatted and displayed to the operator, and/or it may be printed, and/or it may be transmitted to a network computer for storage or further manipulation.

Note that in the embodiments described in connection with FIG. 12, the device may further include a coin sorting device in which coins are also processed. The information associated with the processed coins may be combined with the information associated with the processed documents. A single or separate reports may be generated based on the processed coins and processed documents.

Figure 13:
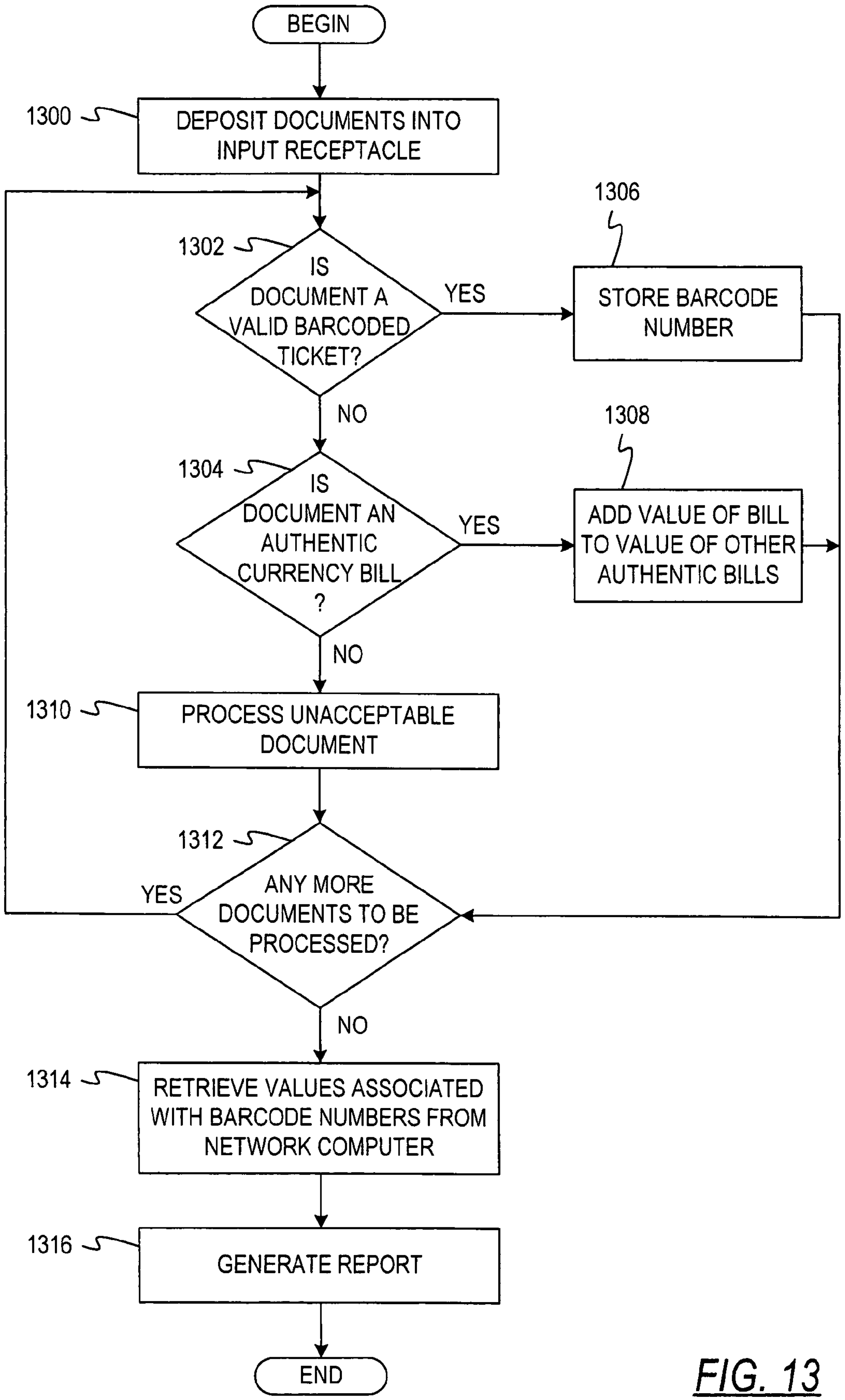
FIG. 13 is a flowchart further describing the operation of a document processing device according to any embodiment described in connection with FIG. 12.

Turning now to FIG. 13, there is shown a flowchart further describing the operation of a document processing device according to any embodiment described in connection with FIG. 12. At step 1300, documents are deposited into an input receptacle of a document processing device. The documents may include a combination of mixed currency bills and substitute currency media, or they may include currency bills only or substitute currency media only. At steps 1302 and 1304, the device determines whether a first document is a valid barcoded ticket or whether a first document is an authentic currency bill. Note that steps 1302 and 1304 can be performed in any order. If a document is determined to be a valid barcoded ticket, the barcode number associated with the barcoded ticket is stored in a memory location at step 1306. At step 1308, if a document is determined to be an authentic currency bill, the value of the currency bill is added to the value of all authentic currency bills scanned since step 1300. This value may be initialized to zero or may be initialized to some other number, such as a number representing the total amount of another batch of currency bills which was processed by the document processing device. If the first document is determined to be neither a valid barcoded ticket nor an authentic currency bill, it may be processed at step 1310 in accordance with steps 1214, 1216, 1218, and 1220 described in connection with FIG. 12 hereinabove.

At step 1312, the device determines whether any more documents remain to be processed. If there are, operation continues at step 1302 until there are no further documents to be processed. If no further documents are to be processed, the device retrieves the values associated with the stored barcode numbers from a computer network at step 1314. Alternatively, after each instance in which the device detects a barcode number, the device may retrieve the value associated with the barcode number from the computer network. The computer network may be a casino gaming machine network or a retailer network, for example. In a casino gaming environment, the barcode numbers may be associated with barcoded cashout tickets. In the retailer environment, the barcode numbers may be associated with store coupons, gift certificates, or other barcoded promotional media. In the casino gaming environment, one or more databases may be linked to provide information about the player who redeemed the ticket, when the ticket was dispensed, when the ticket was redeemed, and so forth, based on the barcode number from a cashout ticket. In the retailer environment, one or more databases may be linked to provide information about the product associated with the promotion, manufacturer data, and customer information based on data associated with customer loyalty cards, for example. This information and the other information described in connection with FIG. 12 may be included in a report generated by the device at step 1316. All or a portion of this generated report may be displayed and/or printed and/or stored or transmitted for later retrieval or further manipulation.

Additional details concerning the operation of a document processing device according to the present invention may be found in connection with the description of FIGS. 1*a*-11 above.

Figure 13A:
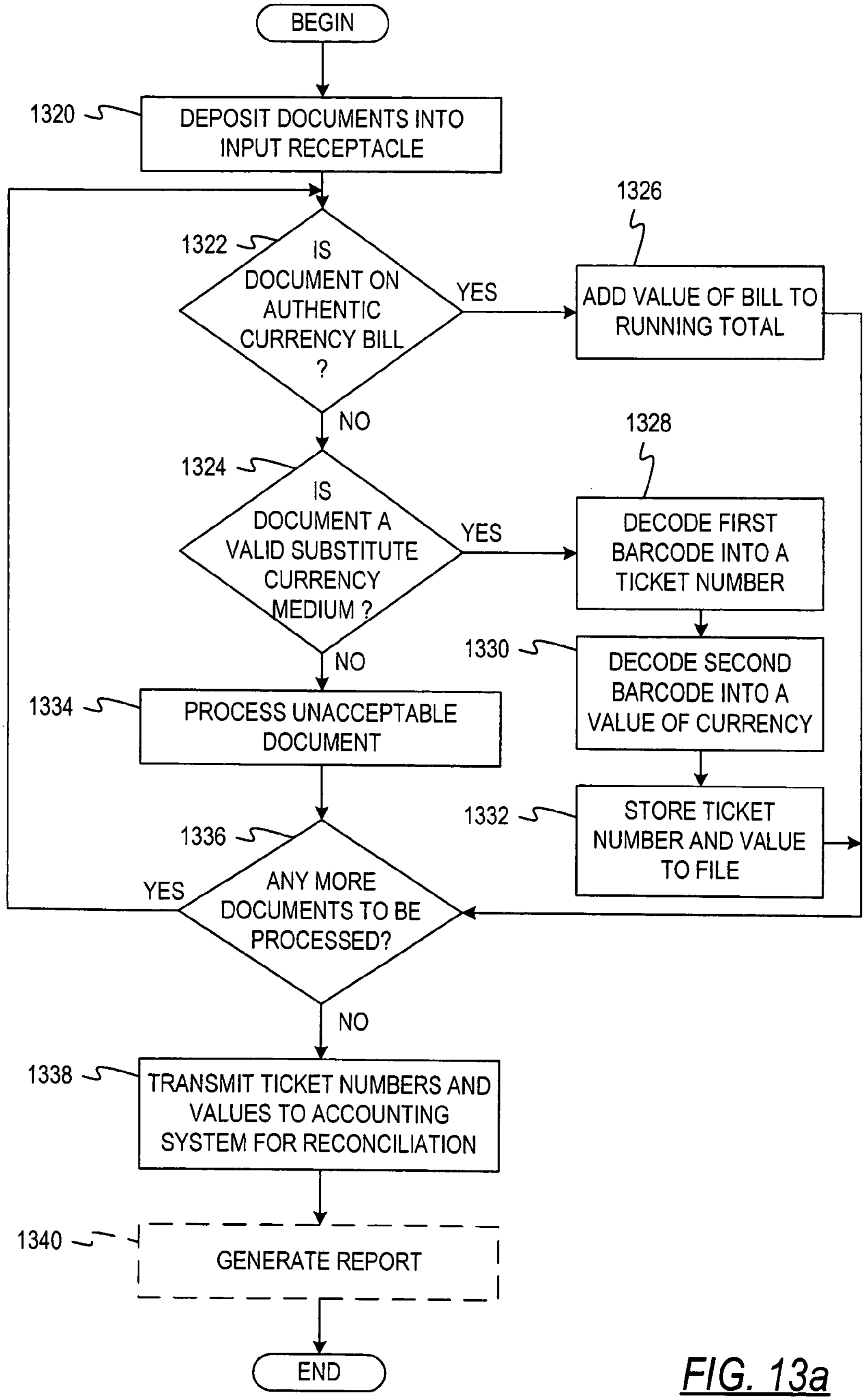
FIG. 13a is a flowchart of a method for operating a document processing device according to any embodiment of the present invention in which the document processing device is adapted to process documents bearing more than one barcode.

FIG. 13*a* illustrates a method of processing documents including currency bills and substitute currency media bearing more than one barcode pattern in a document processing device according to any embodiment described in connection with FIG. 12. A plurality of documents are deposited into an input receptacle of a document processing device at step 1320. The document processing device determines whether the documents under consideration is an authentic currency bill at step 1322. If the document is an authentic currency bill, the bill's denomination is determined and, at step 1326, the value of the bill is added to a running total of the value of currency bills processed. If the document is determined not to be an authentic currency bill, the document processing device checks whether the document is a valid substitute currency medium at step 1324. Note that the sequence of steps shown in FIG. 13*a* are not necessarily presented in the order in which they are performed. For example, step 1324 could be performed before or concurrently with step 1322.

In the specific case where the substitute currency media are barcoded tickets, a valid substitute currency medium is detected when a media detector successfully decodes the barcode patterns imprinted on the barcoded ticket into sets of meaningful characters. In a specific embodiment, one set of meaningful characters is a ticket number, and another set of meaningful characters is a value or amount of currency. Thus, a value of $12BB, for example, would not be a meaningful set of characters and the document would be flagged as an invalid substitute currency medium and processed as such at step 1334. Similarly, the ticket numbers may have to conform to a set of predetermined rules, such as being a six-digit number followed by an alphabet letter. Thus, a ticket number of 1234567 would not be a meaningful set of characters, and a document bearing that ticket number would be flagged and processed as an invalid substitute currency medium.

At step 1334, operation of the document processing device may be halted or suspended, or the invalid substitute currency medium may be directed to a reject output pocket, for example. If a valid substitute currency medium is detected, the first barcode pattern is decoded into a ticket number at step 1328. The second barcode pattern is decoded into a value at step 1330, and the ticket number and the value are stored to a file at step 1332.

At step 1336, the document processing device determines whether there are any more documents to be processed. If so, processing continues at step 1322. If there are no further documents to be processed, the document processing device transmits the ticket numbers and values generated at either or both of steps 1326 and 1332 to an accounting system for reconciliation at step 1338. Alternately, the document processing device can copy the file to a storage medium such as a floppy disk. The machine operator may then present the floppy disk to the accounting system for reconciliation. At step 1340, an optional report may be generated containing a summary of the processed documents.

Control Unit

Referring back to FIG. 1*a*, there is shown a control unit 116 which may be employed in any embodiment shown or described herein. As previously explained, the control unit 116 may comprise a desktop computer comprising a monitor and keyboard; a touch screen; or a panel including a display and keys, switches, or buttons. In addition, the control unit 116 may comprise a touch/video display, which is described below.

Figure 14:
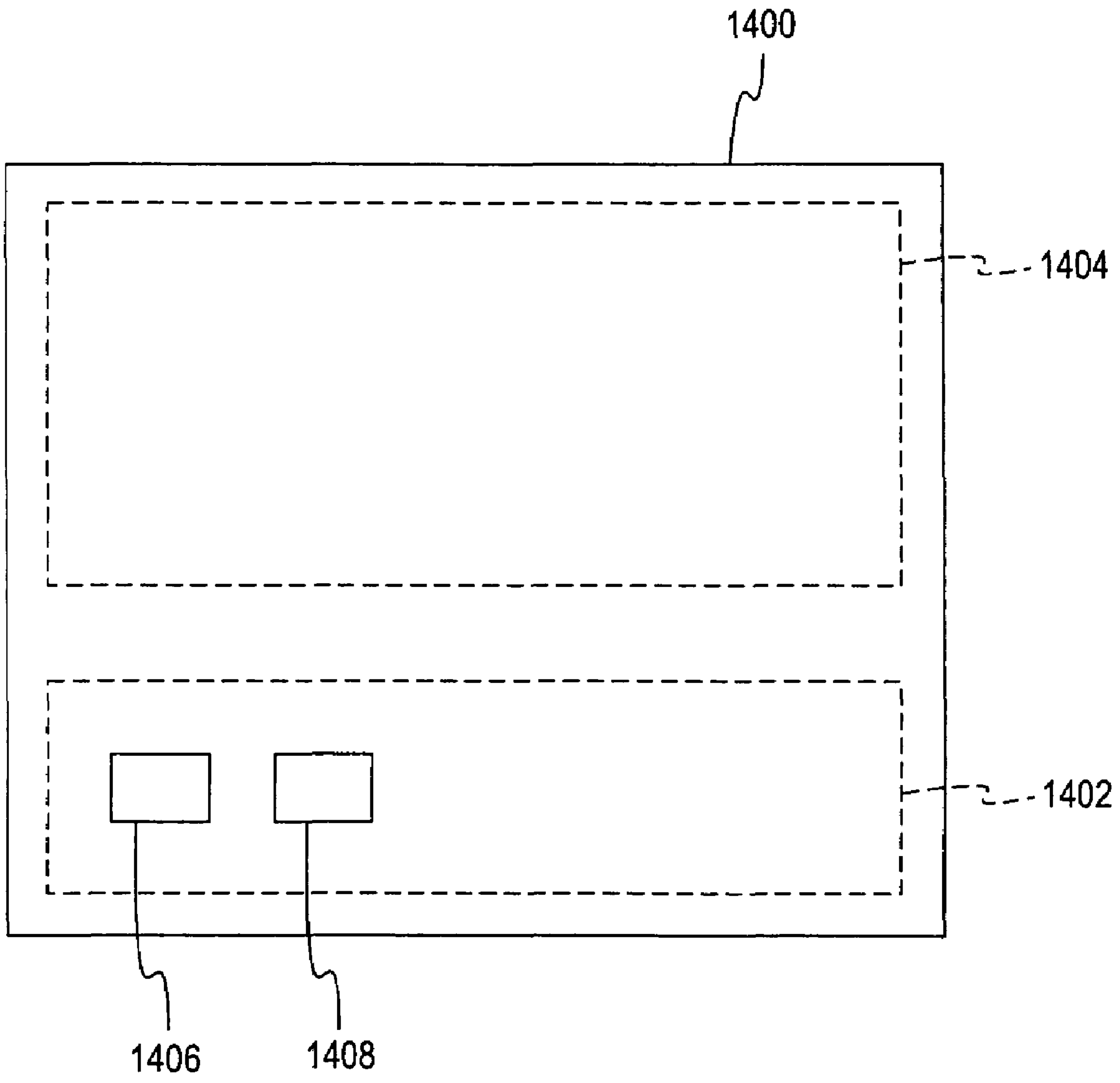
FIG. 14 illustrates a functional block diagram of a touch/video display according to one embodiment of the present invention.

FIG. 14 illustrates a functional block diagram of a touch/video display 1400 according to one embodiment of the present invention. The touch/video display 1400 is a display that comprises a touch portion 1402 and a video portion 1404. The touch portion 1402 of the display 1400 operates as a touch screen, accepting input from the operator through actuation of specific areas 1406, 1408 on the touch portion 1402. The touch portion 1402 may also display information to the operator. The video portion 1404 of the display operates as a video display. For example, an operator of a document processing device in accordance with any embodiment shown or described herein may need assistance in operating the device. In a training mode, for example, the touch/video display 1400 would receive input from the operator indicating a desired area of training (such as clearing document jams, for example) via the touch portion 1402 of the touch/video display 1400, and would display a video presentation, for example, of the desired area of training on the video portion 1404. The video presentation could direct the operator to perform various tasks as part of the training mode, pausing to permit the operator to complete a task, and then resuming when the operator so indicates by touching a specific area on the touch portion 1402 of the touch/video display 1400, such as specific area 1406. In alternate embodiments, the touch/video display 1400 may be employed to provide interactive help or instructional presentations regarding various operations of the document processing device, or to communicate messages such as advertisements or other information to an operator.

As described above, an operator may select via the control unit 116 any one of a multitude of preprogrammed or user-defined modes, such as those disclosed in U.S. Pat. No. 6,278,795, entitled "Multi-Pocket Currency Discriminator," in U.S. Pat. No. 6,460,705, entitled "Method of Creating Identifiable Smaller Stacks of Currency Bills Within a Larger Stack of Currency Bills," and in co-pending U.S. patent application Ser. No. 09/688,538, entitled "Currency Handling System Having Multiple Output Receptacles," which was filed on Oct. 16, 2000, previously incorporated by reference. The operator may select these and other modes via an interface such as the control unit 116 shown in FIG. 1*a* and described above.

System of Networked Document Processing Devices

Figure 15:
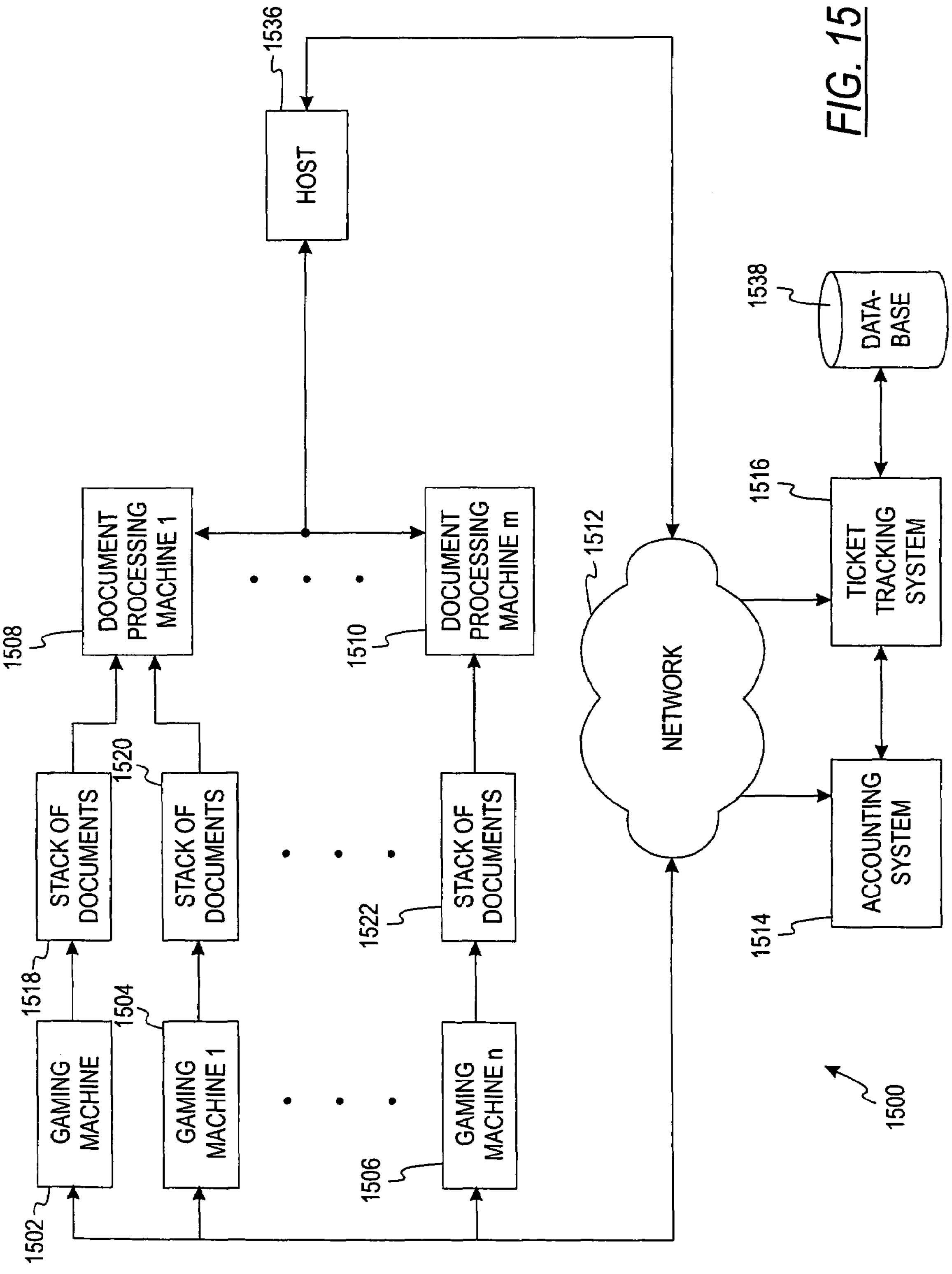
FIG. 15 is a flowchart of a method for processing documents according to one embodiment of the present invention.

FIG. 15 is a diagram of a system 1500 for processing currency bills and substitute currency media which generally includes gaming machines 1502, 1504, 1506, document processing devices 1508, 1510, and a network 1512. While FIG. 15 describes embodiments in a casino environment, other environments such as a retailer or an amusement park, for example, are contemplated. In a retailer environment, the gaming machines 1502, 1504, 1506 are replaced with document accepting devices, such as self-checkout stations. In an amusement park environment, the gaming machines 1502,

1504, 1506 may be replaced with vending machines or other document accepting devices suitable for use in amusement park environments. In short, the gaming machines 1502, 1504, 1506 may be any document accepting device suitable for use in a particular environment. A document accepting device includes a document acceptor for accepting a document, such as a currency bill or a substitute currency medium.

A casino environment includes a first gaming machine 1502, a second gaming machine 1504, and an nth gaming machine 1506 arranged about a casino floor. Casino patrons play games of chance on the gaming machines 1502, 1504, 1506 during which currency bills and substitute currency media are received and dispensed. At certain predetermined times, such as daily, hourly, every six hours, and so forth, or upon the occurrence of certain events, such as a full condition reported by a bill validator box, a casino operator empties the bill validator boxes which contain stacks of documents 1518, 1520, 1522 from the gaming machines 1502, 1504, 1506, respectively. The stacks of documents 1518, 1520, 1522 are brought into a soft-count room in a secure area of the casino for processing. One or more of the stacks of documents retrieved from the gaming machines are deposited into an input receptacle of a document processing device within the soft-count room. In FIG. 15, the stacks of documents 1518, 1520 retrieved from the first gaming machine 1502 and the second gaming machine 1504 are deposited into the input receptacle of a first document processing device 1508. The stack of documents 1522 retrieved from the nth gaming machine 1506 is deposited into the input receptacle of a mth document processing device 1510.

The document processing devices 1508, 1510 may be any document processing device shown and described above such as those described in connection with FIGS. 1*a*-11. They are communicatively linked via a host 1536 to the network 1512 such as described in connection with FIG. 11. The first document processing device 1508 processes the stack of documents deposited in its input receptacle and identifies authentic currency bills and their denominations, no call bills, suspect bills, valid substitute currency media, or invalid substitute currency media. Depending on the number of output receptacles present in the document processing device 1508, authentic, no call, and suspect bills and valid and invalid substitute currency media will be directed to one or more of the output receptacles of the machine 1508. Likewise, the document processing device 1510 processes authentic currency bills whose denominations can be determined, valid substitute currency media, no call and suspect bills, and invalid substitute currency media.

In some embodiments where the substitute currency media include a barcode pattern encoding a ticket number, the ticket numbers of the valid substitute currency media processed in the document processing devices 1508, 1510 are stored in a file in a storage medium such as the storage medium 119 shown in FIG. 1*c*. The file containing the ticket numbers is presented to a ticket tracking system 1516 which, according to one embodiment, is coupled to the network 1512. In other embodiments, the ticket numbers are stored in a floppy disk which is presented to the ticket tracking system 1516. The ticket tracking system 1516 compares the ticket numbers in the file with the ticket numbers stored in a ticket database 1538 and retrieves the values associated with each ticket number from the ticket database 1538. The ticket numbers and values are presented to an accounting system 1514 for reconciliation.

The gaming machines 1502, 1504, 1506 are communicatively coupled to the network 1512. In one embodiment, the information encoded on the batch identification cards placed in the gaming machines is maintained in the accounting system 1514, which information includes the identity of the gaming machine in which the batch identification card is placed. The batch identification cards may be generated by a portable device carried by casino operators who empty the bill validator boxes from the gaming machines. When a bill validator box is emptied, the portable device dispenses a batch identification card bearing a barcode pattern representative of the name or number of the gaming machine into which the card is placed. After the bill validator box fills up with currency bills and substitute currency media, the batch identification card, the currency bills, and the substitute currency media are placed into a document processing device for processing. The barcode on the batch identification card is decoded and stored in a file along with information about the currency bills and substitute currency media processed by the document processing device.

Figure 16:
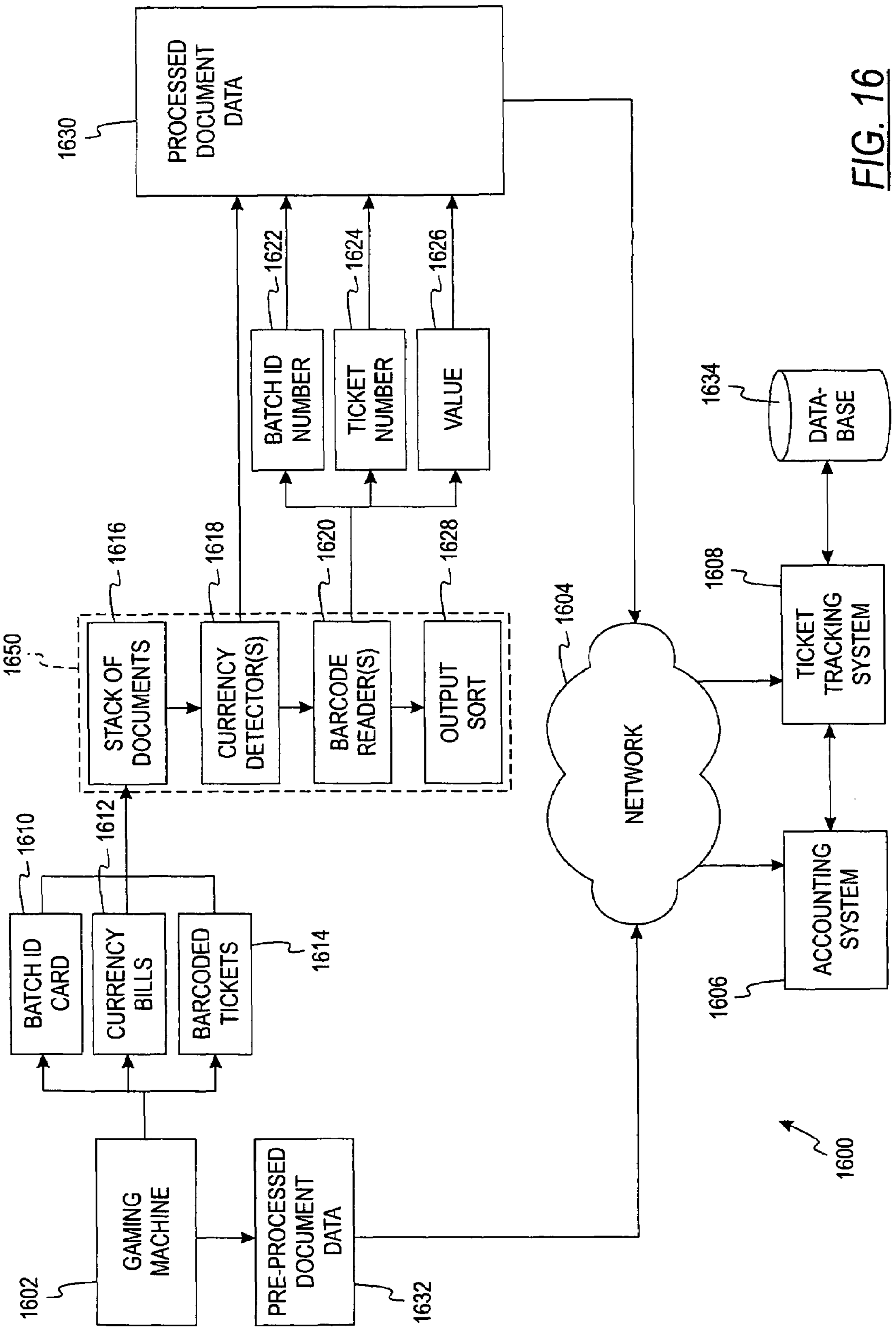
FIG. 16 is a flowchart of a method for processing documents according to another embodiment of the present invention.

FIG. 16 is a diagram of a system 1600 for processing currency bills and substitute currency media which generally includes a gaming machine 1602 coupled to a network 1604. The network 1604 is coupled to an accounting system 1606 and a ticket-tracking system 1608. The casino operator optionally places a batch identification card at the bottom of the bill validator box in the gaming machine 1602. The batch identification card includes a barcode pattern that encodes the identity of the gaming machine and/or is otherwise associated with the gaming machine such as by the accounting system associating the barcoded information on the card with the particular gaming machine. During operation, casino patrons will insert currency bills and substitute currency media into the bill acceptor slot of the gaming machine 1602. At predetermined intervals (hourly, daily, etc.) or upon the occurrence of a certain condition (e.g., the bill validator box is full), the casino operator will remove the bill validator box and bring it into the casino's soft-count room. The bill validator box contains a stack of documents 1616 that includes a batch identification card 1610, a plurality of currency bills 1612, and a plurality of barcoded tickets 1614.

The casino operator removes the stack of documents 1616 and places them into the input receptacle of a document processing device 1650. The document processing device 1650 may be any document processing device shown and described in connection with FIG. 1*a*, 1*b*, or 1*c*. In the illustrated embodiment, the documents are transported, one at a time, past one or more currency detectors 1618 and one or more barcode readers 1620, though not necessarily in that order. The currency detector 1618 is adapted to detect characteristic information associated with the authenticity and denomination of currency bills, and communicates information indicative of the denomination of an authentic currency bill to a controller in the document processing device. The denomination information is stored as processed document data 1630.

If the document under consideration includes one or more barcode patterns, the barcode patterns on the ticket are scanned by the barcode reader(s) 1620 and decoded into characters. For example, the barcode pattern on a batch identification card would be decoded into a batch identification number 1622, which is a number associated with the gaming machine 1602. A first barcode pattern of a multi-barcoded ticket would be decoded into a ticket number 1624. A second barcode pattern would be decoded into a value 1626 representing the currency amount for which the barcoded ticket was redeemed. The values of the authentic currency bills processed, the batch identification number 1622, the ticket numbers 1624, and the values 1626 form the processed document data 1630. The processed document data 1630 is stored in a file on a floppy disk, a hard drive, a network drive, or any other suitable storage medium.

After the documents are processed, they are directed to one or more output receptacles at step 1628. The processed document data 1630 is provided to the network 1604. In an alternate embodiment, the processed document data 1630 may be provided to the accounting system 1606 or the ticket tracking system 1608. When the processed document data 1630 includes ticket numbers and values, the processed document data 1630 can be provided either via the network 1604 or directly to the accounting system 1606 for reconciliation.

The gaming machine 1602 is also coupled to the network 1604. The gaming machine 1602 produces preprocessed document data 1632 during operation. The preprocessed document data 1632 includes information about the currency bills inserted into the bill validator or acceptor in the gaming machine 1602 and information about the barcoded tickets redeemed at the gaming machine 1602. The preprocessed document data 1632 is provided via the network 1604 to the accounting system 1606 or the ticket tracking system 1608. After the processed document data 1630 is received in the accounting system 1606, the two sets of data are compared for discrepancies.

The ticket tracking system 1608 keeps track of the tickets dispensed and the tickets redeemed, and prevents redemption of the same ticket number more than once. For example, when a casino patron redeems a barcoded ticket at the gaming machine 1602, the ticket number may be flagged by the ticket tracking system 1608 as redeemed. Thus, for example, if the casino patron attempted to redeem a photocopy of the barcoded ticket he just redeemed, the ticket tracking system 1608 would inform the gaming machine 1602 not to award any credits or dispense any currency bills for that ticket.

In some embodiments, the bill validator in the gaming machine 1602 is adapted to detect only the ticket number from a barcoded ticket, even if the value is also encoded on the ticket. In such embodiments, when the barcoded ticket is redeemed in the bill validator of the gaming machine 1602, the gaming machine 1602 transmits the ticket number to the ticket tracking system 1608. The ticket tracking system 1608 looks up the ticket number in a database 1634, and the database 1634 returns the value associated with that ticket number. The ticket tracking system 1608 then credits the gaming machine 1602 with the value retrieved from the ticket database unless the ticket database 1608 indicates that the ticket has already been redeemed.

In other embodiments, the casino patron redeems a ticket at a redemption machine (not shown) by inserting the ticket into the device which validates the ticket and dispenses currency bills and/or coins commensurate with the value of the ticket. In such embodiments, the redemption machine is coupled to the ticket tracking system which keeps track of the tickets in the same manner as described above.

As explained in connection with FIG. 15, the system described in FIG. 16 is not limited to the casino environment, but other environments such as a retailer and amusement park environments, for example, are contemplated. In addition, in some embodiments, the ticket tracking system 1516 of FIG. 15 may be incorporated into or a part of the accounting system 1514, or vice versa. In other embodiments, the ticket tracking system 1608 of FIG. 16 may be incorporated into or a part of the accounting system 1606, or vice versa.

Figure 17:
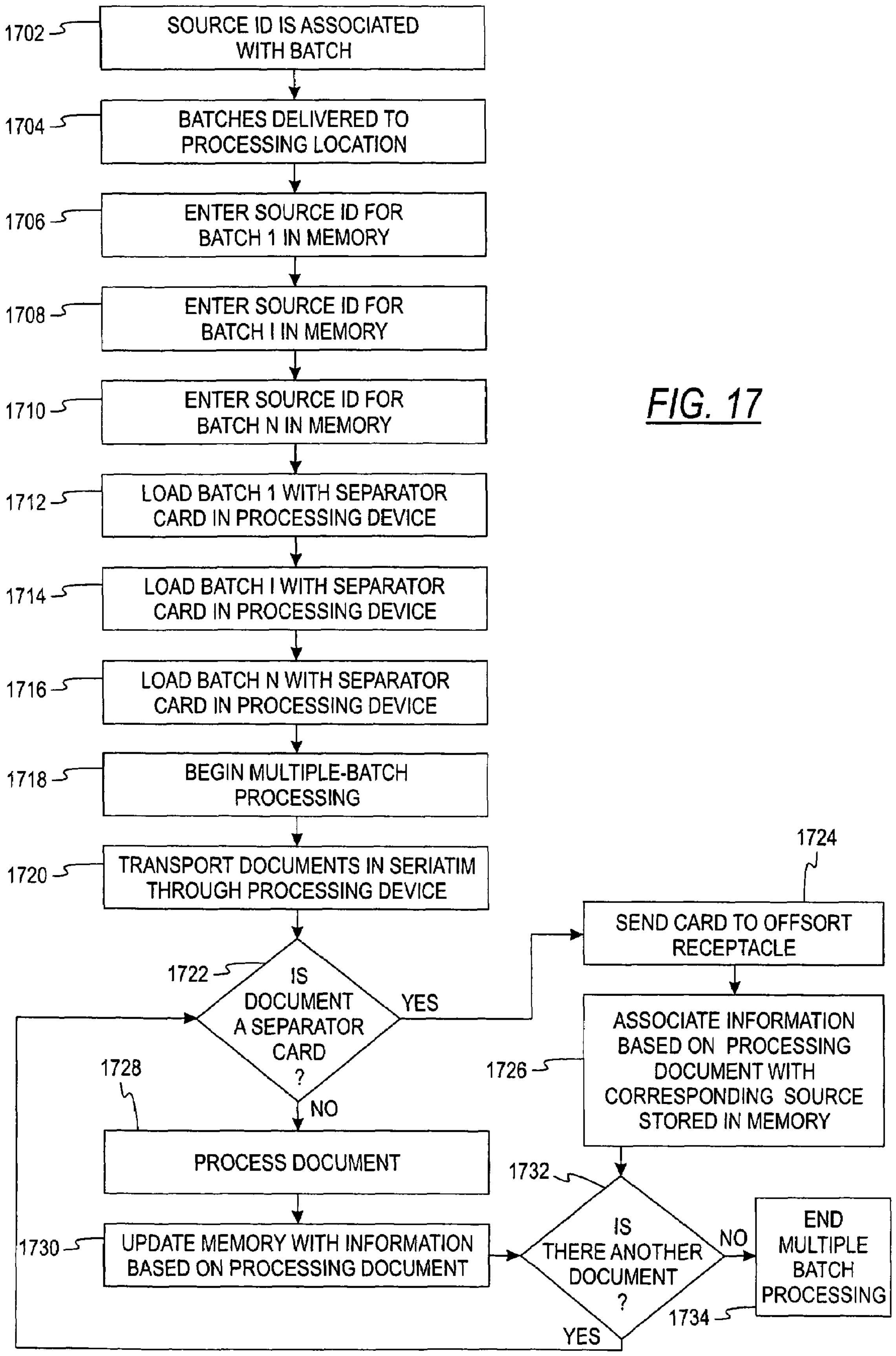
FIG. 17 is a flowchart of a method of multiple batch processing according to an embodiment of the invention.

As indicated above, there are occasions where a bank or a casino have a large number of small batches. In other words, each batch, or sub-batch, might consist of as few as 0 notes (e.g., some casinos will process empty batches for completeness purposes) to maybe 100, 200, 300, or more notes. But the capacity of a typical input receptacle, also referred to as a hopper or feeder area, is much larger. FIGS. 17-22 illustrates methods that focus on running a sequence of batches in a near continuous manner, i.e., multiple-batch processing. The continuous flow of multiple small batches enables the operator to perform other tasks or functions while the machine is processing these various batches. And although a hopper might be able to hold 3, 4, 10 or even 20 batches, it is generally desirable to be able to identify each batch within the hopper with a source from which the batch came, or with other information associated with the batch. With reference to FIG. 17, at step 1702 a source identification information (Source ID) is associated with a batch. The Source ID can be disposed on a barcode card (also referred to as a source identification card) placed in, for example, a gaming machine after the previous batch from that machine is emptied, or associated with the batch after the batch is emptied from that gaming machine. The Source ID represents a set of characters that indicate the device with which the batch is associated, e.g., the gaming machine from which the batch was retrieved. For example, ten slot machines at a casino are emptied, each slot machine has a barcode header card, to, for example, designate, slot 1 for the first batch of documents, slot 2 for the second batch of documents, and so on. At step 1704 the batches of documents are delivered, individually or collectively, to a processing location. At step 1706, the Source ID for batch 1 is entered in memory of the processing machine. The memory can be external to the processing machine, such as in a PC, or internal to the processing machine. The Source ID can be entered by barcode scanning with, for example, a barcode gun, or keyed in via a keyboard. At step 1708, the Source ID for the $i^{th}$ batch is entered in memory. The identification information for each batch is entered until at step 1710, the Source ID for batch n is entered in memory. At step 1712, batch 1 is loaded into the processing device with a separator card. The separator card may be the barcode card comprising the Source ID, or a blank card, or some other appropriate separation structure. Alternatively, the separator may be part of the processing device.

In one embodiment, the Source ID, which is captured from the source identification card, can be compared to a database (or any information library). The comparison can be used, for example, to validate the Source ID. The database can reside on the processing device or can be remotely accessible.

At step 1714, batch i is loaded into the processing device with a corresponding separator card. At step 1716, batch n is loaded into the processing device with a separator card. Batches 1 through n may be loaded at one time, if the input receptacle has enough capacity, or in groups of batches. At step 1718 multiple-batch processing is begun. If all of the batches could not be loaded, the remaining batches can be loaded as device capacity permits.

Continuing with the above example concerning ten gaming machines, assume ten batches can be loaded into the feeding area, or hopper, of the processing device. A barcode gun can be used to capture the Source ID from the header card for the first batch of currency and then the batch of currency is placed in the feeding area. Next, the barcode gun can be used to capture the Source ID from the header card for the second batch, and then the second batch is placed in the feeding area. Next, the header card for the third batch can be barcode gunned (scanned), and the third batch placed in the input receptacle. This process continues until all ten batches are placed in the feeding area. Then, the start key of the processing device is pressed and the processing device begins to run to process the currency.

At step 1720, documents are transported, in seriatim, through the processing device. The device determines, at step 1722, whether or not a document is a separator card. If the document is a separator card, which in some embodiments is a barcode card, the card does not have to be read by the processing device as the card passes through the processing device. The card does not have to be read because the data on the card has already been captured by, for example, barcode gunning (scanning) the header card before loading the corresponding batch.

At step 1724, after determining the document is a separator card, the card is sent to a reject receptacle, such as the upper output receptacle 208*a* of FIG. 2. At step 1726, if the separator card is being used as a header card (positioned in front of the batch) the controller associates information based on processing subsequent documents, until the next separator card is detected, with a corresponding Source ID already stored in memory. Alternatively, if the separator card is used as a trailer card, information based on processing documents between the previous separator card, e.g., the card for batch i−1, and the present separator card, e.g., the card for batch i, is associated with the Source ID for batch i. Since the batches of documents are processed in a sequence consistent with the sequence in which source identification information was entered, the entries in memory of source identification information can be stepped through to match up information based on processing a batch of documents.

At step 1728, where the document is not a separator card, the document is processed for characteristic information to, for example, determine a denomination. At step 1730, the memory is updated with information based on processing the document. And at step 1732, the loop is continued until there is not another document, and then multiple-batch processing ends, at step 1734.

Figure 18A:
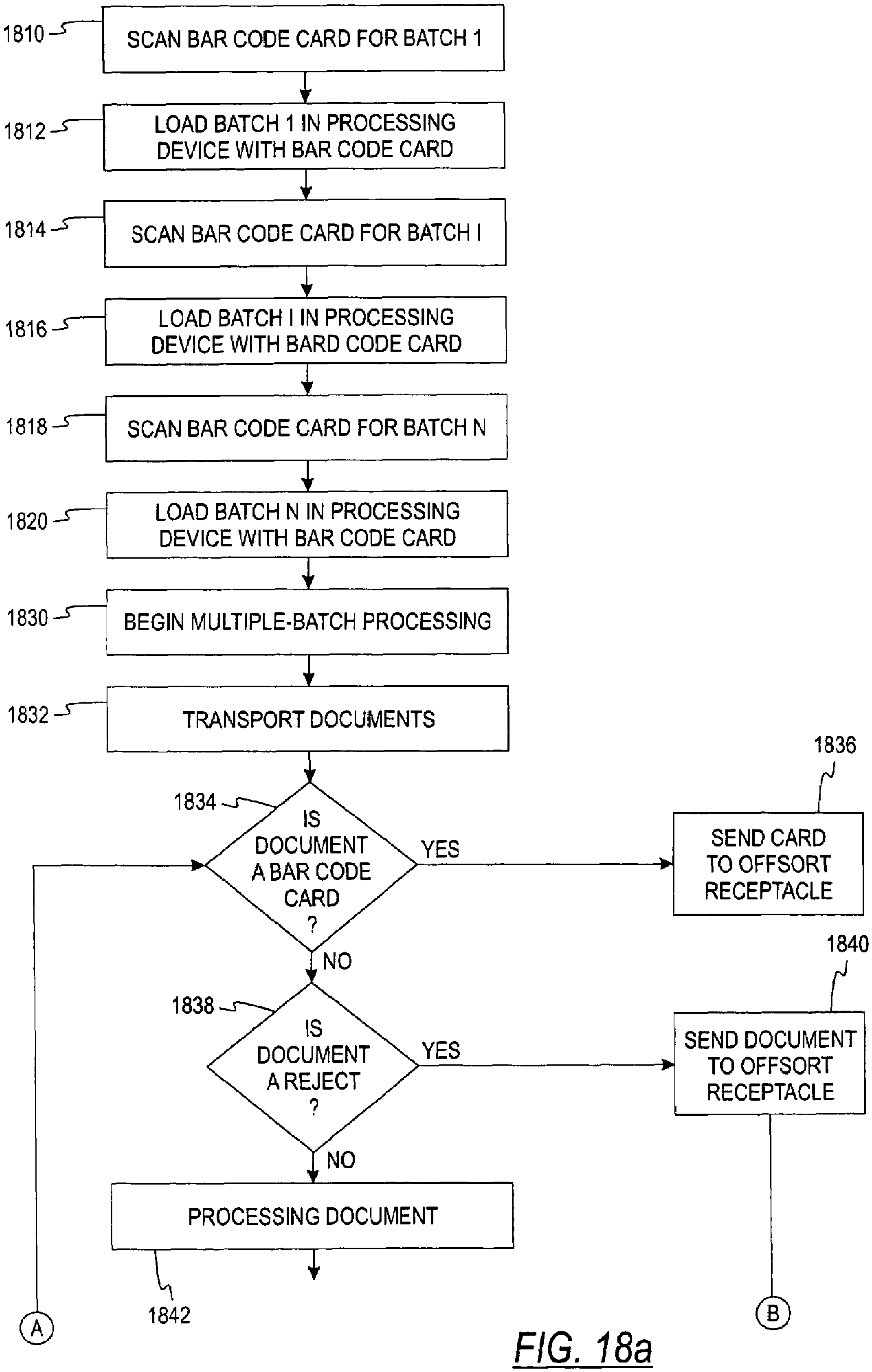
FIG. 18a is a flowchart of a method of multiple batch processing according to another embodiment of the invention.
Figure 18B:
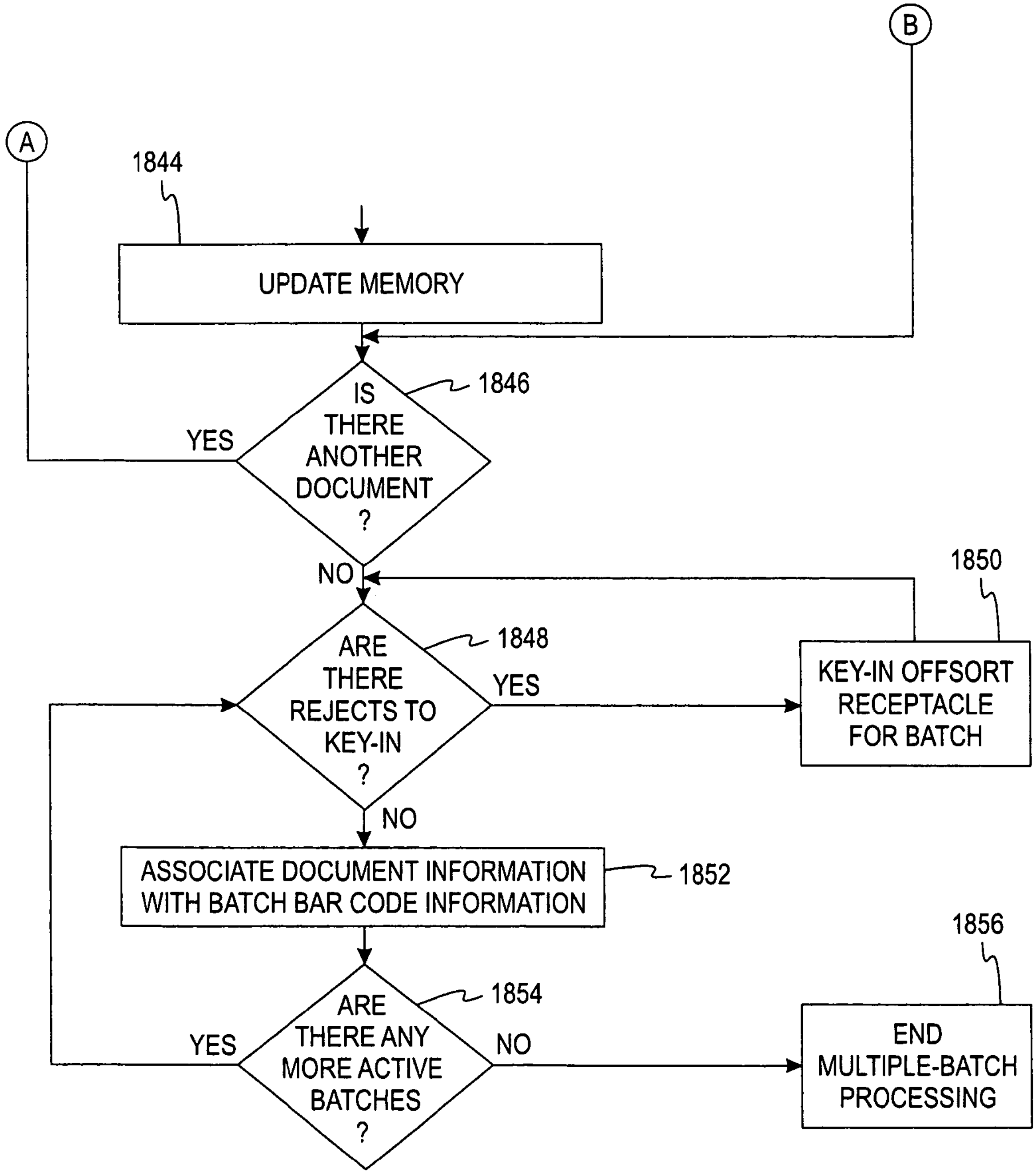

FIG. 18 illustrates a variation of the method illustrated in FIG. 17. At step 1810, the barcode card for batch 1 is scanned to enter the Source ID corresponding to batch 1 into memory. At step 1812, batch 1 is loaded in the processing device, along with the barcode card associated with batch 1. This scanning and loading continues for each batch; at step 1814, the barcode card for batch i is scanned. At step 1816, batch i is loaded in the processing device along with the barcode card for batch i. This process continues until, at step 1818, the barcode for batch n is scanned to enter the information for batch n into memory. At step 1820, batch n is loaded in the processing device along with the barcode card for batch n.

At step 1830, multiple-batch processing is begun. And as discussed in relation to FIG. 17, the barcode card does not have to be read during processing of the documents. At step 1832, documents are transported, one at a time, through the processing device. At step 1834, the processing device determines if the document is a barcode card. If the document is a barcode card the device sends the card, at step 1836, to reject. If the document is not a barcode card, the processing device, at step 1838, determines if the document is a reject, e.g., an unreadable document. If the document is a reject then, at step 1840, the processing device sends the document to reject.

If the document is not a reject, then at step 1842, the processing machine processes the document to obtain characteristic information. At step 1844, memory is updated based on the information obtained from processing the document at step 1842. For example, the count of documents processed for the batch, or the current multiple-batch run, is incremented. Similarly, the total value for the batch may be adjusted based on the document.

If, at step 1846, there is another document to process, then the processing device determines, at step 1834, if the document is a barcode card. If there is not another document, then at step 1848, the processing device queries the operator as to whether or not there are any rejects, e.g., non-machine-readable documents to key in manually. If there are rejects to key in, then at step 1850, the operator can manually key in the rejects associated with the then current batch. If there are no rejects to key in, then at step 1852 the document information in memory for the batch is matched with the batch barcode information for that batch on a sequential basis due to the batches being processed in a sequence consistent with that in which the barcode information was entered.

At step 1854, the processing device determines if there are any more active batches. If there are more active batches then the device, at step 1848 cues the operator as to whether or not there are any rejects to key in. The rejects for the batches are keyed into the processing device in a sequence consistent with the sequence in which the batches were processed. If there are no more active batches, then at step 1856, multiple-batch processing is ended.

Rather than feeding the stacks of documents directly into the input receptacle of the machine, a stack of currency can be removed from a slot machine and placed into a cartridge or cassette with a retractable front gate and a unique number. The header card from the slot machine is scanned or inputted manually and placed either in the front or in back of the stack of currency. The cartridge includes a pressure assembly to keep forward pressure on the documents as they are fed into the feeding mechanism of a document processing machine. This process is repeated for other slot machines until the cartridge is full. The cartridge is placed into the feeding mechanism and its unique number is entered manually or automatically into the machine. During processing, when a header card is present, the machine does not interpret the information encoded on the card. The header cards of each batch are sent to a reject pocket along with any rejected currency identified in the respective batch. The cartridge loading station terminal could be networked to the customer's host computer system whereby the transaction numbers could be downloaded to cross-check the validity of the entered number and provide the currency processing employees with a list of missing or duplicate entries.

Figure 19:
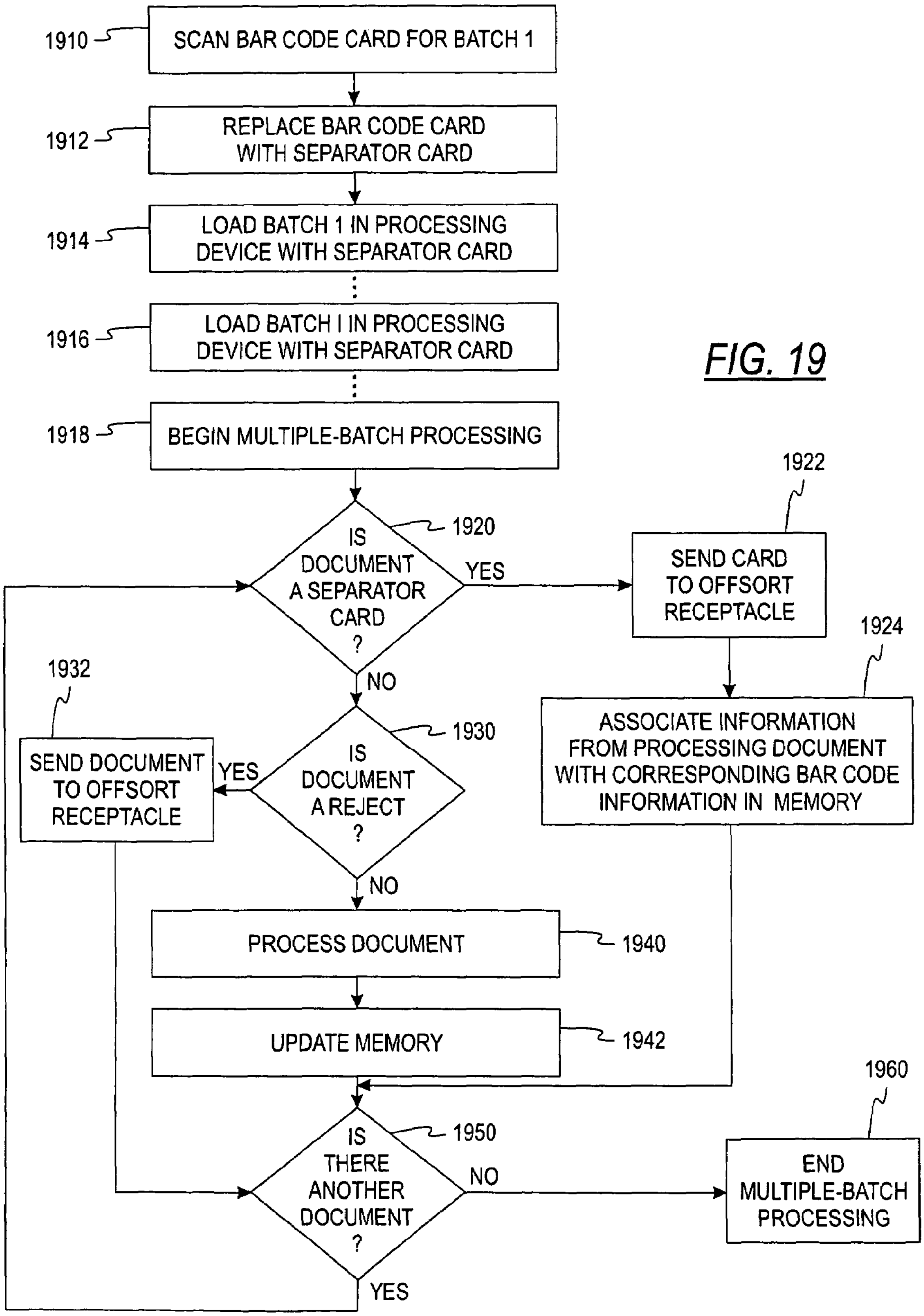
FIG. 19 is a flowchart of a method of multiple batch processing according to another embodiment of the invention.

FIG. 19 illustrates an alternate method of multiple-batch processing. At step 1910, the barcode card for the batch 1 is gun scanned. The barcode card for batch 1 is replaced, at step 1912, with a separator card. At step 1914, batch 1 is loaded into the processing device along with the separator card. This routine is repeated for each subsequent batch. For example, at step 1916 batch i is loaded into the processing device along with a separator card. After all the batches are loaded into the processing device, into the feed hopper, for example, then at step 1918 multiple-batch processing is started. If the total quantity of documents of the batches exceeds the capacity of the feed hopper, the batches can be processed in groups, where each group includes multiple batches.

Each document is then transported one at a time through the document processing device. If, at step 1920, a document is determined to be a separator card, then the device, at step 1922, sends the card to reject. In methods in which the separator card is used as a header card, the processing device then, at step 1924, sets a flag indicating a separator card has been reached so that information from processing documents between this separator card and the next separator card will be associated with bar code information corresponding to this separator card. The barcode information in memory is associated with the information from document processing on a sequential basis. For example, the barcode information entered from the $i^{th}$ barcode will be associated with the information obtained for processing documents of the $i^{th}$ batch of documents. The barcode information entries in memory can, for example, be stepped through on a first-entered-first-batch basis or a last-entered-first-batch basis. In methods in which the separator card is used as a header card, the documents following the $i^{th}$ header card belong to the $i^{th}$ batch of documents. In methods in which the separator card is used as a trailer card, then the information from processing documents between the previous separator card and the current separator card are associated with the current separator card. Then the current separator card, the $i^{th}$ separator card, is associated with the $i^{th}$ barcode information in memory, on a sequential basis.

If at step 1920 the document is not a separator card, then at step 1930, if the document is a reject, e.g., not readable or not genuine, then the document is, at step 1932 sent to reject. If the document is not a reject, then, at step 1940, the document is processed to, for example, determine its denomination. Memory is updated at step 1942. For example, the number of documents processed and the total denomination for a particular batch may be determined and stored in memory. That information is matched to, for example, the proper source ID in memory by stepping through source IDs in memory, by, for example, taking one step for each batch processed.

If, at step 1950, there is another document to be processed, then the process continues again, at step 1920. Multiple-batch processing ends at step 1960, if there is not another document to process.

Figure 20:
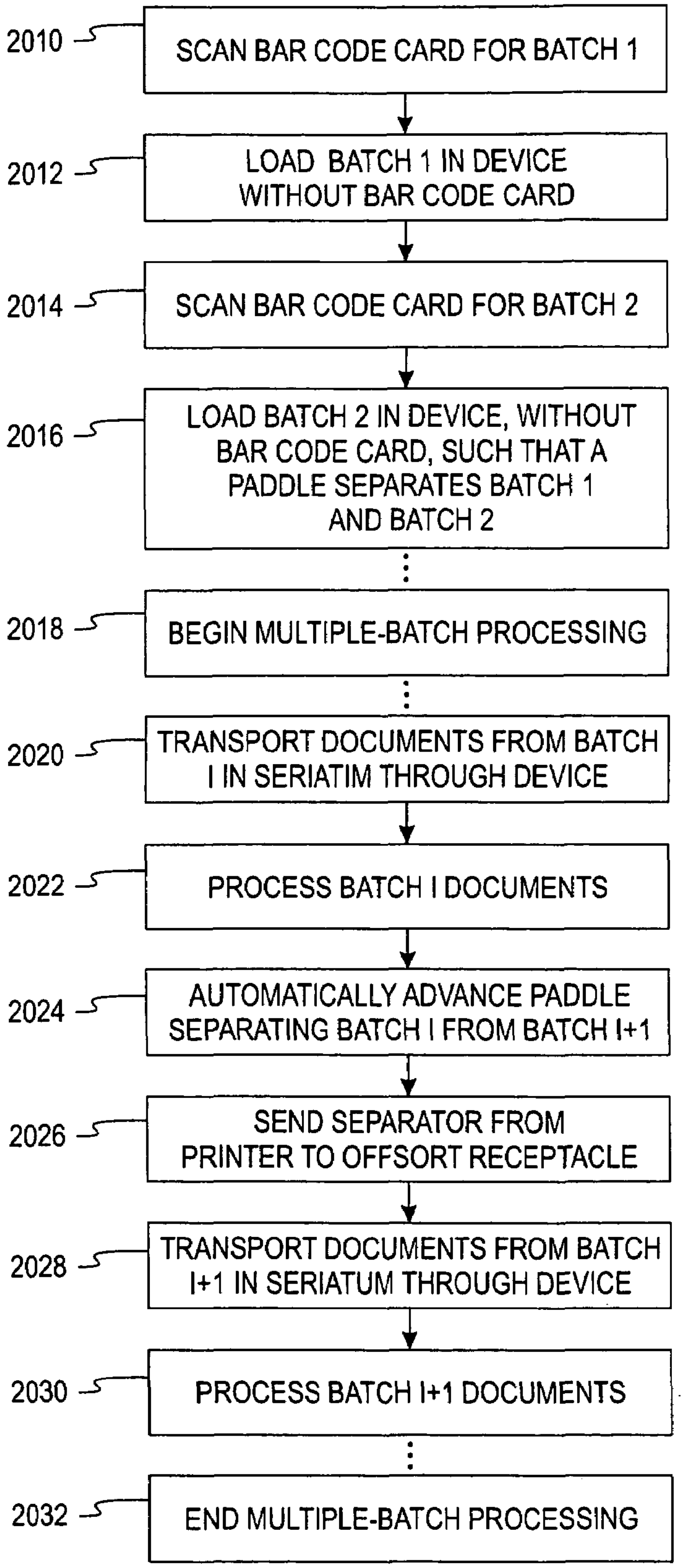
FIG. 20 is a flowchart of a method of multiple batch processing according to another embodiment of the invention.

FIG. 20 illustrates a method of processing documents similar to that of FIG. 19, except that the barcode card is not replaced with a separator card. At step 2010 the barcode card for batch 1 is gun scanned. At step 2012, batch 1 is loaded into the device without the barcode card. In a variation, batch 1 is loaded into the device, without a barcode card, before the information from the barcode card is gun scanned.

At step 2014, the barcode card for batch 2 is scanned. Batch 2 is then, at step 2016, loaded into the device without corresponding barcode such that a paddle separates batch 1 and batch 2. This general routine continues until at step 2018, multiple-batch processing is begun.

With reference to the $i^{th}$ batch, at step 2020, the document processing device transports documents from batch i, one at a time, through the device. Each document of batch i is, at step 2022, processed to assess document characteristics. And then, at step 2024, the processing device automatically advances the paddle separating batch i from batch i+1. At step 2026, a separator is sent from a printer to reject to separate rejects of batch i from rejects of batch i+1. Then at step 2028 documents from batch i+1 are transported, one at a time, through the processing device. And at step 2030, batch i+1 documents are processed.

The separator is not required to be ejected from the printer to the reject receptacle, e.g., output receptacle 208*c* or 208*a*, prior to beginning to transport documents from batch i+1 through the device. The controller controls sequencing such that documents from i+1 that are rejected do not enter the reject until after the separator ejected from the printer enters the reject. This general process continues until, at step 2032, multiple-batch processing is complete.

As an alternative to the paddle method, another embodiment uses a sequence of input receptacles, each of which contains one batch to be sorted. The batches include header cards with either barcodes to be scanned or data to be entered manually using a keyboard. The receptacles are configured in-line, or in a "lazy susan" configuration. The receptacles approach the feeder sequentially, and when the first receptacle is empty, the second receptacle move to the feeder. This process continues until all input receptacles are empty. To differentiate the source of the bills in the reject receptacle, in an embodiment, a printer is coupled to the device and prints a card that is placed in the reject receptacle at the start of each batch processed. The information printed on the card informs the user as to which bills in the reject receptacle correspond to which batch sorted.

Figure 21:
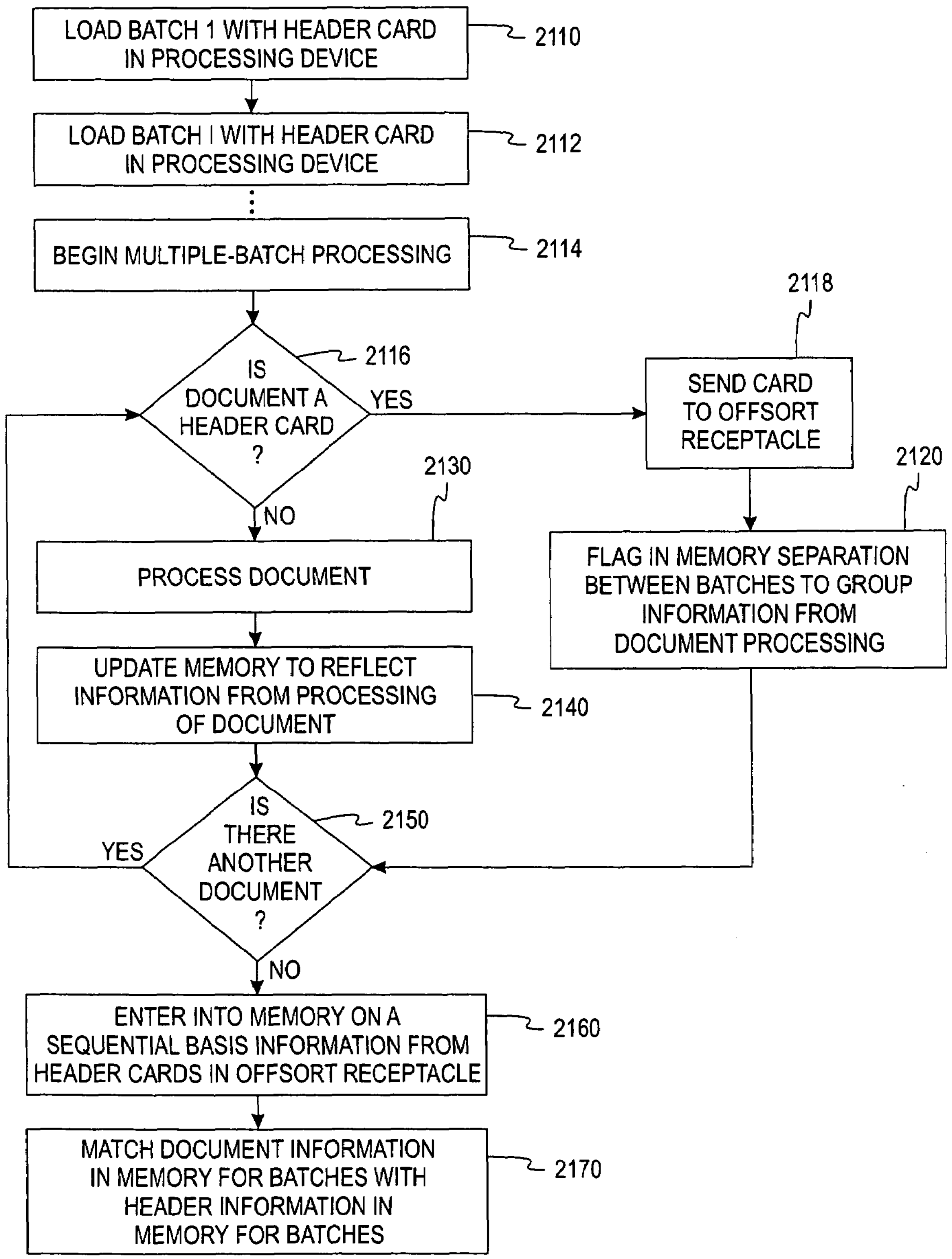
FIG. 21 is a flowchart of a method of multiple batch processing according to another embodiment of the invention.

FIG. 21 illustrates yet another method of multiple-batch processing. At step 2110, batch 1 is loaded with a header card in the processing device. And each batch is loaded with its header card in succession into the processing device with its header card. For example, at step 2112 batch i is loaded with its header card in the processing device. And then at step 2114 multiple-batch processing is begun.

If, at step 2116, a document is determined to be a header card, then at step 2118, the card is sent to reject. At step 2120 a flag is set or pointer is moved in memory to indicate a separation between batches has been reached. If at step 2116 the document card is not a header card, then at step 2130, the document is processed to assess characteristic information. At step 2140 the memory is updated to reflect information from processing that document.

If at step 2150 there is another document to process, then processing continues again at step 2116. After all the documents have been processed, then at step 2160 information from each of the header cards, which have been collected in reject, e.g. output receptacle 208*a* or 205*c*, are entered into memory on a sequential basis. Then, at step 2170 document information in memory for each batch is matched with header information that has been entered for each batch on a sequential basis. To simplify the matching process, the information from the header cards, e.g. source ID, should be entered into memory in an order consistent with the order in which the batches were processed. As an alternative to matching document information in memory after all of the header card information has been entered, document information for each batch can be matched with information as the information from each card is entered from a header card that has been collected in reject.

Figure 22A:
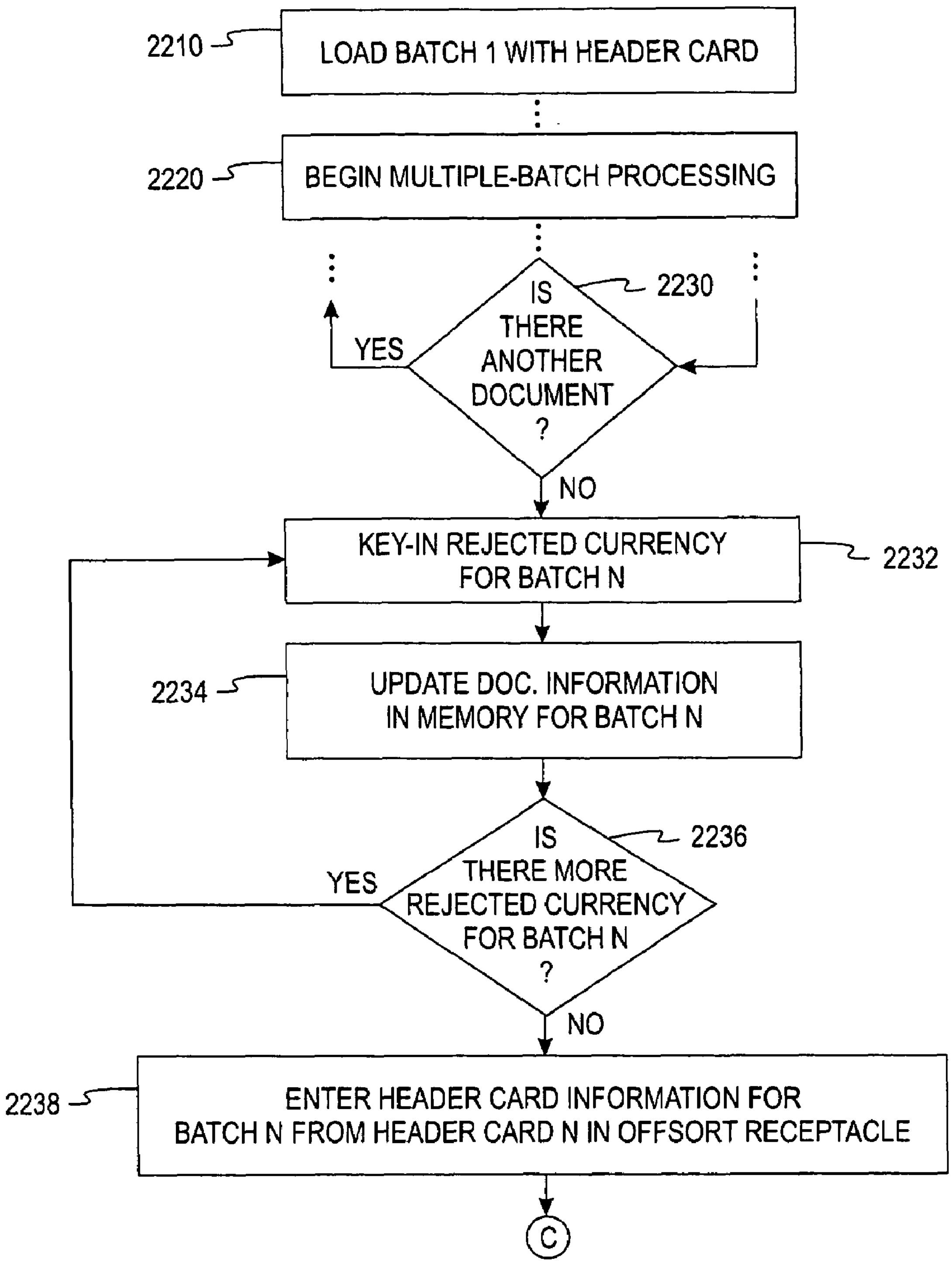
FIG. 22a is a flowchart of a method of multiple batch processing according to another embodiment of the invention.
Figure 22B:
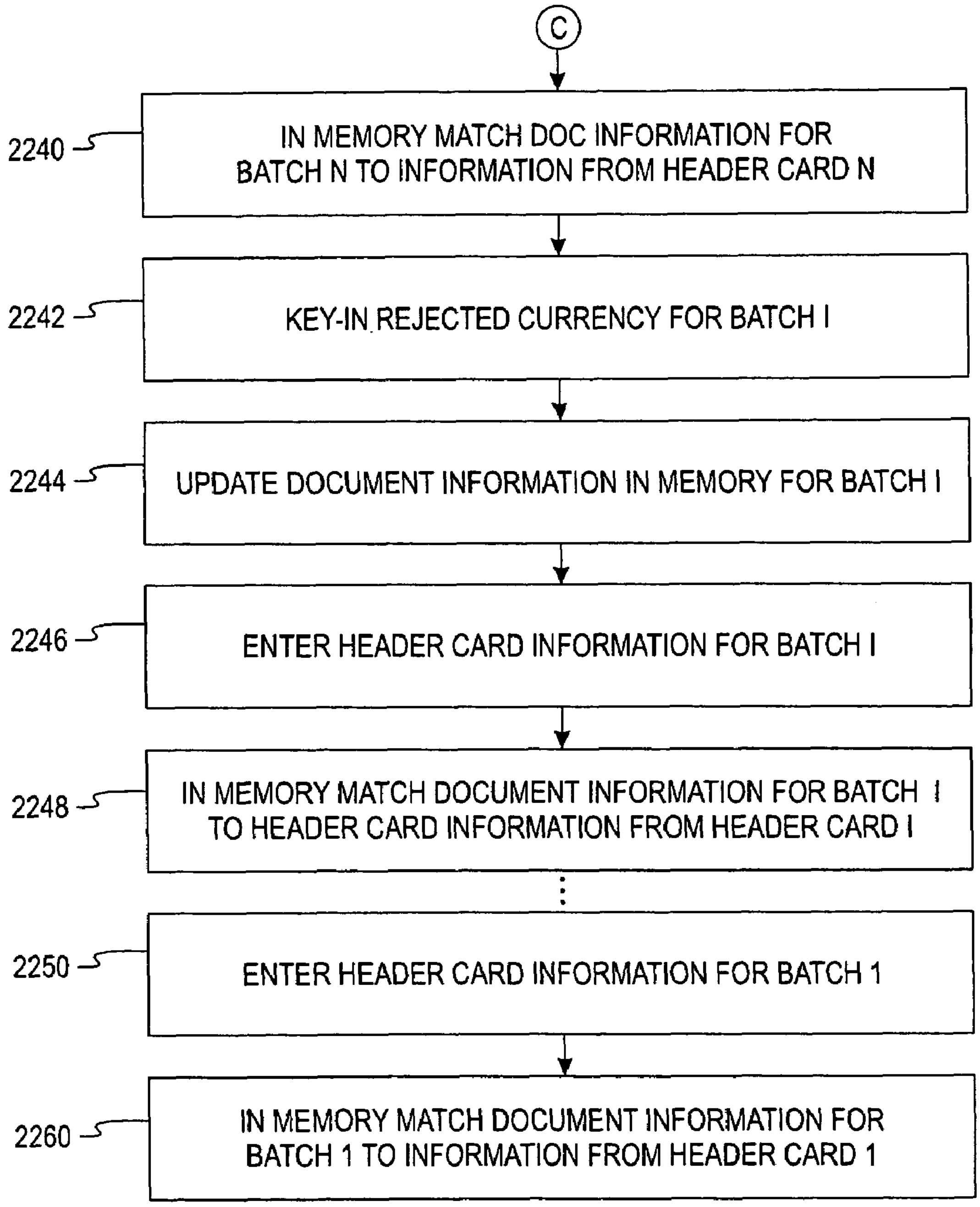

FIG. 22 illustrates a method of multiple-batch processing in which rejected currency is keyed in for each batch. Similar to what has been described with respect to some methods above, at step 2210 batch 1 is loaded into the processing device with a header card. Loading continues until the feed hopper is full or all the batches have been loaded. And then at step 2220 multiple-batch processing is started. If at step 2230 there is not another document to process, then at step 2232 the processing device prompts the operator to key in rejected currency for batch n. In step 2234 document information in memory batch n is updated. At step 2236 the processing device queries the operator as to whether there is more rejected currency for batch n. If there is more rejected currency for batch n, then the operator returns to step 2232 to key in more rejected currency.

In one method the operator enters all the rejected currency for a given batch, without the processing device prompting the operator each time for additional rejected currency from that batch. After the rejected currency for the given batch is entered, the operator notifies the processing device that all rejected currency for the given batch has been entered.

If there is no additional rejected currency for batch n, then at step 2238 the operator enters header card information for batch n from header card n collected in reject. At step 2240, document information in memory for batch n is matched to information from header card n.

This general process of entering rejected currency and header card information continues for each batch. For example at step 2242 rejected currency for batch i is keyed in. At step 2244 document information in memory corresponding to batch i is updated with the keyed in information. At step 2246, header card information for batch i is entered. And then at step 2248 document information for batch i is matched to header card information from header card i. This process continues until the header card information for batch 1 is entered, at step 2250. At step 2260, document information for batch 1 is then matched with information obtained from header card 1 that was collected in reject.

Figure 23:
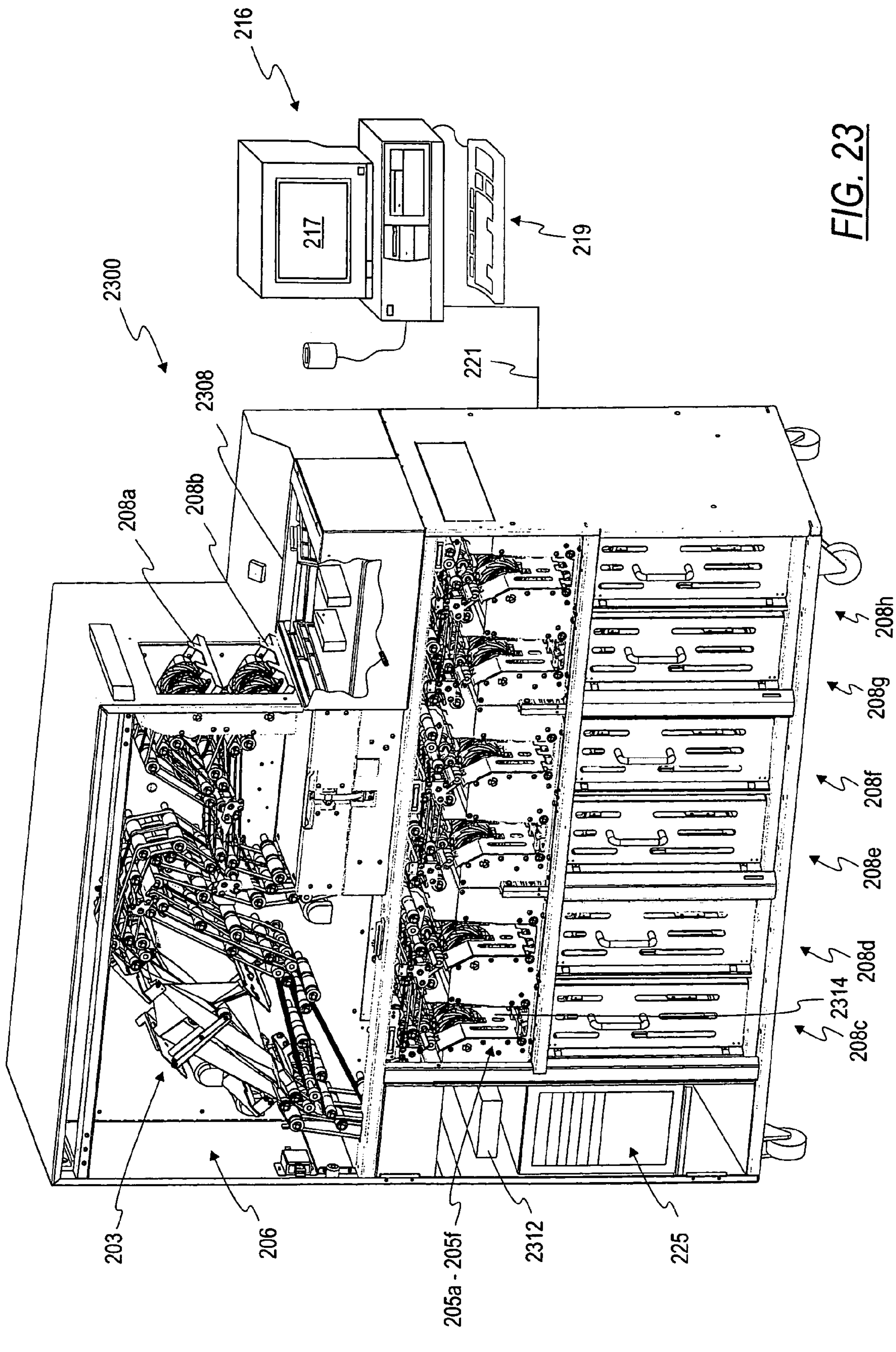
FIG. 23 illustrates a document processing according to an embodiment of the invention.

FIG. 23 illustrates a document processing device 2300 that is suited for multiple-batch processing. Document processing device 2300 is similar to the processing device 200 illustrated in FIGS. 2 and 3 above. Accordingly, previously-described components are not discussed here. Processing device 2300 includes a barcode gun 2302, connected to memory, for entering source identification information from a barcode card into memory. After scanning the barcode for batch 1, batch 1 is loaded into the input receptacle 202 at a first location 2304 in the input receptacle 202. After scanning the barcode card for batch 2, batch 2 is loaded into the input receptacle 202 at a second position 2306 of the input receptacle 202 such that a paddle 2308 separates batch 1 from batch 2.

After the $n^{th}$ batch is placed in the input receptacle 202, multiple-batch processing is started. Transport mechanism 206 guides each document, one at a time, through the valuation region 204. Paddle 2308 automatically advances as documents are transported through the processing device 2300. After the last document from batch 1 is processed, printer 2310 ejects a separator to reject output receptacle 208*a*. Where output receptacle 208*c* is also used as a reject receptacle, printer 2312 can send a separator to escrow portion 205*a* through slot 2314. A controller controls the sequencing of the transport mechanism and printers 2310 and 2312 to provide a separator in reject 208*a* and escrow portion 205*a* in order to separate rejected documents from sequential batches.

In one embodiment, when paddle 2308 gets to the front of input receptacle 202, where the documents are being stripped into the transport mechanism 206, the paddle 2308 remains idle until the entire batch has been cleared through the machine, or the machine is timed out, for example. The paddle then automatically removes itself from the transport path by, for example, folding flush with the feed mechanism and allowing the feed mechanism to continue to advance.

Where Source ID information has already been entered into memory via, for example, barcode gun 2302, printers 2310 and 2312 can print the source identification information on the separator card by, for example, known ink jet, thermal, laser, dot matrix, or stamping methods.

In some embodiments it is desirable to separate two or more categories of reject documents into two or more reject receptacles. In a method in which a separator card is processed with the documents of the batch, the separator card can be sent to one reject, such as 208*a*, and printer 2312 can eject a separator card into another reject, such as 205*a*.

In other embodiments, a document processing device, such as shown in FIGS. 1*a* and 23, includes a printing or marking device which can print or mark documents with a variety of information, including a date, time, operator, text, and so forth. In other embodiments, the document processing device, such as shown in FIG. 1*a*, may not include the media detector 112, and includes the printing or marking device described above. The printing or marking can be done using known ink jet, thermal, laser, dot matrix, or stamping methods. Referring to FIG. 1*a*, for example, the printing or marking can be done at any time along the transport mechanism 106, and the printing or marking is controlled by the controller 114. The controller 114 instructs the printing or marking device not to mark certain documents, such as currency or a document that needs to be reprocessed. Control may be obtained in other ways, such as by placing the printing or marking device at a location where no currency or documents to be reprocessed will appear. In an embodiment, the printing or marking device is placed proximate the output receptacle 108 to mark all documents routed to that particular output receptacle.

Some casino gaming commissions may begin requiring that casino tickets be marked with the word VOID after they are collected in the back room. By incorporating a printing or marking device in the document processing device, the word VOID can be printed or marked on a casino ticket that has been processed.

The printing or marking device may also be used in connection with any of the methods described in connection with FIGS. 17-22*b*. A printing or marking device is disposed near an input receptacle or along a transport mechanism path. A blank card is inserted into the input receptacle and is printed or marked in-line before being sent to an output receptacle. Rejected documents can be routed to the same output receptacle such that all of them appear behind the blank card which has been printed or marked. Account numbers or other information is imported into the document processing device via a network, for example, or is entered into the document processing device manually via a keyboard or keypad, for example, and the account number or other information is printed or marked on the blank card.

Any of the embodiments described in connection with FIGS. 17-22*b* may be adapted to include two cards, a first card that is a barcode card as described above and a second card that is a separator card. Multiple batches are deposited into the input receptacle of the document processing device. Each batch includes the first card which includes a Source ID, the separator card, and a stack of currency bills and/or substitute currency media. The first card is routed to a first output receptacle of the document processing device, such as a first upper output receptacle. The separator card is routed to a second output receptacle, such as a second upper output receptacle, along with any rejected currency bills and/or rejected substitute currency media. In this manner, rejected documents from separate batches will be separated by the separator cards in the document processing device.

In an embodiment, the separator cards described immediately above may be sequentially numbered, such as, 1, 2, 3, 4, etc., using a printing or marking device, and the sequence number is matched using software with a corresponding Source ID.

Finding a Document in a Stack of Documents

Figure 24:
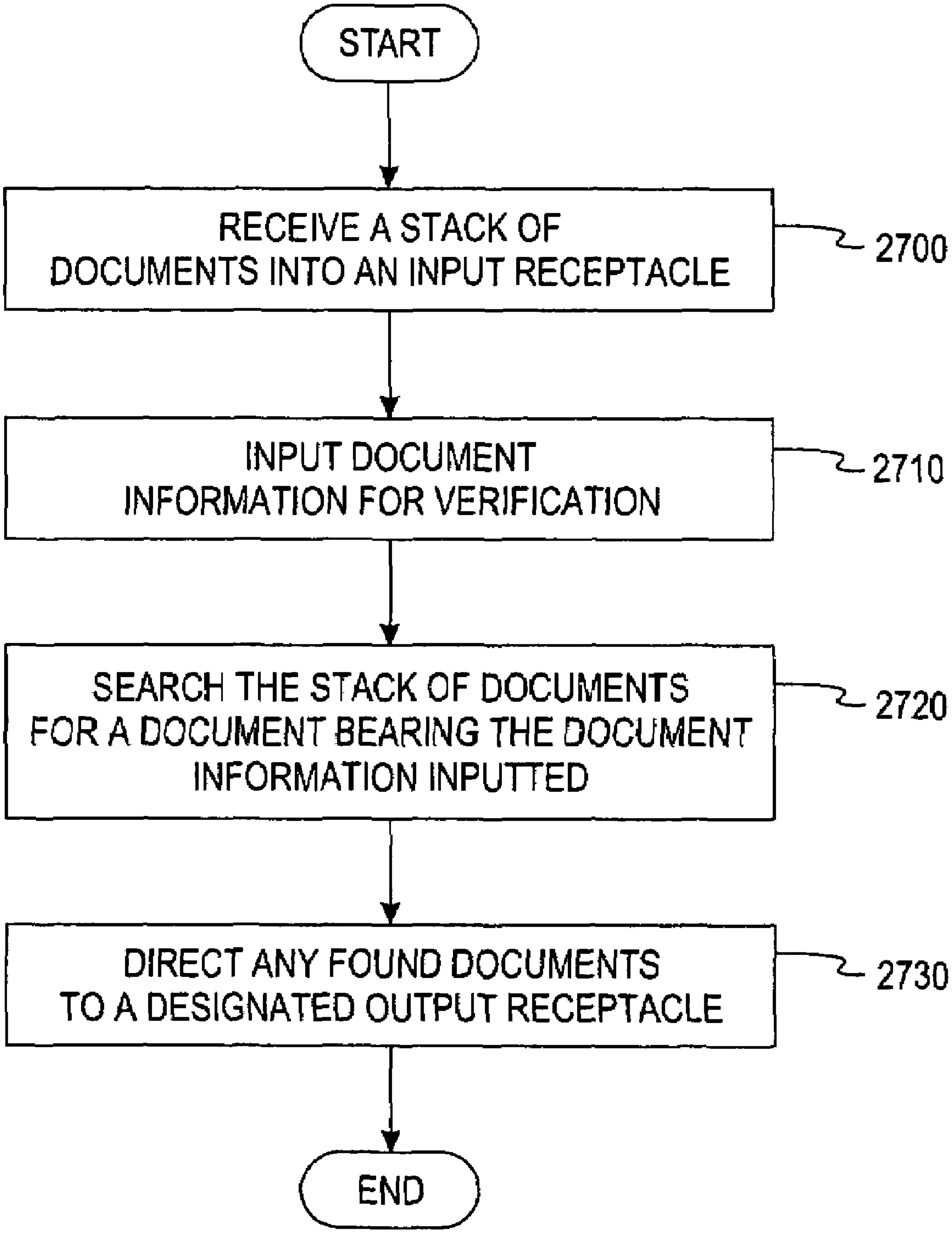
FIG. 24 is a flowchart of a method for finding a document according to one embodiment of the present invention.

Referring now to FIG. 24, a method of processing documents will be described for finding a document located in a stack of documents. Generally, the documents in the stack of documents are first processed in a document processing device, and then the documents are physically stored in a storage location or electronically imaged and stored on a media such as a DVD-ROM, a hard drive, for example. The processing of the documents may be performed according to any method as described above in connection with FIGS. 1*a*-23, and the document processing device may be any document processing device as described above in connection with FIGS. 1*a*-23. However, sometimes it is necessary to retrieve a specific document for verification purposes. For example, if an amount redeemed for a casino ticket is larger than the expected amount for that particular ticket, then the physical ticket may need to be visually inspected. Clearly, the process of finding the desired ticket can be extremely timeconsuming particularly if the ticket is stored among thousands or hundreds of thousands of tickets.

At step 2700, a stack of documents is deposited into an input receptacle of a document processing device. The stack of documents may include a combination of currency bills and substitute currency media, or it may include currency bills only or substitute currency media only. Sources of the stack of documents include a storage facility, a gaming machine, or a coupon machine, for example.

At step 2710, an operator inputs document information for verifying a specific document. The document information includes a document-identifier that is characteristic of the specific document which is sought. For example, a document-identifier can be a barcode, a serial number, a color or black-and-white pattern, a magnetic strip, or any other identifying characteristic that could distinguish one document from another document. In other embodiments, the document-identifier can be a combination of characteristics, such as, for example, a barcode and a color pattern. In a specific embodiment, the document-identifier is a ticket number. The operator inputs one or more document-identifiers by using an input device such as a control unit, which in alternate embodiments can be a control unit as described above in connection with FIGS. 1*a*-23, e.g., a touch screen, and/or a keyboard.

At step 2720, the document processing device searches the deposited stack of documents for the document bearing the document information which was inputted at step 2710. The documents are transported, one document at a time, past a detector, from the input receptacle to one or more of a plurality of output receptacles. The documents are transported via a transport mechanism along a transport path, and the transport mechanism can be any transport mechanism, such as any of the transport mechanisms described above in connection with FIGS. 1*a*-23. The documents may be transported along the transport path at a rate in the range of at least about 500 documents per minute to at least about 1,600 documents per minute. The detector scans the document-identifier of each document to determine whether a scanned document-identifier matches the specific document-identifier, which was inputted by the operator at step 2710. The instructions for determining whether a document-identifier matches the specific-document identifier can be stored in the memory, such as, for example, in the form of a computer program.

In one embodiment of the present invention, the control unit includes a visual indicator for indicating when a specific document has been found. For example, the visual indicator can be a plurality of lights, such as light-emitting diodes or display elements on a video display, which change from one color to a different color when a corresponding specific document has been found, e.g., the light changes from gray to green. The visual indicator may include a light or a display element on a video display that changes colors for each of the inputted document-identifiers. In an alternate embodiment, there is a single light or display element for all of the inputted document-identifiers. In still another embodiment, the light does not change colors, rather, it only turns on or off when a specific document has been found. It should be understood that the visual indicator may be any other indicator that provides the operator with a visual notification that a specific document has been found.

The present invention contemplates that the operator may input one document-identifier at a time or more than one, such as up to ten, document-identifiers at a time. Each time a document corresponding to the document-identifier under consideration is located, that document can be routed to any operator-specified or pre-programmed output receptacle.

In another embodiment of the present invention, the control unit includes an audio indicator for audibly indicating when a specific document has been found. For example, the audio indicator can be a single beep sound, a series of beep sounds, a continuous sound, a pre-recorded message (e.g., "Your document has been found"), or any other sound patterns. Alternatively, the audio indicator may be used in connection with the visual indicator for providing both a visual and an audio indication that a specific document has been found.

At step 2730, after making a determination that a document-identifier matches the specific document-identifier inputted by the operator, the document processing device directs the specific document to a designated output receptacle. In one embodiment, the document processing device stops after the specific document is directed to the output receptacle. The operator may remove the specific document and then instruct the document processing device to proceed in making additional identifications. Alternatively, the document processing device automatically restarts after the specific document has been removed from the output receptacle. As described above in connection with FIGS. 1*a*-23, the document processing device may, in alternate embodiments, have one or more output receptacles, e.g., one output receptacle, two output receptacles, or eight output receptacles, and, consequently, the directing of the found documents will vary according to how many output receptacles are included in the document processing device. For example, if the document processing device has a single output receptacle, the document processing device can halt after directing a specific document to the output receptacle and restart after the specific document has been removed. If the document processing device has a plurality of output receptacles, then at least one of the output receptacles is designated for receiving a specific document. Thus, the specific document or specific documents can be directed to a first output receptacle, such as an off-sort receptacle, and all the other documents can be directed to the other output receptacles. If the limit of an output receptacle is reached before all the documents in a stack of documents have been processed, then the document processing device stops to allow the removal of the document from the full output receptacle, or, in another embodiment, the document processing device directs the remaining documents to be processed to a next output receptacle.

In one embodiment, the limit of an output receptacle is 2,000 documents. If all the output receptacles are full, then the operator should clear at least one document from at least one output receptacle before the document processing device can continue processing the documents from the stack of documents. Alternatively, the operator can clear output receptacles on-the-fly without stopping of the document processing device. If a feed error (e.g., no calls, chains, doubles, skew errors, and suspects) or a jam occurs, it should be handled as described above in connection with FIGS. 1*a*-23.

In another embodiment, the document processing device includes storage cassettes as described above in connection with FIGS. 1*a*-23. The storage cassettes can be used by the operator for transporting the documents to be searched to the input receptacle and for storing the documents after the documents have been processed. An advantage of the storage cassettes is that they provide a more convenient means for transferring documents to and from the document processing device.

The searching stops when all the specific tickets have been found or when all of the documents in the input receptacle have been processed. In one embodiment, the searching stops after all the specific tickets have been found. The operator must remove the unprocessed documents from the input receptacle and combine them with the processed documents from the output receptacle(s). This embodiment can be used with a document processing device having a single output receptacle. The output receptacle receives the processed documents, and when a specific ticket is found, operation stops to permit removal of the ticket for inspection. The ticket can then be returned to the output receptacle, and the processing may continue or the two stacks from the input and output receptacles can be combined.

In another embodiment, all the tickets from the stack of documents received in the input receptacle are processed even if all the specific tickets are found before the last ticket from the stack of documents is processed. An advantage of this approach is that the operator does not have to combine the tickets from the input receptacle and the tickets from the output receptacle in order to recreate the original stack of documents.

In still another embodiment, when the last specific ticket is found, the operation pauses to give the operator an option of continuing to process the remaining documents or to halt operation and manually recreate the original stack of documents. For example, if the last ticket to be searched is found within the first few documents in the stack of documents, it may be faster to halt operation and manually recreate the original stack of documents, rather than allowing processing to continue through all of the remaining documents in the stack. On the other hand, if the last ticket to be searched is found towards the end of the stack of documents, the operator may wish to continue processing the remaining documents rather than manually combining the remaining documents with the processed documents.

As described above, a visual and/or audio indicator notifies the operator that a ticket has been found, and the operator can easily remove the ticket from the designated output receptacle for inspection. In another embodiment, the visual and/or audio indicator may notify the operator that a duplicate ticket having the same ticket number as a previously found ticket (e.g., a potentially counterfeit ticket), has been found. Duplicate tickets can be sent to the same output receptacle as the previously found ticket, or they can be sent to a different output receptacle. For example, if the previously found ticket is sent to a first off-sort pocket, then the duplicate tickets can be sent to a second off-sort pocket.

Figure 25:
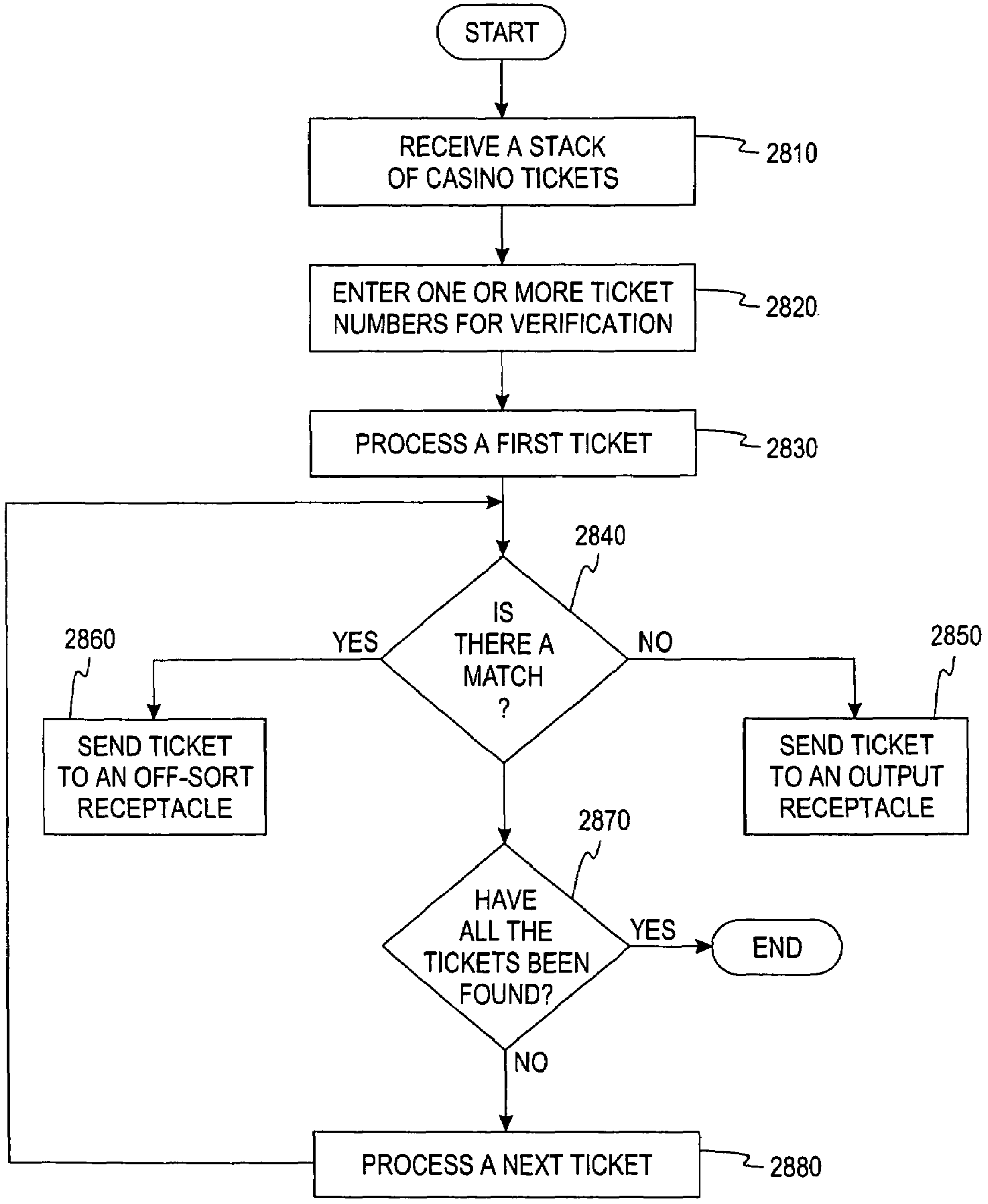
FIG. 25 is a flowchart of a method for finding a document according to another embodiment of the present invention.

Referring now to FIG. 25, an example of a ticket verification method will be described in more detail. In one embodiment, the document processing device includes eight output receptacles, two of the eight output receptacles being off-sort pockets used for receiving either rejected tickets or found tickets. An operator selects a "ticket verify" mode from a menu of options and then is prompted to clear any storage cassettes located in the document processing device. The menu of options may be presented to the operator on a video display overlaid by a touchscreen, for example. Other or additional input devices include a mouse, a keyboard, or switches. In a specific embodiment, the "Ticket Verify" screen displays a number of buttons and options, including a numeric keypad, ten ticket number fields with indicators, a start or continue button, a stop button, an end-verify button, and an exit button.

At step 2810, a cassette having a stack of casino tickets, which can be retrieved, for example, from a storage facility, is deposited into an input receptacle of the document processing device. Each of the casino tickets bears an encoded and/or unencoded ticket number for identification purposes. The operator, at step 2820, uses the numeric keypad or other suitable input device to enter up to ten ticket numbers that require verification. The entered ticket numbers are stored in the memory of the document processing device.

After all the ticket number have been entered, the operator presses the start button or otherwise initiates operation of the document processing device. At step 2830, a first ticket from the stack of tickets is processed by the document processing device. A detector in the document processing device scans the ticket number of the first ticket and, at step 2840, a determination is made whether there is a match between the scanned ticket number and any one of the entered ticket numbers. If a determination is made that a match does not exist between any one of the entered ticket numbers and the first ticket number, then, at step 2850, the first ticket is directed to a first output receptacle. If a determination is made that a match exists between any one of the entered ticket numbers and the first ticket number, then, at step 2860, the first ticket is sent to a first off-sort output receptacle and the indicator associated with the found ticket number notifies the operator that the specific ticket has been found. At step 2870 a determination is made whether all the tickets corresponding to the entered ticket numbers have been found. If tickets remain to be found, then the document processing device, at step 2880, processes the next ticket in the input receptacle. The next ticket undergoes a similar process as the first ticket, repeating steps 2840 through 2870, and the process ends when all the specific tickets have been found.

Finding a Stack of Documents in a Plurality of Stacks of Documents

Figure 26:
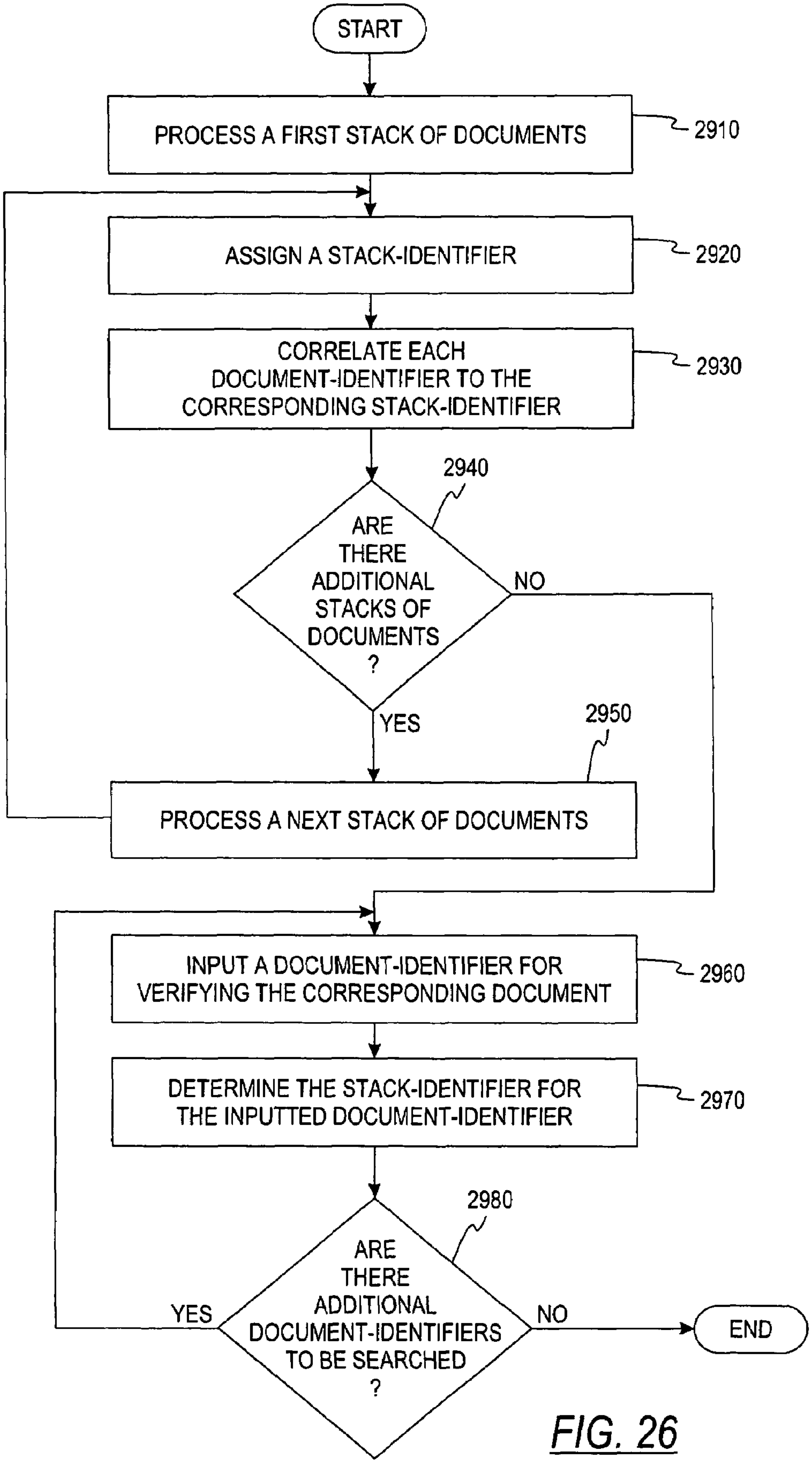
FIG. 26 is a flowchart of a method for finding a stack of documents according to one embodiment of the present invention.

Referring now to FIG. 26, a method of processing documents will be described for finding a particular stack of documents located in a plurality of stacks of documents. This mode of operation will be referred to as Reference Mode. Places of business such as casinos and retailers deal with large numbers of documents, e.g., currency bills, casino tickets, and store coupons, which are, in general, processed and then stored as stacks of documents. On any given day, there could be thousands or tens of thousands of documents that are processed by a document processing device. To verify whether specific document was processed on a particular day, an operator might have to search every stack of documents that was processed on that day. For example, if a document processing device processes 50,000 documents in one day, and the documents are stored in stacks of 2,000 each, the operator might have to search through each one of the 25 stacks of documents before the specific document is found. Therefore, although the verification method described above in connection with FIGS. 24 and 25 can decrease the time and effort required to find a specific document, a method of processing documents that actually identifies the specific stack of documents which contains the specific document requiring verification would further decrease the time and effort required for verifying a specific document.

At step 2910, a first stack of documents is processed, one document at a time, by a document processing device. The document processing device can be any document processing device, such as any of the document processing devices described in connection with FIGS. 1*a*-23, and the processing method can be any processing method, such as any of the document processing methods described in connection with FIGS. 1*a*-23. The first stack of documents is complete when the predetermined number of documents for the first stack of documents is reached, e.g., 2,000 documents.

At step 2920, the document processing device assigns a stack-identifier to the first stack of documents. Like a document-identifier, which identifies a particular document, a stack-identifier identifies a particular stack of documents. More specifically, a stack-identifier may be anything that identifies a particular stack of documents, e.g., any combination of one or more numbers, a date, or a barcode pattern. The number may be a reference number uniquely identifying a stack of documents or it may refer to the number of documents in the cassette containing the stack of documents.

In one embodiment, the stack-identifier is printed on a card, such as a batch identification card or header card as described above. In another embodiment, the stack-identifier is printed on a receipt after processing a stack of documents, which is placed at the head or at the back of a stack of documents. Alternately, the stack-identifier is printed on a sticker that may be affixed to the container or bag containing the stack of documents.

At step 2930, the document processing device correlates each document-identifier in the first stack of documents with the stack-identifier assigned to the first stack of documents. In one embodiment, the correlation is carried out by generating a list or table that associates each document-identifier with the corresponding stack-identifier. This list is stored in a memory of the document processing device.

At step 2940, a determination is made whether additional stacks of documents require processing. If so, then at step 2950, a next stack of documents is processed as described above in connection with steps 2920-2940. If additional stacks of documents do not require processing, then at step 2960, the operator inputs a specific document-identifier for verifying a specific document, wherein the specific document is the document corresponding to the specific document-identifier. The inputting of the specific document-identifier may be carried out in the manner described above in connection with FIGS. 24 and 25.

At step 2970, the document processing device determines the specific stack-identifier which corresponds to the inputted document-identifier. In one embodiment, the determination is made by software that executes instructions stored in memory for searching and retrieving the specific stack-identifier from a memory of the document processing device. The stack-identifier is displayed to the operator on a video display or may be printed on a receipt so that the operator can bring the receipt to the storage facility to retrieve the stack of documents corresponding to the stack-identifier.

At step 2980, a determination is made whether there are additional document-identifiers for which stack-identifiers need to be identified. If there are additional document-identifiers that need to be referenced, steps 2960 through 2980 are repeated. If there are no additional document-identifiers that require verification, then the process ends. Note that the operator may enter several document-identifiers at a time before the document processing device searches for the correlating stack-identifiers.

The document processing device displays to the operator which stack of documents corresponds to each inputted document-identifier. Alternately, the document processing device prints a receipt that shows the inputted document-identifier(s) along with the corresponding stack-identifier(s). The operator may bring this receipt to the storage facility to retrieve the proper stack(s) of documents to be searched.

Figure 27:
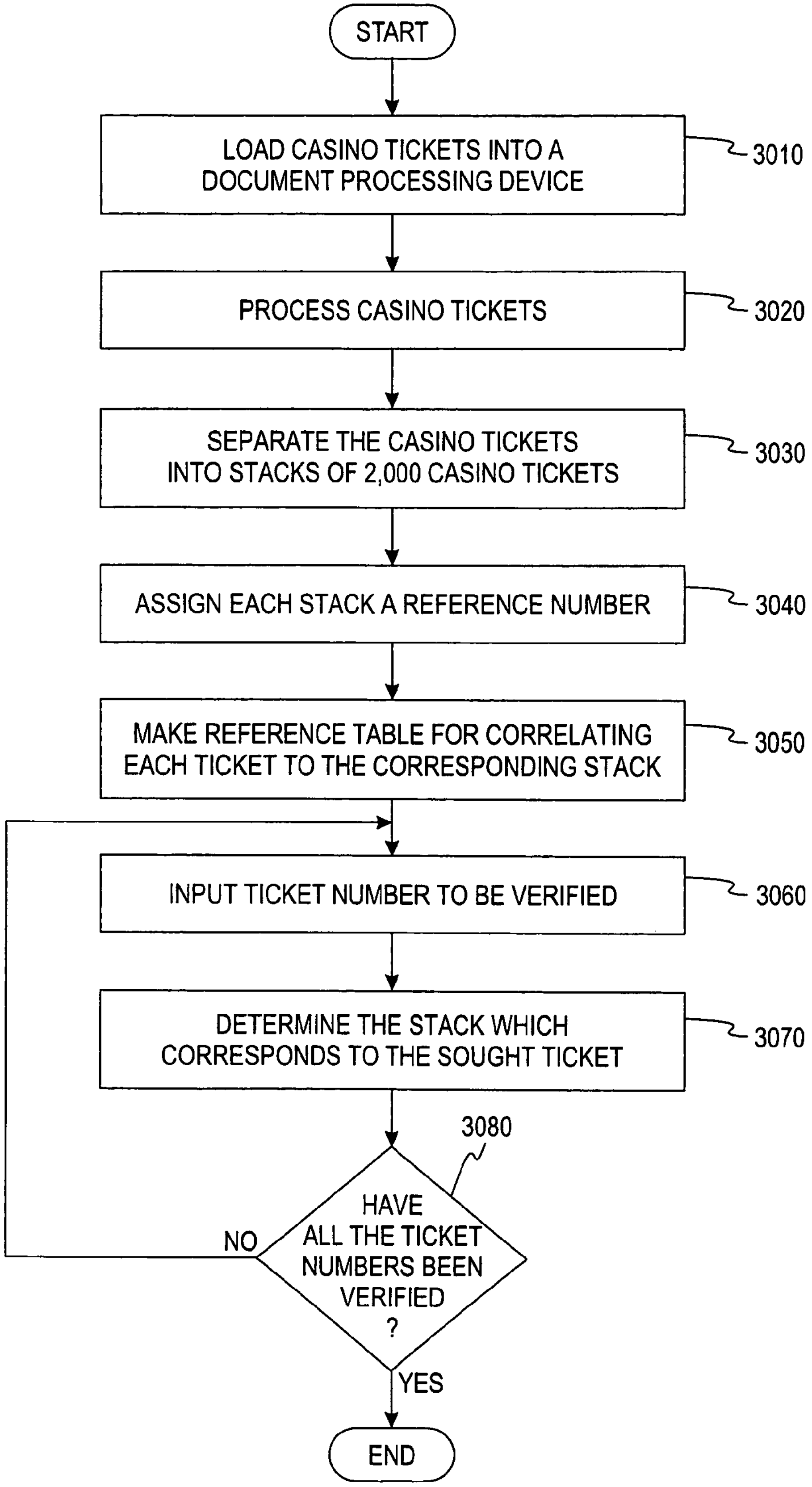
FIG. 27 is a flowchart of a method for finding a stack of documents according to another embodiment of the present invention.

Referring now to FIG. 27, another example of the method for finding a specific stack of documents described above in connection with FIG. 26 will be described. At step 3010, a stack of casino tickets are deposited into the input receptacle of the document processing device. At step 3020, the tickets are processed using any processing method described above in connection with FIGS. 1*a*-26.

At step 3030, as the document processing device processes the tickets, they are separated into stacks of up to 2,000 tickets. When a storage cassette is full, i.e., contains 2,000 tickets, subsequent tickets are automatically redirected to another non-full storage cassette. At step 3040, a stack-identifier, is assigned to each stack of tickets. A receipt may be optionally printed that shows the date on which the stack was created, the number of documents in the cassette, and the reference number corresponding to the cassette or stack of tickets. Then, at step 3050, a reference table is made that correlates each ticket to its corresponding stack of tickets, and the reference table is saved in a memory of the document processing device.

At step 3060, an operator uses a touchscreen or other suitable input device to enter a ticket number, which corresponds to a ticket that requires verification. For example, the document processing device may present to the operator a "Ticket Search" command and a data field for entering the specific ticket number for which the corresponding stack needs to be located. At step 3070, the document processing device determines which stack of tickets corresponds to the inputted ticket number and notifies the operator. At step 3080, the document processing device determines whether all the ticket number have been verified. In the current example, there was only one ticket number inputted and, therefore, the process is finished. If there are more ticket numbers to be processed, then the document processing device repeats steps 3060-3080. After locating the specific stack corresponding to the specific ticket number, the operator either manually searches the specific stack or uses the method described above in connection with FIGS. 24 and 25.

Alternative Embodiments

Figure 28:
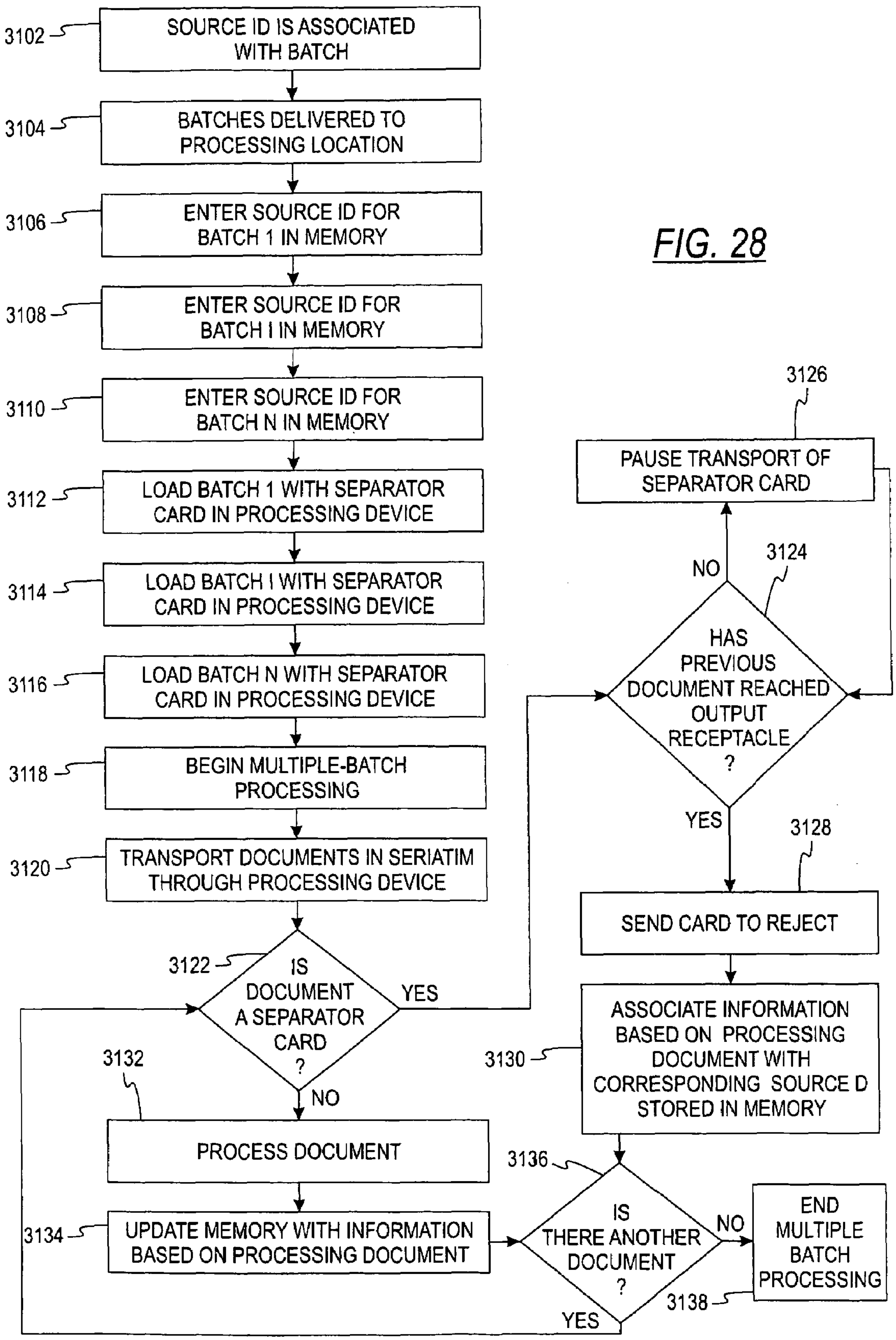
FIG. 28 is a flowchart of a method of multiple batch processing according to a further embodiment of the present invention.

As previously described, there are occasions where a bank or a casino have a large number of small batches. In other words, each batch, or sub-batch, might consist of as few as zero notes (e.g., some casinos will process empty batches for completeness purposes) to maybe 100, 200, 300, or more notes. But the capacity of a typical input receptacle, also referred to as a hopper or feeder area, may be much larger. FIGS. 28-33 illustrate methods that focus on running a sequence of batches in a semi-continuous manner, i.e., multiple-batch processing. The semi-continuous flow of multiple small batches enables the operator to perform other tasks or functions while the machine is processing these various batches. And although a hopper might be able to hold 3, 4, 10 or even 20 batches, it is generally desirable to be able to identify each batch within the hopper with a source from which the batch came, or with other information associated with the batch. With reference to FIG. 28, at step 3102 a source identification information (Source ID) is associated with a batch. The Source ID can be disposed on a barcode card (also referred to as a source identification card) placed in, for example, a gaming machine after the previous batch from that machine is emptied, or associated with the batch after the batch is emptied from that gaming machine. The Source ID represents a set of characters that indicate the source with which the batch is associated, e.g., the gaming machine from which the batch was retrieved. For example, when ten slot machines at a casino are emptied, each slot machine may have a barcode header card associated therein. For example, a first header card (header card #1) is associated with the bills removed from the first slot machine, a second header card (header card #2) is associated with the second slot machine, and this pattern continues for each of the slot machines up to a tenth header card (header card #10) that is associated with the tenth slot machine. Header card #1 may have a barcode and/or other indicia which identifies or associates it with the first slot machine. Header card #2 through header card #10 have similar indicia to identify or associate them with their corresponding slot machines. For example, header card #1 may have "00001" barcoded on it. Header card #2 may have "00002" barcoded on it. This pattern continues for the remaining header cards. The "00001" serve to indicate that the card is associated with slot machine #1. Alternatively, other numbers, characters, or other information may be encoded on header card #1, or that information is associated with a particular slot machine via a table or index which may be stored on a computer system. For example, header card #15 may be removed from slot machine #214 along with a stack of bills. Header card #15 may have an alphanumeric sequence such as "X16YB" encoded thereon and a computer system may recognize that "X16YB" is associated with slot machine #214.

At step 3104 the batches of documents are delivered, individually or collectively, to a processing location. At step 3106, the Source ID for batch 1 is entered in memory of the processing machine. The memory can be external to the processing machine, such as in a PC, or internal to the processing machine. The Source ID can be entered in any number of ways such as by barcode scanning with, for example, a barcode gun, or keyed in via a keyboard. At step 3108, the Source ID for the $i^{th}$ batch is entered in memory. The identification information for each batch is entered until at step 3110, the Source ID for batch n is entered in memory. At step 3112, batch 1 is loaded into the processing device with a separator card. The separator card may be the barcode card comprising the Source ID, or a blank card, or some other appropriate separation structure. Alternatively, the separator may be part of the processing device.

In one embodiment, the Source ID, which is captured from the source identification card, can be compared to a database (or any information library). The comparison can be used, for example, to validate the Source ID. The database can reside on the processing device or can be remotely accessible.

At step 3114, batch i is loaded into the processing device with a corresponding separator card. At step 3116, batch n is loaded into the processing device with a separator card. Batches 1 through n may be loaded at one time, if the input receptacle has enough capacity, or in groups of batches. At step 3118 multiple-batch processing is begun. If all of the batches could not be loaded, the remaining batches can be loaded as device capacity permits.

Continuing with the above example concerning ten gaming machines, assume ten batches can be loaded into the feeding area, or hopper, of the processing device. A barcode gun can be used to capture the Source ID from the header card for the first batch of currency and then the batch of currency is placed in the feeding area. Next, the barcode gun can be used to capture the Source ID from the header card for the second batch, and then the second batch is placed in the feeding area. Next, the header card for the third batch can be barcode gunned (scanned), and the third batch placed in the input receptacle. This process continues until all ten batches are placed in the feeding area. Then, the start key of the processing device is pressed and the processing device begins to run to process the currency.

At step 3120, documents are transported, in seriatim, through the processing device. The device determines, at step 3122, whether or not a document is a separator card. If the document is a separator card, which in some embodiments is a barcode card, the card does not have to be read by the processing device as the card passes through the processing device. The card does not have to be read because the data on the card has already been captured by, for example, barcode gunning (scanning) the header card before loading the corresponding batch. According to an alternate embodiment, the card would be read again to ensure it is the expected separator card.

At step 3124, after determining the document is a separator card, the processing device determines if the document preceding the separator card has reached an output receptacle. The document preceding the separator card may also be sent to an offsort receptacle or a reject receptacle, which are special types of output receptacles, if the device is unable to denominate the document, or if the document was another separator card. If the device determines that the preceding document has reached an output receptacle, the device transports the separator card to an output receptacle, such as an offsort receptacle which is a type of output receptacle (step 3128). If, however, the device determines that the preceding document has not yet reached an output receptacle, the device pauses the transport of the separator card (step 3126) and other documents upstream of the separator card in the transport mechanism, including documents that have not been fed out of the input receptacle. Once the device determines that the document preceding the separator card has reached an output receptacle (step 3124), the device transports the separator card (step 3128).

At step 3128, after determining the document is a separator card and the preceding document has been transported to an output receptacle, the separator card is sent to a reject receptacle, such as the upper output receptacle 208*a* of FIG. 2. At step 3130, if the separator card is being used as a header card (positioned in front of the batch) the controller associates information based on processing subsequent documents, until the next separator card is detected, with a corresponding Source ID already stored in memory. Alternatively, if the separator card is used as a trailer card, information based on processing documents between the previous separator card, e.g., the card for batch i−1, and the present separator card, e.g., the card for batch i, is associated with the Source ID for batch i. Since the batches of documents are processed in a sequence consistent with the sequence in which source identification information was entered, the entries in memory of source identification information can be stepped through to match up information based on processing a batch of documents.

At step 3132, where the document is not a separator card, the document is processed for characteristic information to, for example, determine the denomination of the document. At step 3134, the memory is updated with information based on processing the document. And at step 3136, the loop is continued until there is not another document, and then multiple-batch processing ends, at step 3138.

Figure 29A:
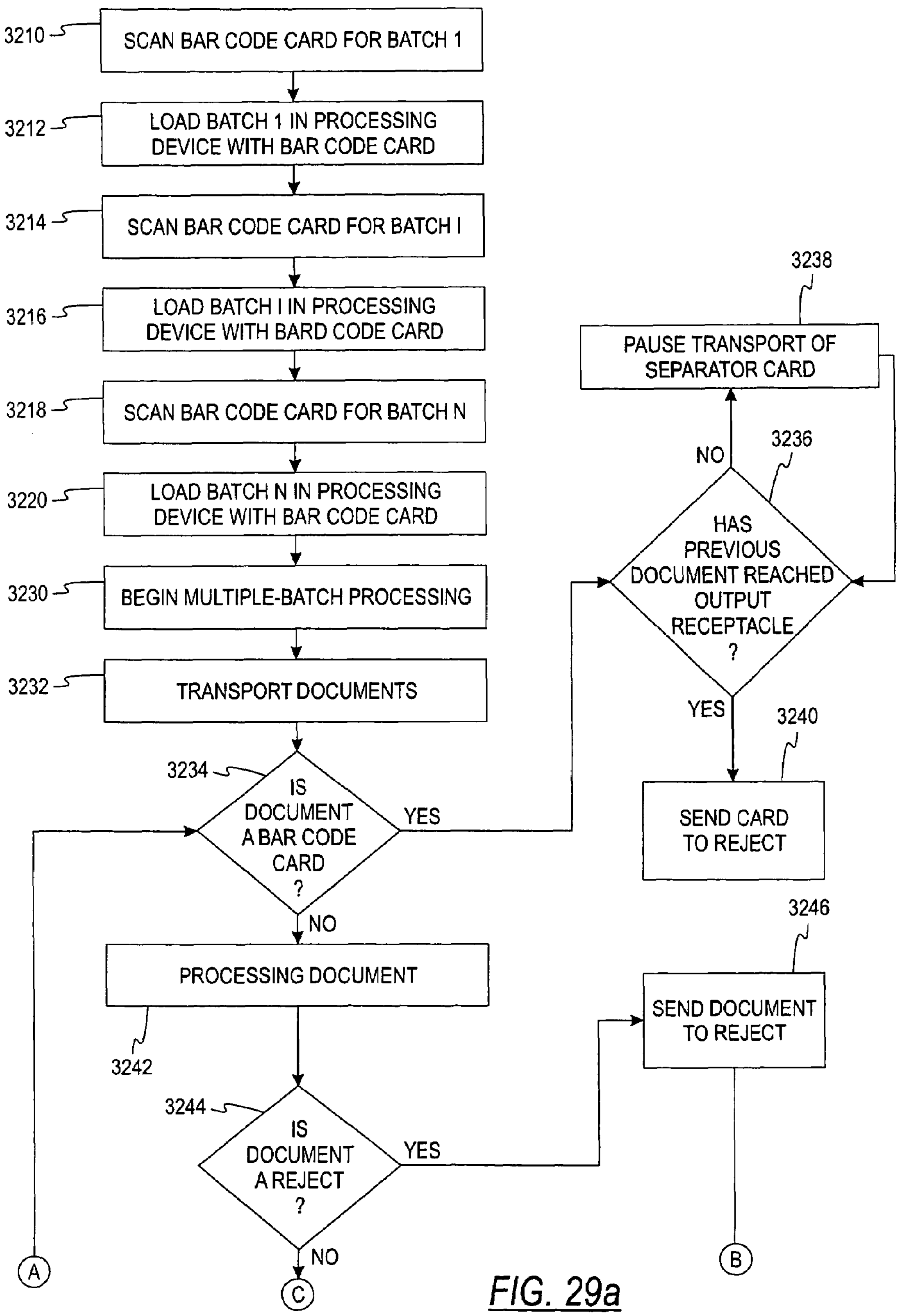
FIG. 29a is a flowchart of a method of multiple batch processing according to yet a further embodiment of the present invention.
Figure 29B:
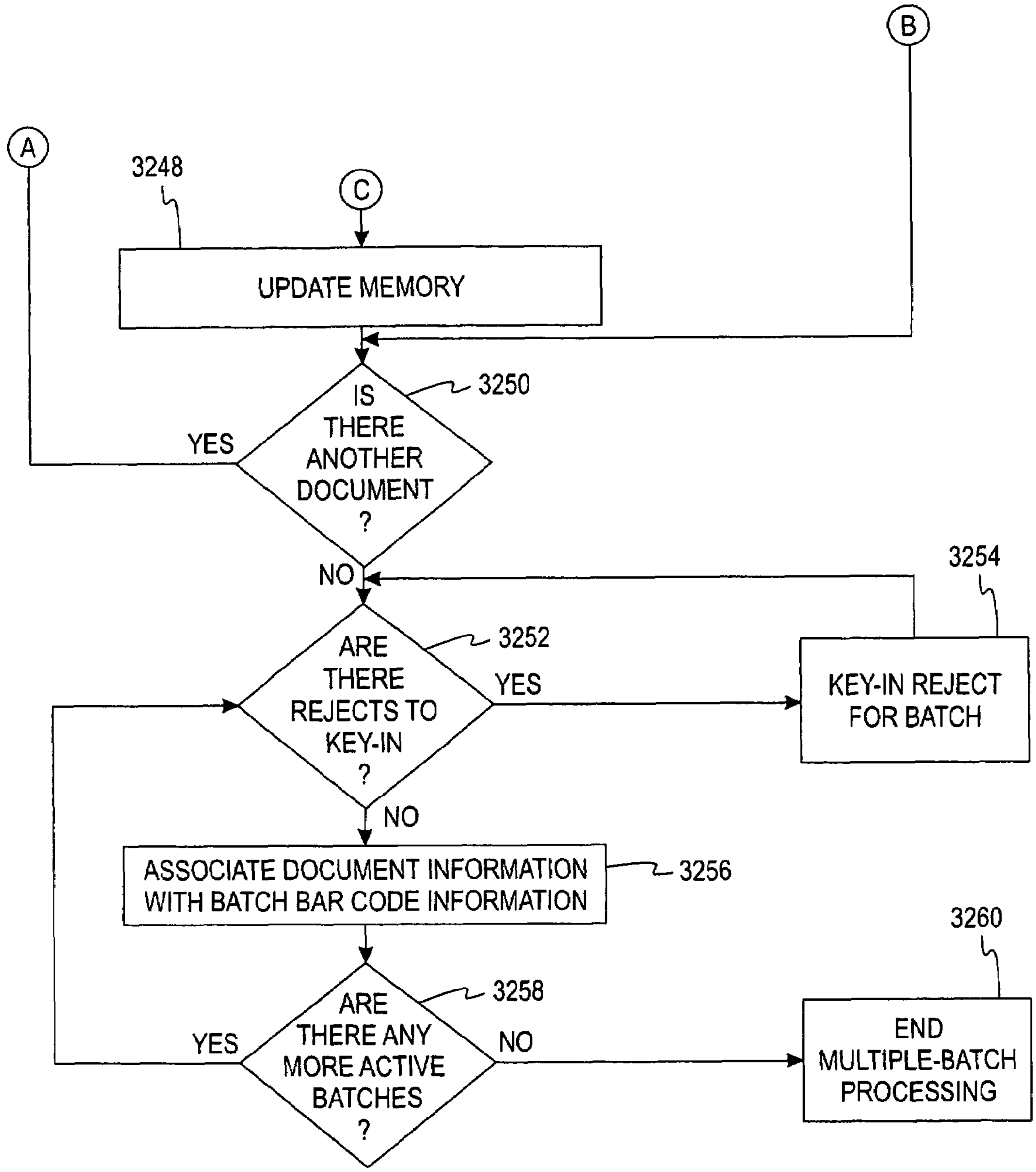

FIG. 29 illustrates a variation of the method illustrated in FIG. 28. At step 3210, the barcode card for batch 1 is scanned to enter the Source ID corresponding to batch 1 into memory. At step 3212, batch 1 is loaded in the processing device, along with the barcode card associated with batch 1. This scanning and loading continues for each batch; at step 3214, the barcode card for batch i is scanned. At step 3216, batch i is loaded in the processing device along with the barcode card for batch i. This process continues until, at step 3218, the barcode for batch n is scanned to enter the information for batch n into memory. At step 3220, batch n is loaded in the processing device along with the barcode card for batch n.

At step 3230, multiple-batch processing is begun. And as discussed in relation to FIG. 28, the barcode card does not have to be read during processing of the documents. At step 3232, documents are transported, one at a time, through the processing device. At step 3234, the processing device determines if the document is a barcode card. If the document is a barcode card the device determines, at step 3236, if the preceding document has been transported to an output receptacle, an offsort receptacle, or a reject receptacle. If the preceding document has reached such a receptacle, the device sends the separator card, at step 3240, to a reject receptacle. If the preceding document has not yet reached an output receptacle, the device pauses the transport of the separator card and documents upstream of the separator card, at step 3238, until the device determines that the preceding document has reached an output receptacle.

For example, if batch #1 is being processed by the currency processing device 200 described in connection with FIGS. 2 and 3, contains five documents, four currency bills and a trailer card type separator card, placed in the input receptacle 202. Batch #2 would also be placed in the input receptacle 202. In the example the four currency bills would be fed, one at a time, from the input receptacle by the transport mechanism 206 to one of the output receptacles 208*a*-208*h*. When the separator card is detected by the evaluation region 204, the transport mechanism 206 of the evaluation region 204 halts, pausing the transport of the separator card. As previously described, output receptacles 208*c*-208*h* include both an escrow compartment 205*a*-205*f*, and a storage cassette 207*a*-207*f*. When the evaluation region 204 of the processing device 200 detects the separator card the four currency bills will be at various locations within the processing device 200, such that the first currency bill is located in the first escrow compartment 205*a* and the other currency bills are located within the transport mechanism 206 downstream of the evaluation region 204. The transport mechanism 206 downstream of the evaluation region 204 continues to transport the currency bills until all of the currency bills have reached one of the output receptacles 208*a*-208*h*. When the transport mechanism 206 of the evaluation region 204 pauses the transport of the separator card, the transport of the documents from batch #2 also pauses, leaving the documents of batch #2 in the input receptacle 202, or, in some instances, in the transport mechanism 206 upstream of the evaluation region 204 and the separator card. Once all of the currency bills of batch #1 have reached one of the output receptacle 208*a*-208*h* the transport mechanism 206 resumes the transport of the separator card of batch #1 to one of the output receptacles, such as receptacle 208*a* according to this example. When the transport mechanism 206 resumes the transport of the separator card of batch #1, the documents of batch #2 are also transported, as described with respect to batch #1. This process continues until the input receptacle 202 contains no additional documents.

Pausing the transport of the separator card of batch #1 is useful in case a document of batch #1 misfeeds and a jam of the processing device 200 occurs. Since the transport of the separator card of batch #1 and documents of batch #2 upstream of the separator card have been paused, the operator knows that only documents from batch #1 will be located within the transport mechanism 206 of the device 200 downstream of the evaluation region 204. Based on the operation of the device 200, if a jam occurs upstream of the escrow compartments 205*a*-205*f*, only the documents in the transport path 206 downstream of the evaluation region 204 need to be fed through the device 200 again. If however, the jam occurs at the escrow compartments 205*a*-205*f*, the entire contents of the escrow compartments 205*a*-205*f* as well as any documents in the transport path 206 downstream of the evaluation region 204 need to be fed through the device 200 again. Therefore, should a jam, or similar feed error, occur, the operator knows which documents must be fed through the device 200 again.

Knowing which documents must be refed makes it easier to clear the jam and reconcile the count as not all of the documents will have to be recounted, only the affected documents. This reduces the amount of time required to clear a jam, or other misfeeds, from the device compared to a device that does not pause the transport between batches.

If the document is not a barcode card, the processing device, at step 3242, processes the document to obtain characteristic information from the document. At step 3244, the device determines if the document is a reject, e.g., an unreadable document. If the document is a reject then, at step 3246, the processing device sends the document to a reject receptacle.

At step 3248, memory is updated based on the information obtained from processing the document at step 3242. For example, the count of documents processed for the batch, or the current multiple-batch run, is incremented. Similarly, the total value for the batch may be adjusted based on the document.

At step 3250, if there is another document to process, then the processing device determines, at step 3234, if the document is a barcode card. If there is not another document, then at step 3252, the processing device queries the operator as to whether or not there are any rejects, e.g., non-machine-readable documents to key in manually. If there are rejects to key in, then at step 3254, the operator can manually key in the rejects associated with the then current batch. For example, if three documents are located in the reject receptacle and the operator determines that the three documents are actually a valid $10 bill, a valid $1 bill, and a valid $20 bill, the operator would use the denomination keys of the control unit 216 of the device 200 previously described in connection with FIGS. 2 and 3 to enter the denomination of the bills into the device. If there are no rejects to key in, then at step 3256 the document information in memory for the batch is matched with the batch barcode information for that batch on a sequential basis due to the batches being processed in a sequence consistent with that in which the barcode information was entered.

At step 3258, the processing device determines if there are any more active batches. If there are more active batches then the device, at step 3252 cues the operator as to whether or not there are any rejects to key in. The rejects for the batches are keyed into the processing device in a sequence consistent with the sequence in which the batches were processed. For example, the rejected documents from batch i, which will be located between the separator card for batch i−1 and batch i when the separator card is a trailer card, would be keyed into the processing device following any rejected documents from batch i, and prior to any rejected documents from batch i+1. If there are no more active batches, then at step 3260, multiple-batch processing is ended.

Figure 30:
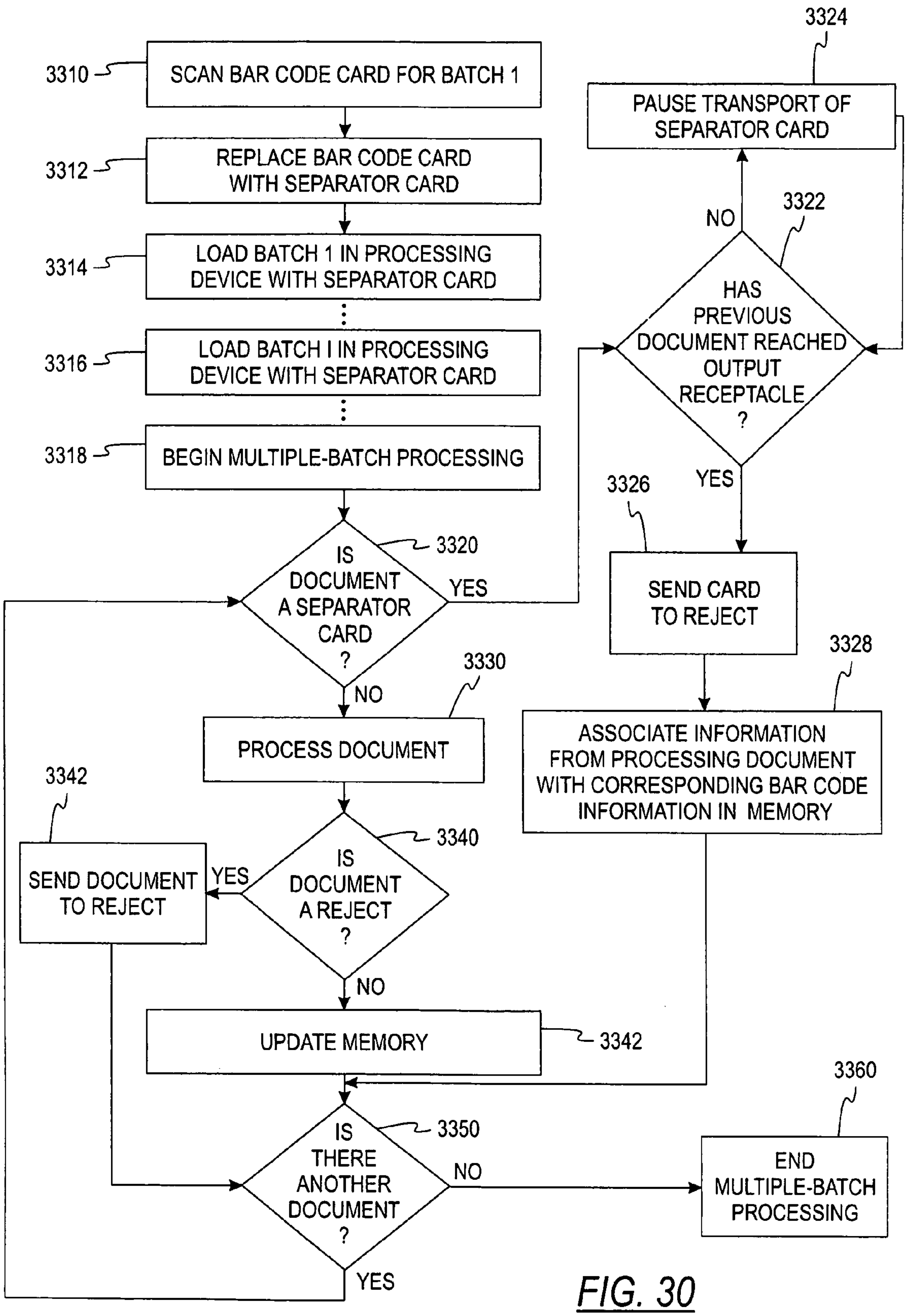
FIG. 30 is a flowchart of a method of multiple batch processing according to still another embodiment of the present invention.

FIG. 30 illustrates an alternate method of multiple-batch processing. At step 3310, the barcode card for the batch 1 is gun scanned. The barcode card for batch 1 is replaced, at step 3312, with a separator card. At step 3314, batch 1 is loaded into the processing device along with the separator card. This routine is repeated for each subsequent batch. For example, at step 3316 batch i is loaded into the processing device along with a separator card. After all the batches are loaded into the processing device, into the feed hopper, for example, then at step 3318 multiple-batch processing is started. If the total quantity of documents of the batches exceeds the capacity of the feed hopper, the batches can be processed in groups, where each group includes multiple batches.

Each document is then transported one at a time through the document processing device. If, at step 3320, a document is determined to be a separator card, then the device, at step 3322, determines if the preceding document has reached an output receptacle, an offsort receptacle, or a reject receptacle. If the preceding document has reached such a receptacle, the device, at step 3326, sends the separator card to a reject receptacle. If, however, the preceding document has not yet reached a receptacle, the transport of the separator card is paused (step 3324). In methods in which the separator card is used as a header card, the processing device then, at step 3328, sets a flag indicating a separator card has been reached so that information from processing documents between this separator card and the next separator card will be associated with bar code information corresponding to this separator card. The barcode information in memory is associated with the information from document processing on a sequential basis. For example, the barcode information entered from the $i^{th}$ barcode will be associated with the information obtained for processing documents of the $i^{th}$ batch of documents. The barcode information entries in memory can, for example, be stepped through on a first-entered-first-batch basis or a last-entered-first-batch basis. In methods in which the separator card is used as a header card, the documents following the $i^{h}$ header card belong to the $i^{th}$ batch of documents. In methods in which the separator card is used as a trailer card, then the information from processing documents between the previous separator card and the current separator card are associated with the current separator card. Then the current separator card, the $i^{th}$ separator card, is associated with the $i^{th}$ barcode information in memory, on a sequential basis.

If at step 3320 the document is not a separator card, then at step 3330 the document is processed to, for example, determine its denomination, or determine if the document is a reject. If the document is a reject at step 3340, e.g., not readable or not genuine, then the document is, at step 3342 sent to a reject receptacle. If the document is not a reject, then, at step 3342, memory is updated. For example, the number of documents processed and the total denomination for a particular batch may be determined and stored in the memory. That information is matched to, for example, the proper source ID in memory by stepping through source IDs in memory, by, for example, taking one step for each batch processed.

If, at step 3350, there is another document to be processed, then the process continues again, at step 3320. Multiple-batch processing ends at step 3360, if there is not another document to process.

Figure 31:
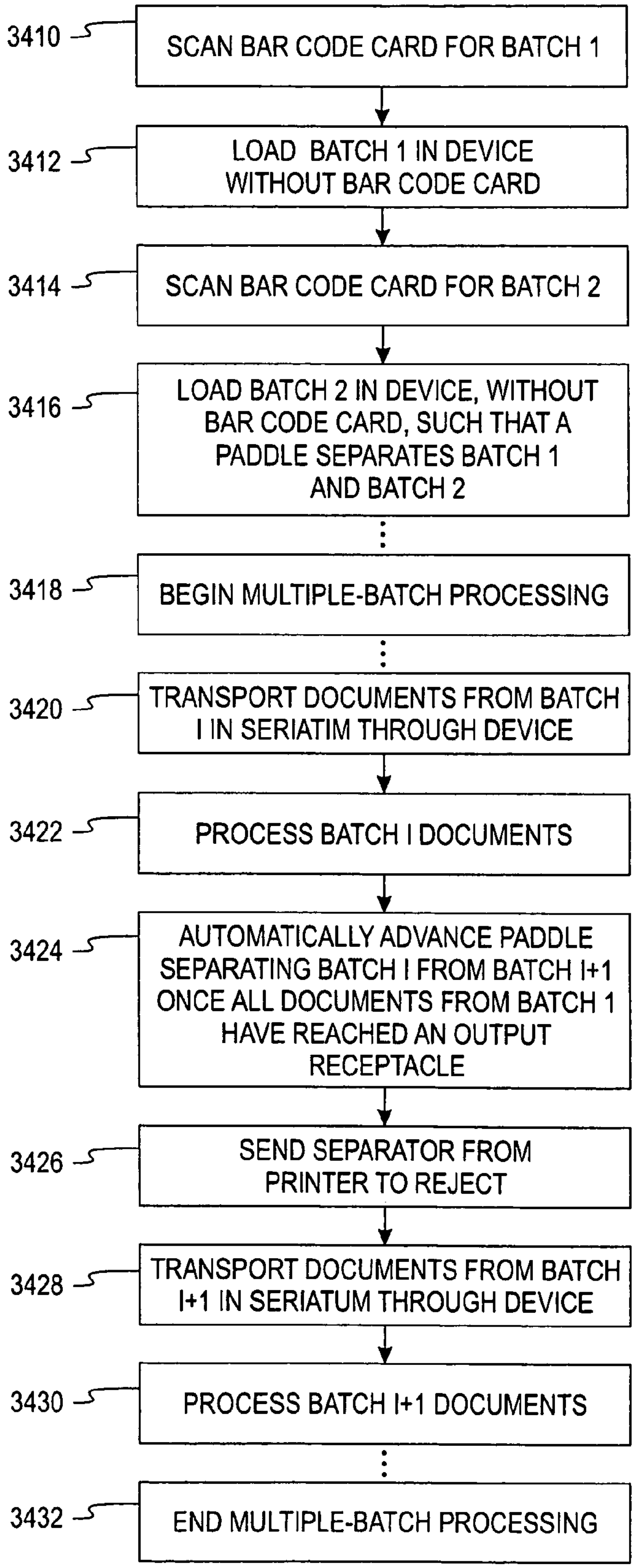
FIG. 31 is a flowchart of a method of multiple batch processing according to a further embodiment of the present invention.

FIG. 31 illustrates a method of processing documents similar to that of FIG. 30, except that the barcode card is not replaced with a separator card, instead paddles separate batches. At step 3410 the barcode card for batch 1 is gun scanned. At step 3412, batch 1 is loaded into the device without the barcode card. In a variation, batch 1 is loaded into the device, without a barcode card, before the information from the barcode card is gun scanned.

At step 3414, the barcode card for batch 2 is scanned. Batch 2 is then, at step 3416, loaded into the device without the corresponding barcode card such that a paddle separates batch 1 and batch 2, as previously described in connection with FIG. 23. This general routine continues until at step 3418, multiple-batch processing is begun.

With reference to the $i^{th}$ batch, at step 3420, the document processing device transports documents from batch i, one at a time, through the device. Each document of batch i is, at step 3422, processed to assess document characteristics. And then, at step 3424, the processing device automatically advances the paddle separating batch i from batch i+1 once all of the documents from batch i have reached an output receptacle. At step 3426, a separator card is sent from a printer, as described in connection with FIG. 23, to a reject receptacle to separate rejects of batch i from rejects of batch i+1. Then at step 3428 documents from batch i+1 are transported, one at a time, through the processing device. And at step 3430, batch i+1 documents are processed.

A separator card is not required to be ejected from the printer to the reject receptacle, e.g., output receptacle 208*c* or 208*a* (FIGS. 2-3), prior to beginning to transport documents from batch i+1 through the device. The controller controls sequencing such that documents from i+1 that are rejected do not enter the reject receptacle until after the separator ejected from the printer enters the reject receptacle. This general process continues until, at step 3432, multiple-batch processing is complete.

As an alternative to the paddle method, another embodiment uses a sequence of input receptacles, each of which contains one batch to be sorted. The batches include header cards with either barcodes to be scanned or data to be entered manually using a keyboard. The receptacles are configured in-line, or in a "lazy susan" configuration. The receptacles approach the feeder sequentially, and when the first receptacle is empty, the first receptacle is moved away from the feeder and the second receptacle is moved to the feeder. This process continues until all input receptacles are empty. To differentiate the source of the bills in the reject receptacle, in some embodiments, a printer is coupled to the device and prints a card that is placed in the reject receptacle at the start of each batch processed. The information printed on the card informs the user as to which batch the bills in the reject receptacle correspond.

Figure 32:
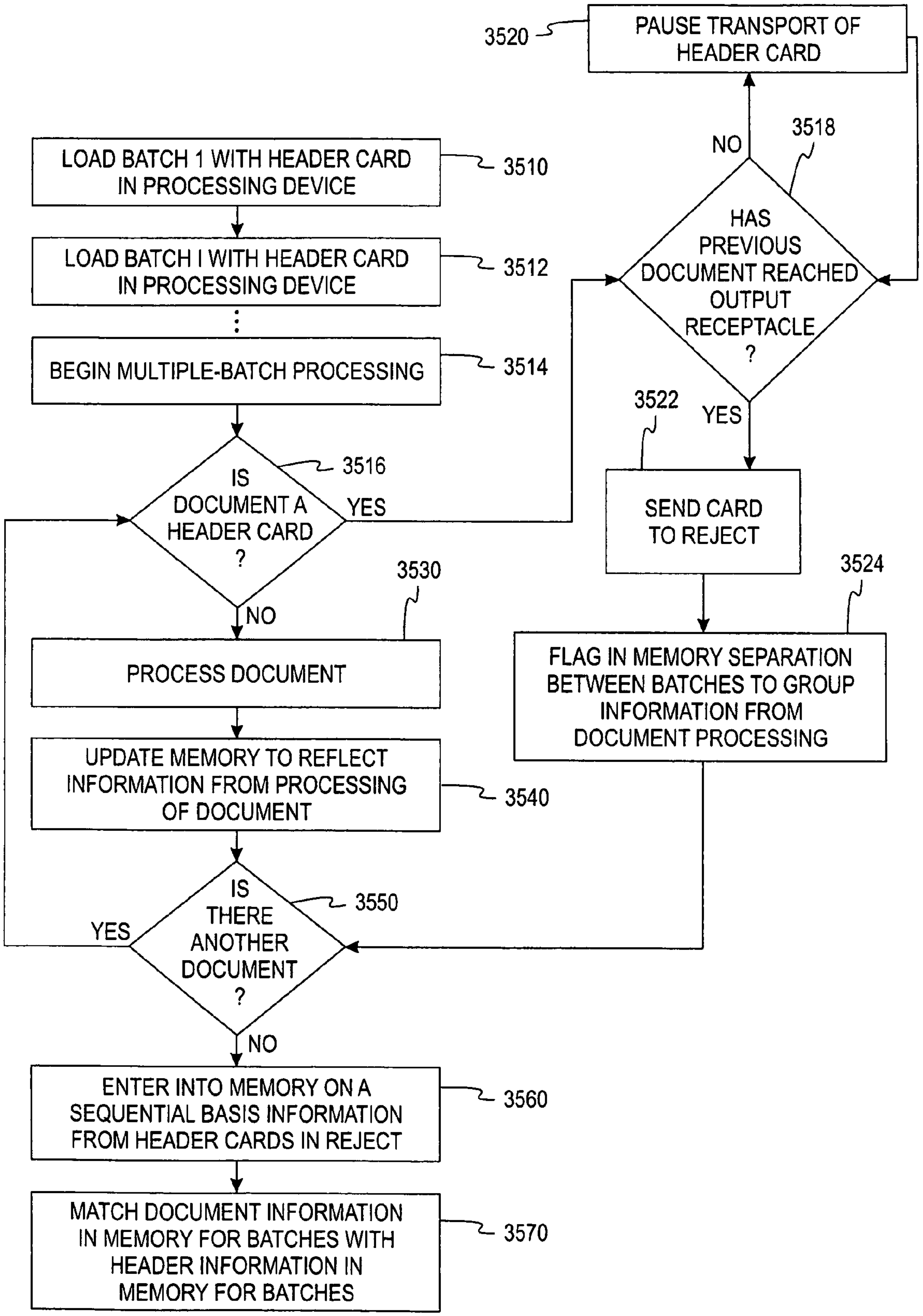
FIG. 32 is a flowchart of a method of multiple batch processing according to yet a further embodiment of the present invention.

FIG. 32 illustrates yet another method of multiple-batch processing. At step 3510, batch 1 is loaded with a header card in the processing device. And each batch is loaded with its header card in succession into the processing device with its header card. For example, at step 3512 batch i is loaded with its header card in the processing device. And then at step 3514 multiple-batch processing is begun.

If, at step 3516, a document is determined to be a header card, then at step 3518, the device determines if the preceding document has reached an output receptacle. If the preceding document has reached the output receptacle, the header card, at step 3522, is sent to a reject receptacle. If the preceding document has not yet reached an output receptacle, the device, at step 3520, pauses the transport of the header card until the device determines that the preceding document has reached an output receptacle. At step 3524 a flag is set or pointer is moved in memory to indicate a separation between batches has been reached. If at step 3516 the document card is not a header card, then at step 3530, the document is processed to assess characteristic information. At step 3540 the memory is updated to reflect information from processing that document.

If at step 3550 there is another document to process, then processing continues again at step 3516. After all the documents have been processed, then at step 3560 information from each of the header cards, which have been collected in a reject receptacle, are entered into memory on a sequential basis. Then, at step 3570 document information in memory for each batch is matched with header information that has been entered for each batch on a sequential basis. To simplify the matching process, the information from the header cards, e.g. source ID, should be entered into memory in an order consistent with the order in which the batches were processed. As an alternative to matching document information in memory after all of the header card information has been entered, document information for each batch can be matched with information as the information from each card is entered from a header card that has been collected in reject.

Any of the embodiments described in connection with FIGS. 28-32 may be adapted to include two cards, a first card that is a barcode card as described above and a second card that is a separator card. Multiple batches are deposited into the input receptacle of the document processing device. Each batch includes the first card which includes a Source ID, the separator card, and a stack of currency bills and/or substitute currency media. The first card is routed to a first output receptacle of the document processing device, such as a first upper output receptacle. The separator card is routed to a second output receptacle, such as a second upper output receptacle, along with any rejected currency bills and/or rejected substitute currency media. In this manner, rejected documents from separate batches will be separated by the separator cards in the document processing device.

In some embodiments, the separator cards described immediately above may be sequentially numbered, such as, 1, 2, 3, 4, etc., using a printing or marking device, and the sequence number is matched using software with a corresponding Source ID.

An additional advantage of transporting one batch of documents at a time through the processing device, as opposed to continuous multi-batch currency processing, is that if a document jam or other malfunction occurs, only one batch of documents is affected. As there is only one batch of documents in the device, the operator does not have to determine which batch documents being fed through the device when a jam occurs belong to. For example, using the device described in conjunction with FIGS. 2-3, the input receptacle 202 of the device 200 initially contains 3 batches of documents, batch #1, batch #2, and batch #3 that are to be processed. The documents from batch #1 would be transported using the transport mechanism 206 from the input receptacle 202 to one of the output receptacles 208*a*-208*h* as described in connection with one of the embodiments described in connection with FIGS. 28-32. If a document jam occurs in the transport mechanism 206 upstream of the output receptacles 208*a*-208*h* while batch #2 is being processed, the only documents being transported by the transport mechanism 206 through the device 200 downstream of the evaluation region 204 correspond with batch #2, as the transport of the header card for batch #3 will be paused when the header card for batch #3 is detected in the evaluation region 204. Therefore, the operator will know that the documents in the transport path 206 of the device 200 downstream of the evaluation region 204 belong to batch #2, making it easier for the operator to clear the jam and reconcile batch #2. The documents from batch #2 in one of the output receptacles 208*c*-208*h* will be located in the escrow compartment 205*a*-205*f* corresponding to the output receptacle 208*c*-208*h*. If a document from batch #2 is sent to a reject receptacle, such as output receptacle 208*a*, the document from batch #2 in the reject receptacle will be located on top of the header card for batch #2. Therefore, it is easy for the operator to recreate the stack of documents that must be refed, as those documents will be the only documents located within the transport mechanism 206 downstream of the evaluation region 204. The operator will only have to resort the affected documents of batch #2, as batch #1 has already been successfully sorted, and batch #3 is still in the input receptacle 202, or upstream of the evaluation region 204 in the transport mechanism 206 of the device 200. This saves the operator time, and simplifies the operators task when a jam or similar problem occurs.

While the invention is susceptible to various modifications and alternative forms, specific embodiments thereof have been shown by way of example in the drawings and herein described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

The invention claimed is:

1. A method of processing at least two batches of documents, comprising the acts of:

entering into memory of a document processing device source identification information for at least two batches of documents in a sequence;

loading the at least two batches into the document processing device for multiple batch processing in a sequence consistent with the sequence in which the source identification information was entered into memory;

after entering the source identification information for the at least two batches into memory, initiating the transport of the batches in a sequence consistent with the sequence in which the source identification information was entered into memory, one document at a time, through the document processing device to obtain characteristic information from the documents in the at least two batches, pausing the transport between each batch.

2. The method of claim 1 further comprising the act of determining batch information for each of the at least two batches based on the obtained characteristic information.

3. The method of claim 1 further comprising the acts of:

receiving a header card with each of the at least two batches; and obtaining the source identification information for each of the at least two batches from the header cards before loading the at least two batches into the document processing device.

4. The method of claim 3 further comprising the acts of:

removing the header cards from the at least two batches before transporting the at least two batches through the document processing device; and replacing at least one header card with a separator card to separate the at least two batches when the at least two batches are loaded into the document processing device.

5. The method of claim 4 comprising the act of transporting the separator card to an output receptacle of the document processing device and transporting rejected documents to the output receptacle such that the separator card separates rejected documents from a first batch from rejected documents from a second batch of the at least two batches.

6. The method of claim 5 comprising the act of successively entering characteristic information for the rejected documents from the first and second batches such that after batch information for the batches are matched with the source identification information, the batch information for each batch reflects the entered characteristic information for the rejected documents.

7. The method of claim 6 wherein the act of successively entering characteristic information for the rejected documents comprises reloading the rejected documents into the document processing device for reprocessing.

8. The method of claim 3 further comprising the acts of:

removing the header cards from the at least two batches before transporting the at least two batches through the document processing device; and after removing the header cards, loading the at least two batches without the header cards into the document processing device such that a paddle of the document processing device separates the at least two batches.

9. The method of claim 8 comprising the act of allowing the paddle to advance during the multiple batch processing.

10. The method of claim 3 further comprising the acts of:

loading the at least two batches into the document processing device with at least one of the two header cards such that the at least one header card separates the at least two batches;

transporting the header card separating the at least two batches to an output receptacle; and transporting rejected documents to the output receptacle such that the header card separating the at least two batches separates rejected documents from the first batch from rejected documents from the second batch, wherein the source identification information for each of the at least two batches is entered into memory of the document processing device before transporting the rejected documents to the output receptacle.

11. A method of processing at least two batches of documents, comprising the acts of:

loading the at least two batches into an input receptacle of a document processing device with at least one separator card separating the at least two batches for multiple batch processing;

starting transportation of the batches in a sequence, one document at a time, from the input receptacle through the document processing device to at least one output receptacle to obtain characteristic information from at least some of the documents in the at least two batches;

pausing transportation of the documents from the input receptacle when the at least one separator card is detected by the device and the device determines that documents that the device has obtained characteristic information from are still being transported to the at least one output receptacle.

12. The method of claim 11 comprising the act of resuming transportation of documents from the input receptacle when the device determines that documents that the device has obtained characteristic information from have been transported to the at least one output receptacle.

13. The method of claim 11 comprising the act of directing the separator card to a reject receptacle.

14. The method of claim 13 comprising the act of obtaining source identification information for one of the at least two batches from the separator card.

15. The method of claim 11, further comprising the acts of:

determining batch information for each of the at least two batches based on the obtained characteristic information; and after determining batch information for each of the at least two batches, entering source identification for each batch into memory in a sequence consistent with the sequence in which the at least two batches were transported through the document processing device.

16. The method of claim 15 wherein the act of entering source identification information for each batch comprises bar code scanning a plurality header cards respectively associated with the at least two batches.

17. The method of claim 16 comprising the act of keying into memory characteristic information for rejected documents associated with a first of the at least two batches before bar code scanning the header card associated with a second of the at least two batches.

18. The method of claim 11 comprising the act of prompting an operator to enter source identification information associated with a first of the at least two batches after the documents from both the first and second of the at least two batches have been transported through the document processing device.

19. A method of processing multiple batches of documents including currency bills and a header card, comprising the acts of:

capturing source identification information on a header card in a batch of documents including currency bills to identify the source of the currency bills in the batch of documents;

placing the currency bills with the header card in an input receptacle of a document processing device;

transporting each of the documents from the input receptacle, one document at a time, past a detector;

evaluating each document to obtain characteristic information associated with a document;

determining if a document is a header card;

pausing the transporting of the documents from the input receptacle when a header card is detected by the device and the device determines that documents that the device has obtained characteristic information from are still being transported to at least one output receptacle;

transporting the header card to an offsort receptacle;

transporting each of the currency bills, one bill at a time, past a currency detector;

evaluating each currency bill to obtain characteristic information associated with a currency bill;

determining whether each currency bill meets or fails at least one criterion;

directing each currency bill to the at least one output receptacle based on the determining; and directing a separator card to at least one output receptacle to separate documents from consecutive batches.

20. The method of claim 19 further comprising the act of comparing the source identification information to information from an information library.

21. The method of claim 20, wherein the information library is a database.

22. The method of claim 20 wherein the information library is stored in the document processing device.

23. The method of claim 20, further comprising the act of remotely accessing information from the information library.

24. The method of claim 19 further comprising the act of resuming the transporting of documents from the input receptacle when the device determines that documents that the device has obtained characteristic information from have been transported to the at least one output receptacle.

25. The method of claim 19 wherein the act of placing is carried out using a cartridge.

26. The method of claim 19 further comprising the act of printing a set of characters on at least one of a header card and a separator card.

27. A method of processing multiple batches of documents including currency bills and a header card, comprising the acts of:

capturing source identification information on a header card in a batch of documents including currency bills to identify the source of the currency bills in the batch of documents;

placing the currency bills with the header card in an input receptacle of a document processing device;

transporting each of the documents from the input receptacle, one document at a time, toward at least one output receptacle;

determining if a document is a header card;

obtaining characteristic information from each currency bill;

determining whether each currency bill meets or fails at least one criterion;

directing each currency bill to at least one output receptacle based on the determining;

pausing the transporting of the documents from the input receptacle when a header card is detected by the device and the device determines that documents that the device has obtained characteristic information from are still being transported to the at least one output receptacle;

transporting the header card to an offsort receptacle; and directing a separator card to at least one output receptacle to separate documents from consecutive batches.

28. The method of claim 27 further comprising the act of comparing the source identification information to information from an information library.

29. The method of claim 28 wherein the information library is a database.

30. The method of claim 28 wherein the information library is stored in the document processing device.

31. The method of claim 28 further comprising the act of remotely accessing information from the information library.

32. The method of claim 27 further comprising the act of resuming the transporting of documents from the input receptacle when the device determines that documents that the device has obtained characteristic information from have been transported to the at least one output receptacle.

33. The method of claim 27 wherein the act of placing is carried out using a cartridge.

34. The method of claim 27 further comprising the act of printing a set of characters on at least one of a header card and a separator card.

35. The method of claim 1 wherein the batches of documents include currency bills.

36. The method of claim 5 wherein the batches of documents include currency bills.

37. The method of claim 9 wherein the batches of documents include currency bills.

38. The method of claim 10 wherein the batches of documents include currency bills.

39. The method of claim 11 wherein the batches of documents include currency bills.

40. The method of claim 12 wherein the batches of documents include currency bills.

41. The method of claim 17 wherein the batches of documents include currency bills.

* * * * *